(12) United States Patent
Bergsaaker et al.

(10) Patent No.: US 11,321,763 B2
(45) Date of Patent: May 3, 2022

(54) SYSTEMS FOR GENERATING VECTORS FOR STOCK KEEPING UNITS USING A NEURAL NETWORK

(71) Applicant: THE BOSTON CONSULTING GROUP, INC., Boston, MA (US)

(72) Inventors: Alex Bergsaaker, Brighton (AU); Adam Whybrew, New South Wales (AU); Lukasz Jerzy Bolikowski, Warsaw (PL); Jesse Denzil Ross Thomas, London (GB); Zao Wu, Sai Wan Ho (HK)

(73) Assignee: THE BOSTON CONSULTING GROUP, INC., Boston, MA (US)

( * ) Notice: Subject to any disclaimer, the term of this patent is extended or adjusted under 35 U.S.C. 154(b) by 0 days.

(21) Appl. No.: 17/015,863

(22) Filed: Sep. 9, 2020

(65) Prior Publication Data

US 2022/0044300 A1  Feb. 10, 2022

Related U.S. Application Data

(60) Provisional application No. 63/003,527, filed on Apr. 1, 2020.

(51) Int. Cl.
*G06Q 30/06* (2012.01)
*G06N 3/08* (2006.01)
*G06K 9/62* (2006.01)
*G06Q 30/02* (2012.01)

(52) U.S. Cl.
CPC ....... *G06Q 30/0631* (2013.01); *G06K 9/6256* (2013.01); *G06N 3/08* (2013.01); *G06Q 30/0283* (2013.01); *G06Q 30/0633* (2013.01)

(58) Field of Classification Search
CPC .......................... G06Q 30/0631; G06N 7/046
See application file for complete search history.

(56) References Cited

U.S. PATENT DOCUMENTS

| | | | |
|---|---|---|---|
| 2010/0324985 A1* | 12/2010 | Kumar | G06Q 10/04 705/14.25 |
| 2014/0278778 A1 | 9/2014 | Regan | |
| 2014/0358633 A1 | 12/2014 | Wu et al. | |
| 2016/0125048 A1* | 5/2016 | Hamada | G06F 16/24578 707/734 |
| 2017/0185585 A1* | 6/2017 | Applegate | G06N 3/0472 |

(Continued)

OTHER PUBLICATIONS

Chen, Fanglin and Liu, Xiao and Proserpio, Davide and Troncoso, Isamar, Product2Vec: Understanding Product-Level Competition Using Representation Learning; Jan. 14, 2020; NYU Stern School of Business (Year: 2020).*

(Continued)

*Primary Examiner* — Brittney N Miller
(74) *Attorney, Agent, or Firm* — DLA Piper LLP (US)

(57) ABSTRACT

Systems and methods are disclosed for displaying information related to items in a store. Stock keeping unit (SKU) information for items in the store and combination information indicating which SKUs were sold together can be accepted. Dimension information and structure information for a neural network can be defined. The neural network can be trained using the combination information indicating which SKUs were sold together in a same combination to calculate weight values and bias values for the neural network.

9 Claims, 100 Drawing Sheets

(56) References Cited

U.S. PATENT DOCUMENTS

2017/0185894 A1* 6/2017 Volkovs .................. G06N 3/08
2019/0347607 A1 11/2019 Shi et al.
2020/0074517 A1 3/2020 Meier et al.

OTHER PUBLICATIONS

Baskoro. Neural Network Embedding for SKU Representation in Mapan. Retrieved from the internet: URL:https://medium.com/@jatmiko.budi/neural-network-embedding -for-sku-representation-in-mapan-c0bc20951b9e, (May 21, 2019).

Conneau, A., Lample, G., Ranzato, M. A., Denoyer, L., & Jegou, H. (2017). Word translation without parallel data. arXiv preprint arXiv:1710.04087.

Yin, Z., & Shen, Y. (2018). On the dimensionality of word embedding. In Advances in Neural Information Processing Systems (pp. 887-898).

Mikolov, Tomas, et al. "Distributed representations of words and phrases and their compositionality." Advances in neural information processing systems. 2013.

Mikolov, Tomas, et al. "Efficient estimation of word representations in vector space." arXiv preprint arXiv:1301.3781 (2013).

Gidi Shperber, A Gentle Introduction to Doc2Ved: https://medium.com/wisio/a-gentle-introduction-to-doc2vec-db3e8c0cce5e) (10 pages), Jul. 26, 2017.

Le, Quoc, and Tomas Mikolov. "Distributed representations of sentences and documents." International conference on machine learning. 2014.

Maaten, Laurens van der, and Geoffrey Hinton, "Visualizing data using t-SNE," Journal of machine learning research, Nov. 9, 2008: 2579-2605.

Aug. 20, 2020, Wikipedia article on cluster analysis (e.g., see https://en.wikipedia.org/wiki/Cluster_analysis.

Aug. 18, 2020, Wikipedia article https://en.wikipedia.org/wiki/Machine_learning.

International Search Report issued in PCT/US2021/025078 dated Jun. 4, 2021.

Written Opinion issued in PCT/US2021/025078 dated Jun. 4, 2021.

* cited by examiner

Semantic relationship can be captured by translating words to vectors (series of numbers) - i.e. Word2Vec

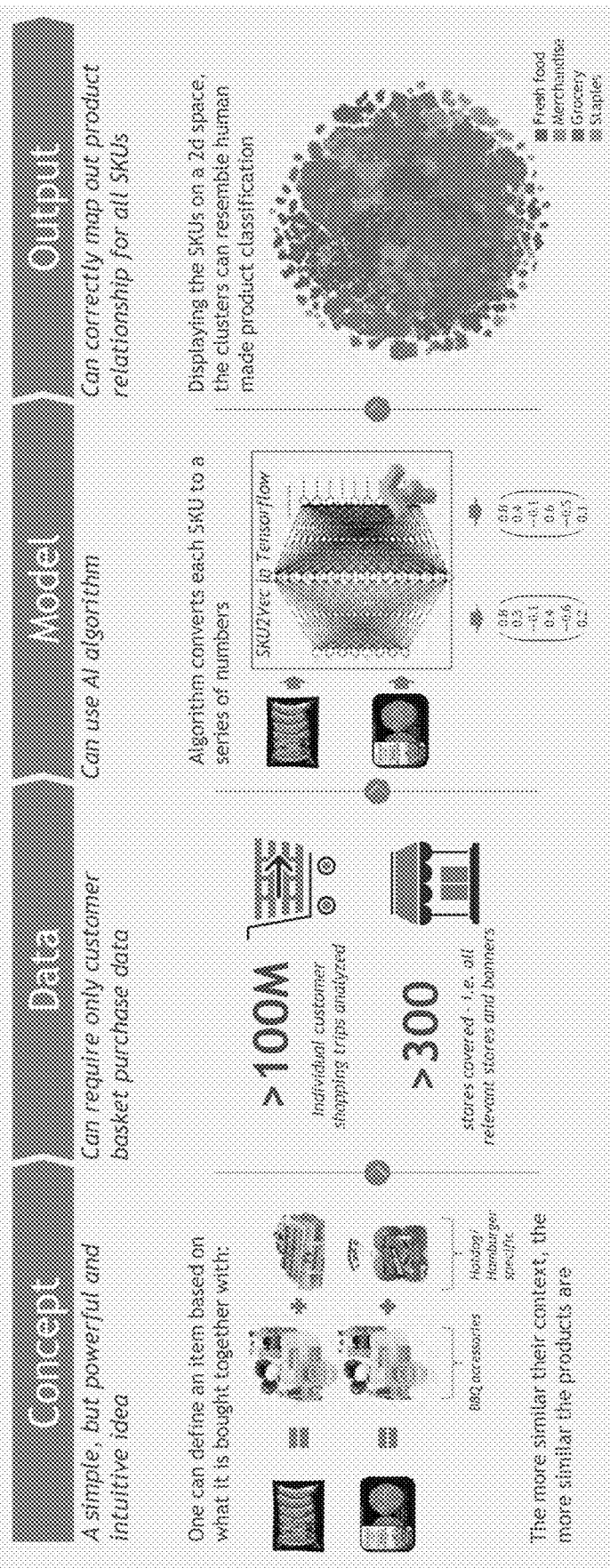

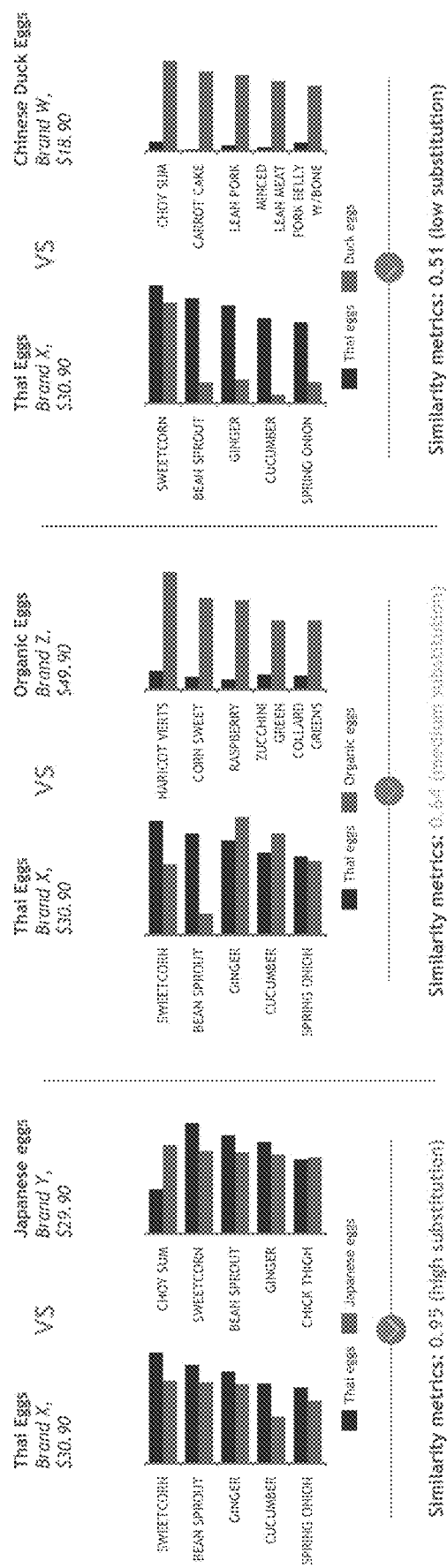

FIG. 5

Example cases:

| Supermarket chain | Supermarket chains (e.g., in a certain geographic area) | Household hardware chain |
|---|---|---|
| Can be used to create new consumer driven sub-categories and store clustering to improve transference estimation and aid range optimization | Can be used to improved existing product hierarchy by creating an uniform SKU grouping across multiple chains and helped validate delisting decisions | Identified top substitutes and complements for each SKU as key input for new pricing tool |

FIG. 6

Additional Example Cases:

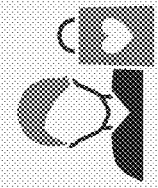

Range:

Localisation
- Store clustering, e.g. at category level

Range rationalisation
- Identify similar SKUs
- Transference models

Homebrand product development
- Identify range gaps

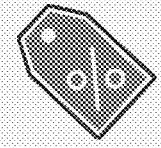

Price and promo

Promo economics
- Enhanced cannibalisation estimates
- Robust models, especially for new SKUs Markdown for fashion items
- Elasticity estimates for SKUs which have never been promoted

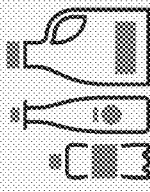

Customer-specific

Product recommendations
- Specific to you - reduce false positives (combine with Customer2Vec)
- New things to try Simple summary of all customer taste can be signals to use in propensity models Embeddings: SKU2Vec can be a modified version of skip-gram Word2Vec by considering store assortment difference.

FIG. 8

Embedding (e.g., Modified TensorFlow) can perform better at reducing bias caused by assortment difference across stores

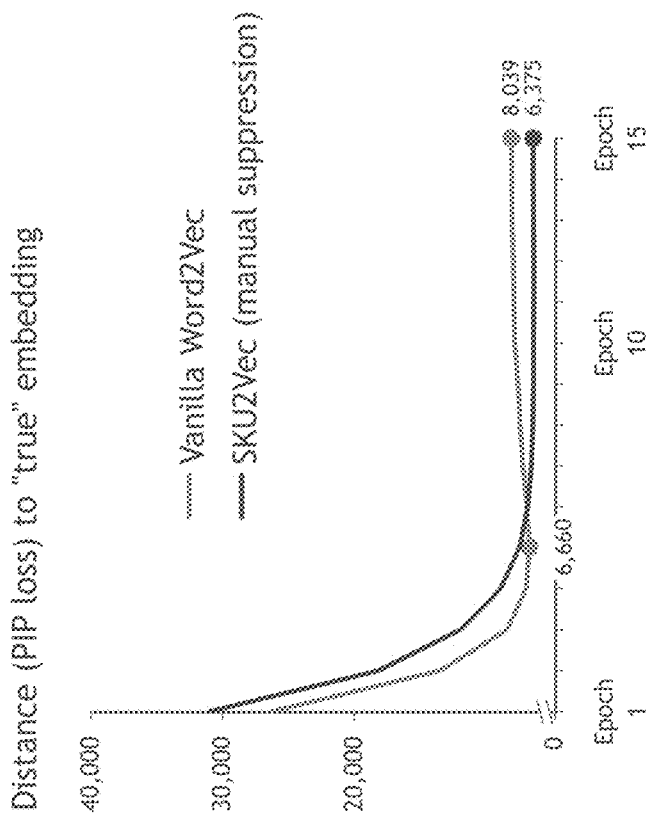

Comparing performance by conducting a controlled test

The "true" embedding can be a vanilla embedding on a complete, real retail data

The basket data can be modified to represent a typical situation of out-of-stock/not-stocked
* This can be done by randomly removing some items in its totality from some stores
* After the modification, the average overlap of SKUs can be reduced from 100% to ~83%

Different embedding algorithms based on the modified data can be tested; for each the best hyper-parameters can be selected using a rough grid search to make them more comparable SKU2Vec can outperform the vanilla embedding

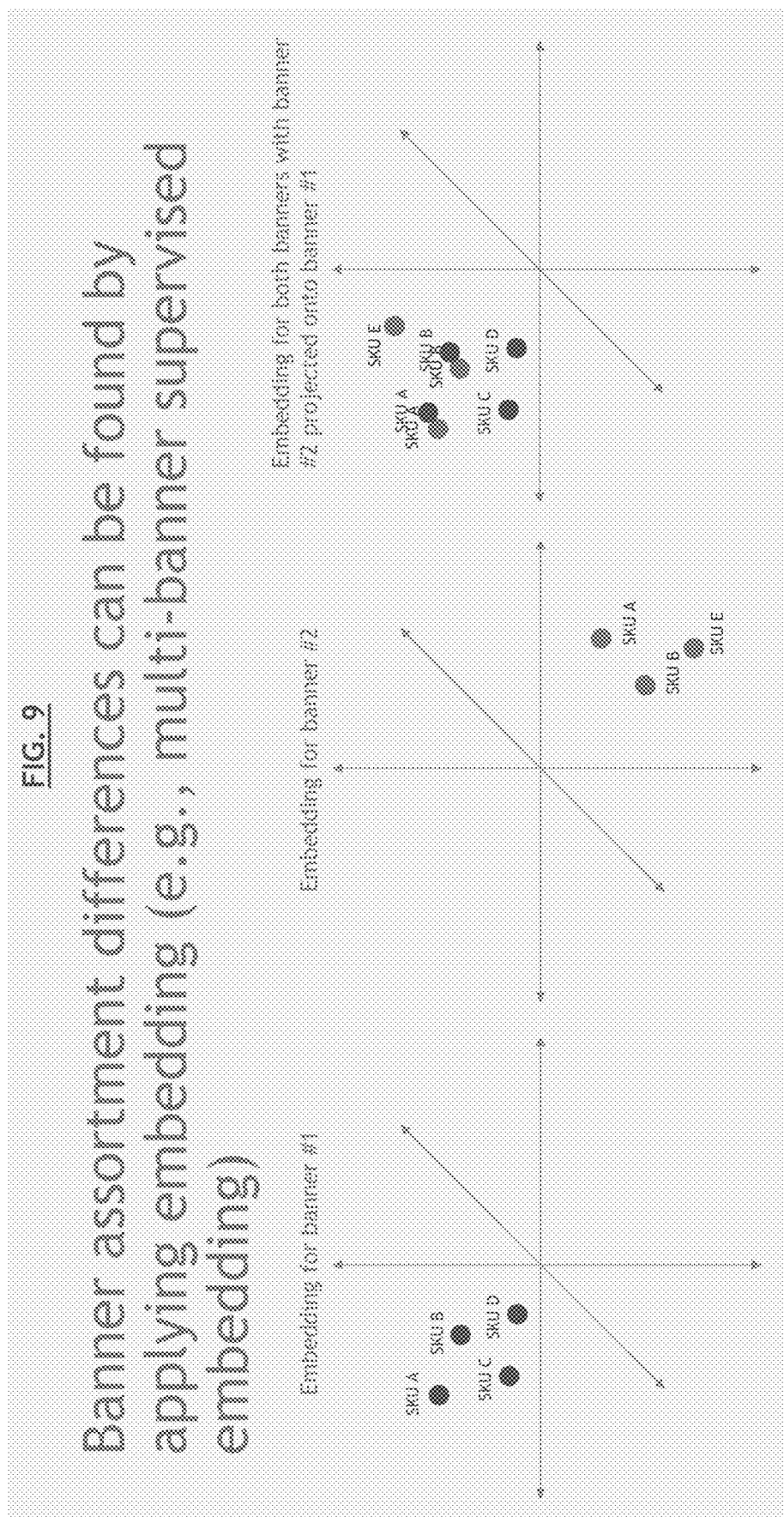

FIG. 11

Optimal embedding dimension can be estimated to be around 200 for a large supermarket chain

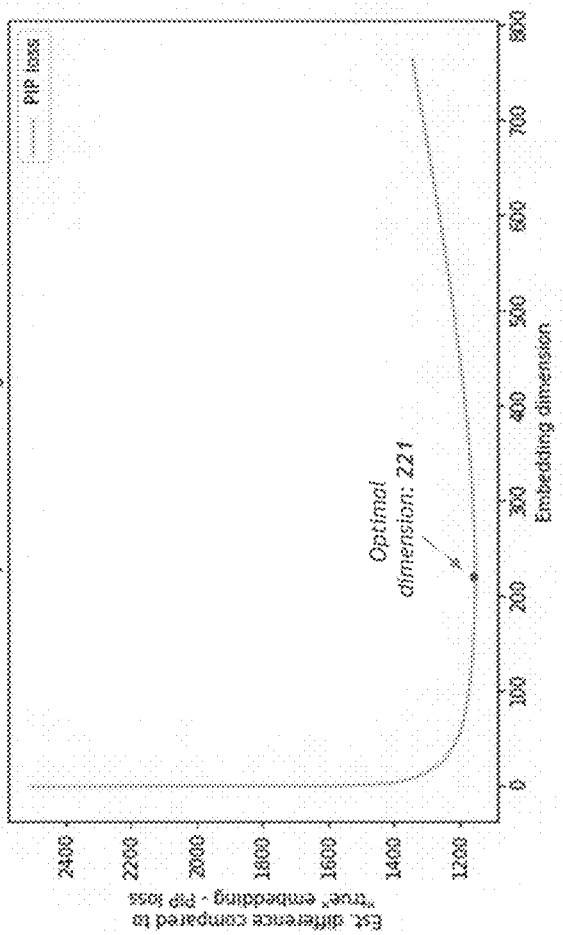

- Selecting embedding dimensionality in Word2Vec is a challenge usually solved by grid search evaluated on some functionality tests, but with major drawbacks

- Methods of finding optimal dimension can be used:
  - It can be based on the idea of creating the Pairwise Inner Product (PIP) loss function as a metric on dissimilarity between the "true embedding" and the trained one
  - This term can be decomposed to a bias and variance component (analogy to the bias-variance trade-off in means squared error)
  - The dimensionality with minimal PIP loss can be found with a Monte-Carlo approach

- The above approach can be adapted to SKU2Vec. For an embedding of the top 10k SKUs in a large super market chain, the optimal dimension can be estimated to be 221. However, note it can be largely flat for adjacent regions, i.e. dim [100, 300]

FIG. 13

SKU2Vec can help improve product hierarchies and identify store clusters

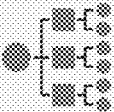

"SKU2Vec" can map out relationship between all SKUs...

- Understand product similarity from the eye of the consumers and consumers only
- Robust to assortment differences across banners and stores
- Rely on basket data only

...which can be used to...

- Identify mistakenly categorized SKUs
- Re-organise categories, including banner based categories
- Re-organise sub-categories
- Identify store clusters

FIG. 17

Example of new categorisation that is more aligned with consumer purchasing habit Household cleaning grouped together, Bleaches and floor cleaners are sub categorised separately Shoe polish split from floor cleaners into it's own category Merged Dehumidifiers and Air Fresheners into a new category named "Atmosphere control"

Insecticides split off from Dehumidifiers and sub-categorised by application, ie repellent and insecticide Proposed categories
- Atmosphere control
- Household Cleaning
- Insect control
- Laundry
- Shoe polish Quantity sold

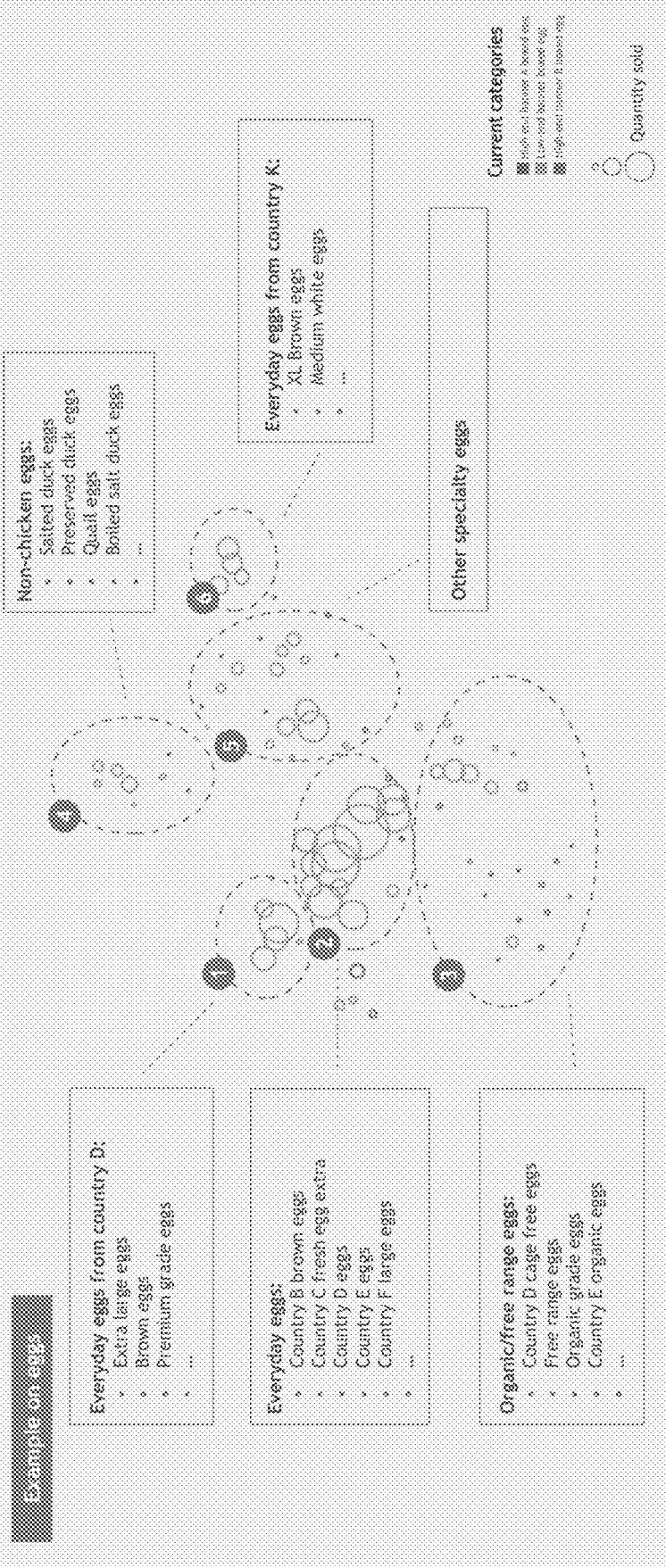

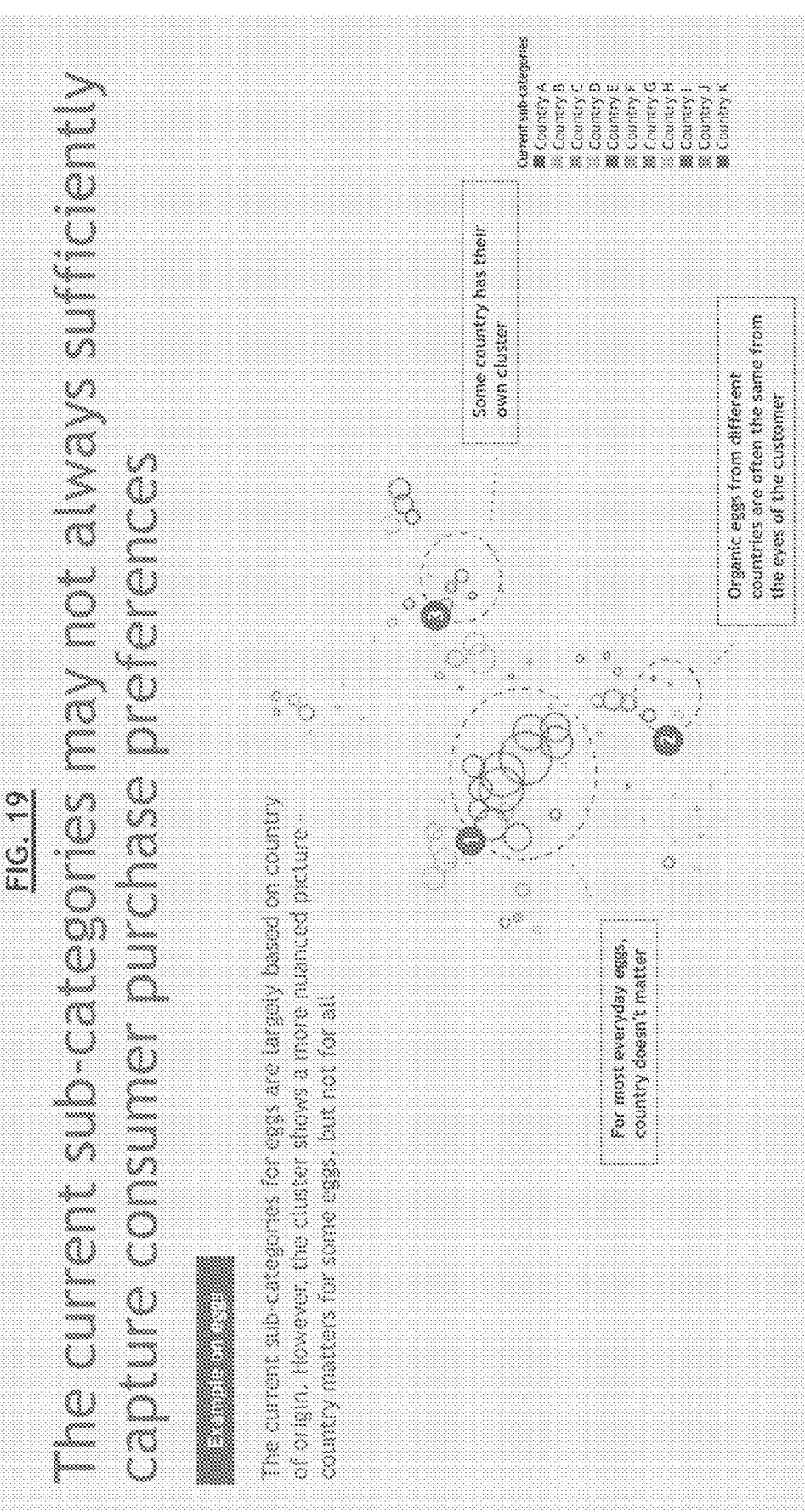

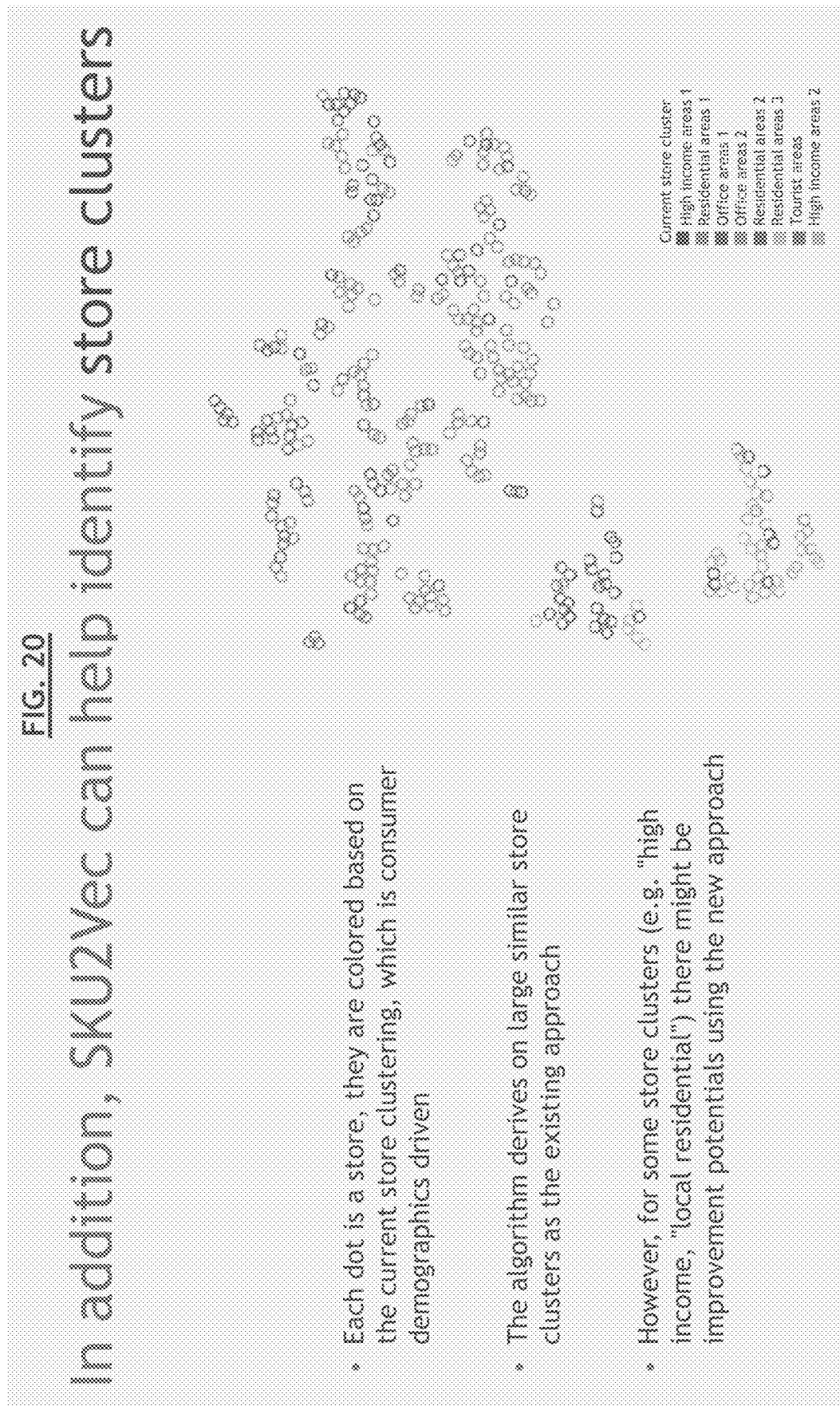

FIG. 20

In addition, SKU2Vec can help identify store clusters

- Each dot is a store, they are colored based on the current store clustering, which is consumer demographics driven
- The algorithm derives on large similar store clusters as the existing approach
- However, for some store clusters (e.g. "high income, "local residential") there might be improvement potentials using the new approach Current store clusters
High income areas 1
Residential areas 1
Office areas 1
Office areas 2
Residential areas 2
Residential areas 3
Tourist areas
High income areas 2

Algorithm insights may be combined with buyers' expertise to create maximum impact

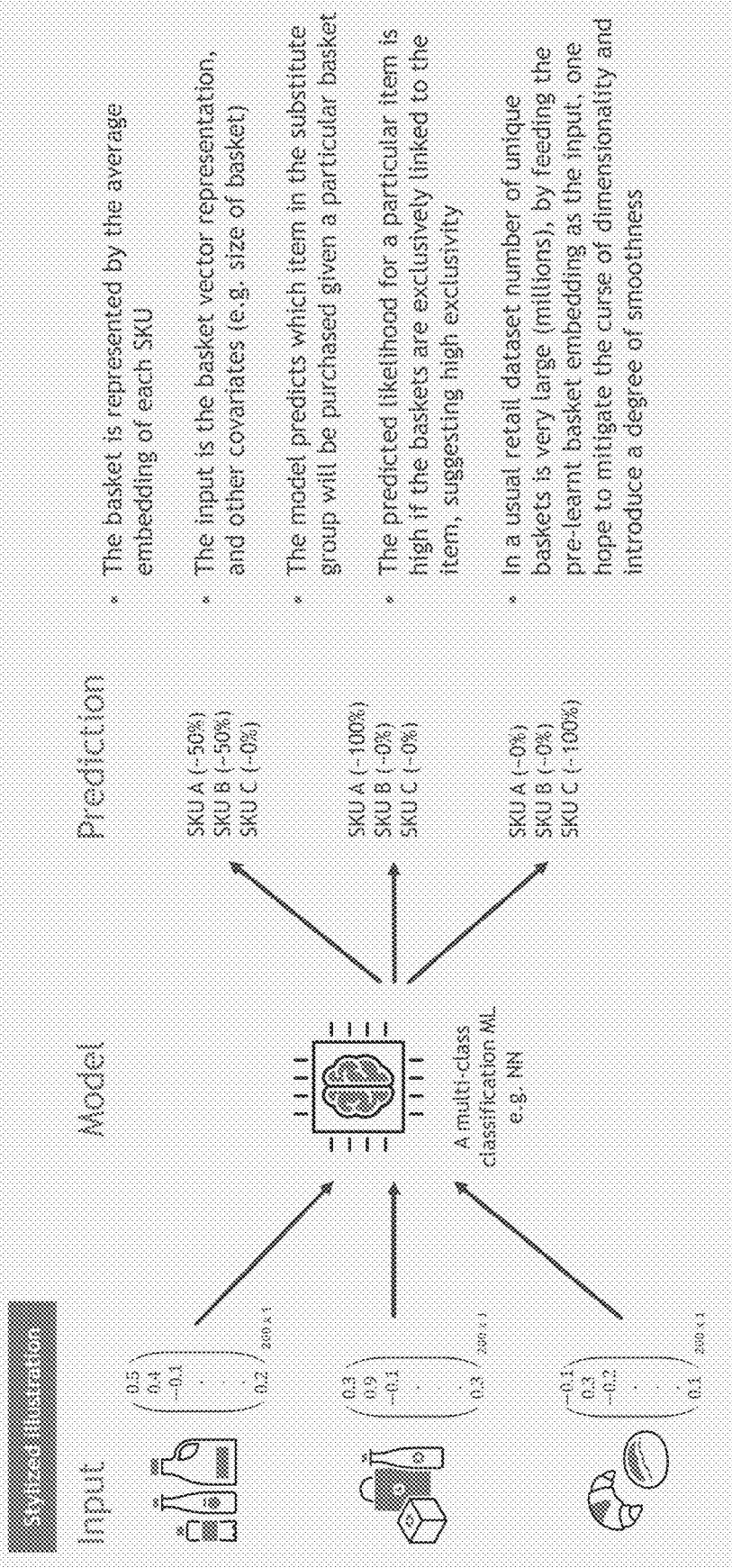

FIG. 25

Example formula of how to calculate exclusivity with SKU2Vec $$Exclusivity_{SKU\ i} = \frac{\sum_{j=1}^{J} \Pr(SKU\ i\ |\ \sum_{i}^{I} \widehat{\Pr(SKU\ i)} = 1,\ Basket^1 j_{excl.sku\ i},\ x_j)}{J}$$

where $1 \ldots j \ldots J$ can be the baskets that do contain SKU $i$,
and $1 \ldots i \ldots I$ can e the SKUs that belongs to the same substitute group as SKU $i$,
and $x_j$ can be basket specific covariates, e.g. number of items in basket

*The estimated probability $\Pr(\widehat{SKU\ i}\ |\ \ldots)$ can be derived using any multiclass classification algorithm,*

*where it can be conditioned on that the consumer will buy one of the SKUs in the substitute group, i.e. $\sum_{i} \Pr(SKU\ i) = 1$*

1. Basket j can be the average embedding of the SKUs in the basket (excluding SKU i)

New exclusivity can derive similar answers compared to existing methods...

...but new approach can underestimate non-fresh SKUs...

SKUs within Fresh (e.g. meat, vegetable, fruit) are scattered around 45 degree line, while the rest of SKUs (red dots) are above the line

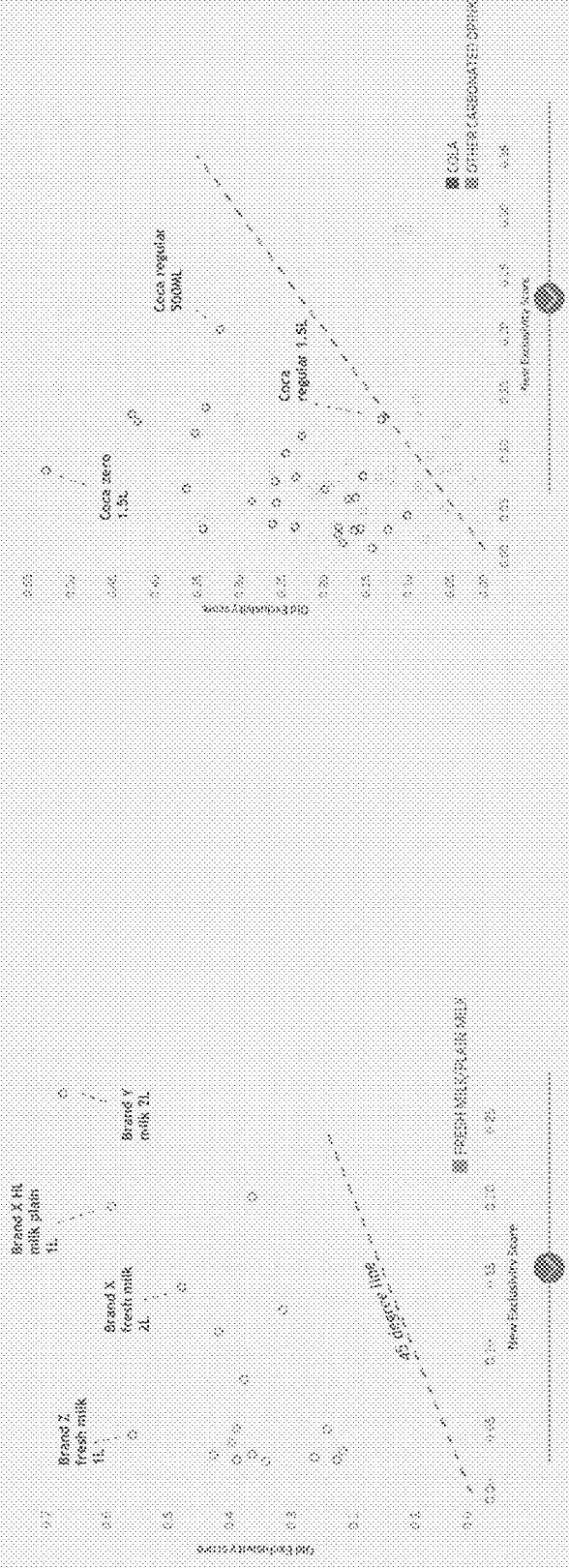

FIG. 29

Alternative method: transference can also be directly estimated if one can reliable infer out-of-stock SKUs

- Infer out-of-stock items

Infer for each store, which SKU is out-of-stock on which day, and provide the confidence estimate of the inference

- Model consumer purchasing choice

Build classification model to predicts consumer's most likely course of action in store shopping given an arbitrary set of SKUs currently in his basket and observed out-of-stock items

- Estimate transference through simulation

Use the trained model to run a simulation on a representative set of shopping baskets to estimate the transference matrix

FIG. 30

Out-of-stock items: Example method to infer out-of-stock items

1. For each store, infer which day the store is open by including only days where total store sales is positive
2. Define the list of SKUs that are sold in each store, i.e. the SKU has to be at least sold once in a particular store to be eligible for being out-of-stock
3. Calculate the daily average sales quantity for each SKU in each store.
4. Include only top 20% SKUs in terms of average daily sales and share of days without sales
5. For every SKU in a store, find all continuous periods where sales have been zero, and calculate the number of days during these periods
6. For every SKU in a store, calculate the likelihood of seeing x continuous days of zero sales by assuming the underlining sale generating process as a stochastic process. In this case, we have used Poisson distribution, where average daily sales is a proxy for the mean of the distribution.
7. For any continuous days of zero that exceed 6 days, and estimated to occur with a probability less than 5%, mark those days out-of-stock
8. For the SKUs that are out-of-stock, also calculate the confidence of the inference. This is done by taking the ratio of the actual days of continuous zero sales and the number of days without sales that happens only 5%

FIG. 31

Consumer choice modelling example: Model specification...

The model can try to predict the next thing an average consumer will do when (s)he is in the store shopping, assuming the consumer already has at least one item in his/her basket.

$$\Pr(action_i \mid n, basket_j, shelf_k)$$

Where the following can be defined as:
  $action_i$: the action consumer can take, including check out and buying one addition item from the available SKUs
  $n$: the number of SKUs in the current basket, where $n > 1$
  $basket_j$: the average vector embedding of SKUs in the current basket
  $shelf_k$: the average vector embedding of out of stock SKUs in the product group that the consumer is most likely to buy his next item from

FIG. 32

Consumer choice modelling example: ... with two example assumptions regarding consumer decision-making process

- Consumer's shopping mission and need state can be inferred by the current items (subset of items) in the shopping cart, and the order of the items put into the cart does not provide additional insight. E.g. once I know the consumer has egg and bacon in the basket, knowing whether the egg was put in first or the bacon was first does not help my prediction of what is the next action (most likely to buy baked beans)

- Item availability only matters in the product group (not all out-of-stock items in the store) where the consumer is most likely to get his next item from. Conti. prev. example: consumer wants beans for his egg and bacon, he might not get beans if Heinz Baked Beans is out-of-stock or get a different branded bean. However, whether potato is out-of-stock won't affect his decision.

FIG. 33

Estimate transference: Example formula

Given the model can derive the probability of consumer's next action given the current basket (of any size and any SKU combination) and relevant observed out-of-stock items, this can be used to answer the counterfactual: "How will an average shopping trip be different if a particular product is out-of-stock compared to in-stock?" There can be multiple ways to create a representative sample of baskets. In one example, we can use all the baskets in a given period, and can find the likelihood of getting SKU A when SKU B is out-of-stock:

$$\sum_{j=0}^{J} \Pr(\widetilde{buy\,SKU_A} \mid basket_j, shelf_k = SKU_B, n) - \Pr(\widetilde{buy\,SKU_A} \mid basket_j, shelf_k = \emptyset, n)$$

Where each basket can be a defined as an actual observed basket in the period, where one item is left out. E.g.: basket: {egg, bacon, beans} can create three fictive baskets/scenarios, i.e. $basket_1$: {bacon, bean}, $basket_1$: {egg, bean}, $basket_1$: {bacon, egg}. For each of the baskets, the corresponding product group to check item availability can be {egg product, salted meat, canned vegetable}. In the above formula: $1...j...J$ can be the baskets that contain $SKU_A$; $n$ can be the number of items bought in a basket; $k$ can be a particular category or subcategory (e.g., what is out of stock).

Example on cleaning accessories: Model can deliver transference estimates

For the top 100 SKUs for brushware and mops, the model learned by itself a positive relationship between transference and SKU similarity (measured as pairwise cosine distance), which is what one would expect.

FIG. 35

...as well as help making sense on individual SKUs

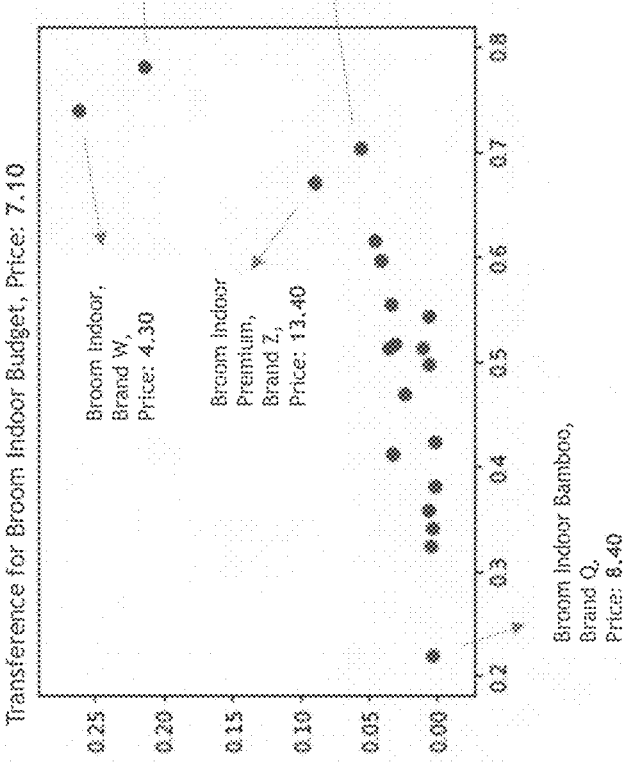

Looking at one of the top selling products - brooms, one could see that transference reveals more nuanced product differentiation than by just looking at SKU embedding similarity. Even the premium and deluxe brooms are very similar products to budget broom as they tend to be bought within similar basket, but the SKU that has the highest transference is actually another budget broom, which makes sense.

FIG. 36

SKU embedding can help estimate SKU's mark-down efficiency...

Why that is the case:

- Y-axis in the graph can represent the "true" mark-down efficiency, estimated using the existing approach
  - e.g. an estimate of 2 means 2% increase in quantity sold by a 1% price discount

- X-axis can be the predicted mark-down using only SKU embeddings as input, trained on the "true" coefficients
  Trained on the 5k most widely bought SKUs

- The scatter plot can be looking at the prediction accuracy fro the 1k out of sample SKUs

- There can be a strong, close to 1:1 correlation (i.e. red regression line), suggesting the embeddings contain information on price sensitivity of each SKU

- The predicted mark-down coefficient using embedding can be on high-level more sensible then the "true" coefficients (i.e. no negative values and more centered)

FIG. 37
...it can also contain useful information to help estimate cannibalization
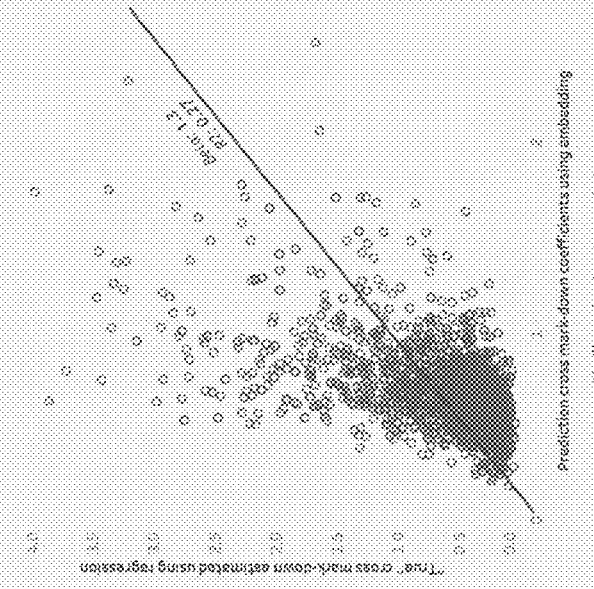
Cross mark-down/price elasticity for complements
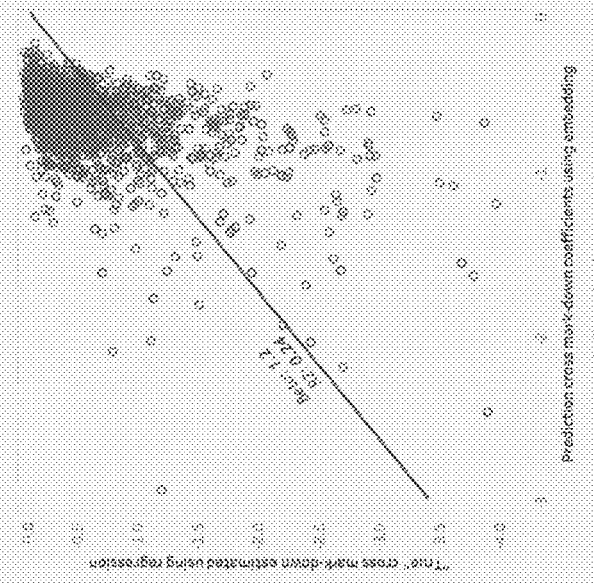
Cross mark-down/price elasticity for substitutes

FIG. 38

"True" mark-down coefficients can be estimated using a simple regression for selected popular SKUs and SKU pairs

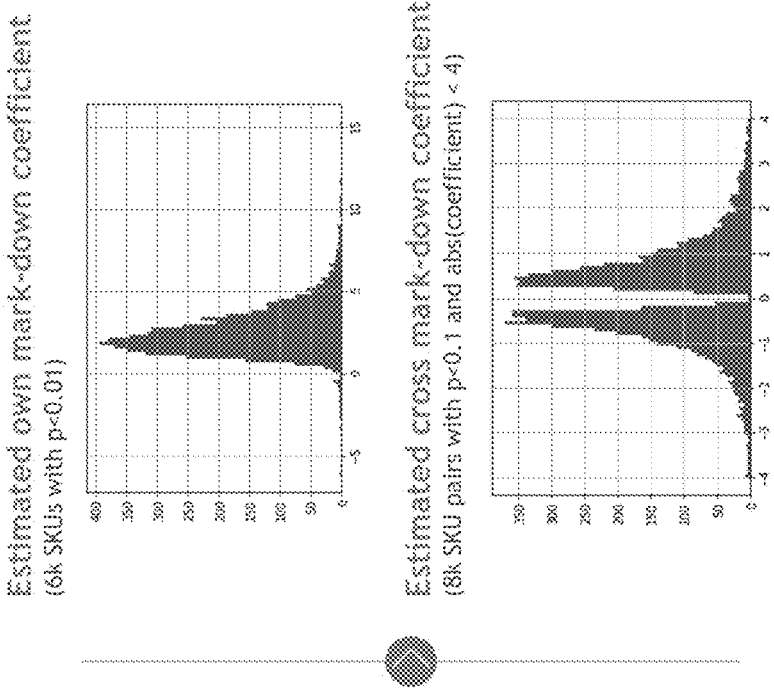

Estimated own mark-down coefficient.
(6k SKUs with p<0.01)

Estimated cross mark-down coefficient
(8k SKU pairs with p<0.1 and abs(coefficient) < 4)

*Data*
Weekly sales data worth 1 year across ~300 stores, applying following filers:
- Holiday weeks and extreme values (max and min price per SKU + store)
- For own mark-down: SKU + store that were sold less than 30 weeks in the year and SKUs with <1k sales observations
- For cross mark-down: SKU pairs with <1.5k sales observations

*Model (for each SKU )*
Target:
- log(quantity sold)
Input:
- % price discount (demeaned by each store)
- Total sales & markdown in the store for that week (excl. the SKU in focus)
- Month dummy
- Store dummy
Additional input for cross mark-down estimation:
- % demeaned price discount for one of top 5 most similar SKUs
- Weighted average % discount in the relevant category, excluding the SKU pairs SKU can pair with high cosine similarity more likely to have high cross-price sensitivity, but with large variance Example on transference estimation

Example on estimate transference / exclusivity

Example based on real retail data

```
In [1]: import os
        import sys
```

```
In [2]: sys.path.append(os.path.abspath(os.path.join(os.getcwd(), os.path.pardir)))
```

```
In [3]: # Load the necessary packages
        from src.utils.jupyter_imports import *
```

1. Load data

```
In [4]: # Assume one has already generated a 200 dimentional SKU embedding using the SKU2VEC methodology
        # Load this embedding, which will be then used for transference estimation
        df_pre_trained_embedding = load_pre_trained_sku_embedding(FN_PRE_TRAINING_EMBEDDINGS)
```

```
In [5]: # Number of unique SKUs in this dataset
        df_pre_trained_embedding.shape[0]
```

```
Out[5]: 27410
```

FIG. 40

Example on transference estimation
In [6]: # The embedding looks like this, each SKU has a 200 dimensional vector embedding centered around 0
df_pre_trained_embedding.head()
Out[6]:
| ITEM_ID | d_0 | d_1 | d_2 | d_3 | d_4 | d_5 | d_6 | d_7 | d_8 | d_9 | d_10 | d_11 | ... |
|---|---|---|---|---|---|---|---|---|---|---|---|---|---|
| 0 | -0.200202 | 0.074655 | 0.101089 | 0.103697 | 0.174836 | 0.207262 | -0.076719 | 0.019720 | -0.186966 | 0.228443 | -0.083481 | -0.101369 | -0.258 |
| 1 | -0.084370 | 0.040971 | 0.059924 | 0.341531 | -0.057199 | 0.020301 | 0.222311 | -0.148112 | -0.164406 | 0.177927 | -0.046173 | 0.121396 | -0.142 |
| 2 | -0.077025 | 0.056055 | -0.175418 | 0.431415 | 0.065770 | 0.173405 | 0.049457 | -0.119582 | -0.349974 | 0.053491 | -0.167631 | -0.026845 | -0.333 |
| 3 | -0.101816 | 0.411264 | 0.209817 | 0.159365 | -0.366825 | -0.055784 | -0.041026 | -0.195205 | -0.064916 | 0.163078 | 0.213947 | 0.062585 | -0.001 |
| 4 | -0.433312 | 0.388286 | 0.330859 | 0.353027 | 0.098519 | 0.113982 | 0.144909 | 0.095120 | -0.300682 | 0.647750 | -0.116729 | 0.085942 | 0.034 |
5 rows × 201 columns
In [7]: df_pre_trained_embedding.d_0.hist(bins = 100)
Out[7]: <matplotlib.axes._subplots.AxesSubplot at 0x295a9414108>
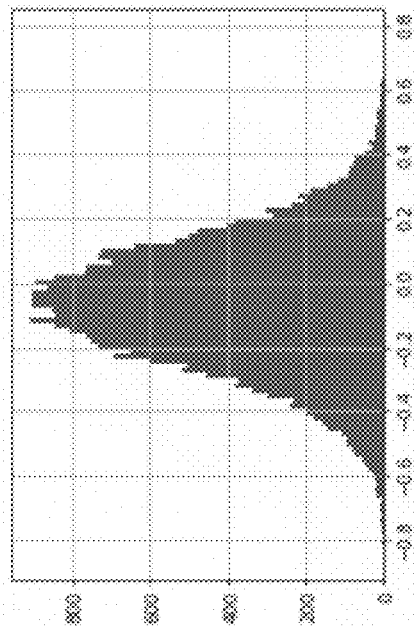
FIG. 40 - CONTINUED Example on transference estimation

```
In [8]:  # Load the transaction data
         df_full_transaction = load_cleaned_trx_data(FN_CLEANED_TRANSACTION_DATA)

C:\Users\bergsaker_alex\AppData\Local\Continuum\anaconda3\envs\tensorflow_gpuenv\lib\site-packages\pyarrow\pandas_com
pat.py:708: FutureWarning: .labels was deprecated in version 0.24.0. Use .codes instead.
  labels = getattr(columns, 'labels', None) or [
C:\Users\bergsaker_alex\AppData\Local\Continuum\anaconda3\envs\tensorflow_gpuenv\lib\site-packages\pyarrow\pandas_com
pat.py:735: FutureWarning: the 'labels' keyword is deprecated, use 'codes' instead
  return pd.MultiIndex(levels=new_levels, labels=labels, names=columns.names)
C:\Users\bergsaker_alex\AppData\Local\Continuum\anaconda3\envs\tensorflow_gpuenv\lib\site-packages\pyarrow\pandas_com
pat.py:752: FutureWarning: .labels was deprecated in version 0.24.0. Use .codes instead.
  labels, = index.labels
```

```
In [9]:  # This is the size of the data
         df_full_transaction.shape[0]
Out[9]:  32050273
```

```
In [10]: # Number of baskets
         df_full_transaction.BASKET_ID.nunique()
Out[10]: 4772127
```

```
In [11]: df_full_transaction = add_item_counts_per_basket(df_full_transaction)
```

```
In [12]: # This is how the transaction data looks like
         df_full_transaction.head()
```

Out[12]:

| | BASKET_ID | ITEM_ID | ARTICLE_DESCRIPTION | CATEGORY_DESCRIPTION | SUB_CATEGORY_DESCRIPTION | n_skus |
|---|---|---|---|---|---|---|
| 0 | 12217780 | 78192 | 200G+MILKMAID CON MILK | HOT BEVERAGE | COFFEE | 26 |
| 1 | 12217780 | 78125 | SWEETENER 1KG | LONGLIFE MILK AND CREAM | CANNED MILK & CREAM | 26 |
| 2 | 12217780 | 72115 | GIANT CHILLI RED 200G | VEGETABLES | SALAD VEGETABLES | 26 |
| 3 | 12217780 | 71155 | ASPARAGUS KG | VEGETABLES | ASPARAGUS | 26 |
| 4 | 12217780 | 58195 | BURGER FEAST CKN 650G | FROZEN MEALS | FROZEN MEAT MEALS | 26 |

FIG. 40 - CONTINUED

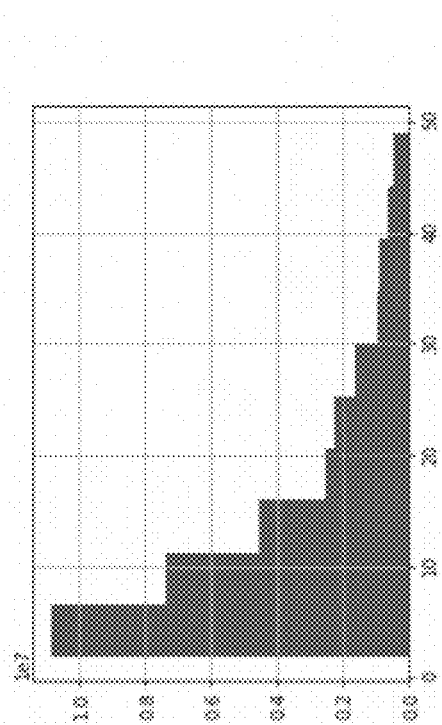
FIG. 40 - CONTINUED

Example on transference estimation

```
In [24]: list_item_id = []
         list_exclusivity_score = []
         list_n_baskets = []
         for str_sub_category in list_top_sub_categories:
             df_transaction_sub = leave_baskets_that_bought_the_relevant_subcategory(df_full_transaction,
                                                                                      str_sub_category)
             df_basket_vectors = derive_basket_vector_representation(df_transaction_sub,
                                                                     df_pre_trained_embedding)
             df_sub_targets = create_target_variable(df_full_transaction,
                                                     str_sub_category)
             df_full_training_set = add_basket_vector_representation_minus_target_item_itself(df_sub_targets,
                                                                                               df_basket_vectors,
                                                                                               df_pre_trained_embedding)
             df_X_train_mast, df_X_train, df_X_test, \
             df_y_train, df_y_test, list_X_variable, df_y_test_keep = create_raw_training_and_test_splits(df_full_training_set,
                                                                                                          fraction_to_train= C_
         TRAIN_SIZE,
                                                                                                          random_state= C_RANDO
         M_STATE)
             df_X_train, df_X_test, \
             df_y_train, df_y_test, \
             encoder_item, scalar_variables = normalize_variables_based_on_training_dataset(df_full_training_set,
                                                                                             df_X_train,
                                                                                             df_X_test,
                                                                                             df_y_train,
                                                                                             df_y_test)
             estimate_exclusibility_for_subcat = ExclusivityEstimator()
             estimate_exclusibility_for_subcat.build_tensorflow_graph(input_dim = df_X_train.shape[1],
                                                                       output_dim = df_y_train.shape[1],
                                                                       start_learning_rate = 0.025 ,
                                                                       decay_rate = 0.99,
                                                                       min_learning_rate = 0.0001,
                                                                       steps_to_decay = 1000)
             prediction = estimate_exclusibility_for_subcat.train_model(df_X_train_mast,
                                                                        list_X_variable,
                                                                        df_X_test,
                                                                        df_y_test,
                                                                        encoder_item,
                                                                        scalar_variables,
                                                                        epochs=5,
                                                                        batch_size=5)
```

FIG. 40 - CONTINUED

Example on transference estimation

```
list_item_id, list_exclusivity_score, \
list_n_baskets = estimate_exclusibity_for_subcat.calculate_exclusivity(encoder_item,
                                                                      df_full_training_set,
                                                                      df_y_test_keep,
                                                                      list_item_id,
                                                                      list_exclusivity_score,
                                                                      list_n_baskets)
```

```
22
Initialized
Start epoch 1
Epoch: 1 accuracy = 50.714434 loss = 2.147270
Start epoch 2
Epoch: 2 accuracy = 54.774103 loss = 1.498455
Start epoch 3
Epoch: 3 accuracy = 55.502251 loss = 1.455354
Start epoch 4
Epoch: 4 accuracy = 55.733064 loss = 1.437860
Start epoch 5
Epoch: 5 accuracy = 55.825700 loss = 1.430138
Accuracy on test dataset:
55.48974502949398
62
Initialized
Start epoch 1
Epoch: 1 accuracy = 16.723270 loss = 4.405120
Start epoch 2
Epoch: 2 accuracy = 20.236933 loss = 3.063244
Start epoch 3
Epoch: 3 accuracy = 21.026256 loss = 2.995986
Start epoch 4
Epoch: 4 accuracy = 21.335671 loss = 2.974881
Start epoch 5
Epoch: 5 accuracy = 21.470700 loss = 2.966958
Accuracy on test dataset:
21.37091677843194
```

3. Output and save results

FIG. 40 - CONTINUED

Example on transference estimation

In [25]: `df_exclusivity = export_result_to_csv(list_item_id, list_exclusivity_score, list_n_baskets, FN_EXCLUSIVITY_ESTIMATE)`

In [16]: *# The result looks like this, where the exclusivity is identified in the middle column*
`df_exclusivity.sort_values('baskets', ascending = False).head()`

Out[16]:

| | ITEM_ID | exclusivity | baskets |
|---|---|---|---|
| 0 | 46882 | 0.587142 | 91026 |
| 1 | 46883 | 0.266603 | 29891 |
| 2 | 46884 | 0.217089 | 26749 |
| 3 | 46885 | 0.207559 | 20258 |
| 4 | 46886 | 0.150616 | 18712 |

Source code for transference estimation

```
# SKU2VEC
Transference estimation import pandas as pd
import numpy as np
import tensorflow as tf
import matplotlib.pyplot as plt
import seaborn as sns
import os
import sys
import pyarrow
import gzip
import gc
import matplotlib
import random from sklearn.preprocessing import OneHotEncoder
from sklearn.preprocessing import StandardScaler
from sklearn.metrics import confusion_matrix
from sklearn.metrics.pairwise import cosine_similarity
from sklearn.utils import shuffle
from collections import Counter from src.utils.db_constants import * def load_pre_trained_sku_embedding(filename: str):
    embedding_table = pd.read_csv(os.path.join(PATH_INTERIM, filename), index_col=0)
    embedding_table[VAR_ITEM_ID] = 'SKU_' + embedding_table[VAR_ITEM_ID].astype(str)
    return embedding_table def load_cleaned_trx_data(filename:str):
    df_trx = pd.read_parquet(os.path.join(PATH_INTERIM, filename))
    df_trx[VAR_ITEM_ID] = 'SKU_' + df_trx[VAR_ITEM_ID].astype(str)
    df_trx[VAR_BASKET_ID] = df_trx[VAR_BASKET_ID].astype(str)
    return df_trx def add_item_counts_per_basket(transaction_table: pd.DataFrame):
    df_basket_size = transaction_table.groupby(VAR_BASKET_ID).size().reset_index(name=VAR_N_SKUS)
    transaction_table = pd.merge(transaction_table,
                    df_basket_size,
                    how='left',
                    on=VAR_BASKET_ID)
    return transaction_table def accuracy(predictions, labels):
    return 100.0 * np.sum(np.argmax(predictions, 1) == np.argmax(labels, 1)) / predictions.shape[0]

def sub_sampling(df:pd.DataFrame, threshold= 0.01):
```

FIG. 41 - CONTINUED

```python
    int_skus = list(df.ITEM_ID)
    sku_counts = Counter(int_skus)
    total_count = len(int_skus)
    freqs = {sku: count/total_count for sku, count in sku_counts.items()}
    p_drop = {sku: 1 - np.sqrt(threshold/freqs[sku]) for sku in sku_counts}
    train_skus_index = [idx for idx, sku in enumerate(int_skus) if random.random() < (1 - p_drop[sku])]
    df = df.loc[train_skus_index]
    return df def create_list_of_top_sub_categories(transaction_table: pd.DataFrame, top_n = 100):
    df_sub_categories = transaction_table.groupby(VAR_SUB_CATEGORIES).agg({VAR_BASKET_ID:
'nunique'}).reset_index()
    sub_categories = list(df_sub_categories.sort_values(VAR_BASKET_ID,
ascending=False).head(top_n)[VAR_SUB_CATEGORIES])
    return sub_categories def leave_baskets_that_bought_the_relevant_subcategory(transaction_table: pd.DataFrame, sub_cat : str):
    baskets = list(transaction_table[transaction_table[VAR_SUB_CATEGORIES] ==
sub_cat][VAR_BASKET_ID])
    df_trx_sub = transaction_table[transaction_table[VAR_BASKET_ID].isin(baskets)]
    return df_trx_sub def derive_basket_vector_representation(filtered_transaction_table: pd.DataFrame, embedding_table:
pd.DataFrame):
    df_trx_sub = pd.merge(filtered_transaction_table,
                embedding_table,
                how='inner',
                on=[VAR_ITEM_ID])
    df_trx_sub = df_trx_sub.groupby(by=[VAR_BASKET_ID]).agg('mean').reset_index()
    return df_trx_sub def create_target_variable(transaction_table: pd.DataFrame, sub_cat : str):
    df_trx_sub_cat = transaction_table[transaction_table[VAR_SUB_CATEGORIES] ==
sub_cat][[VAR_BASKET_ID, VAR_ITEM_ID]]
    return df_trx_sub_cat def add_basket_vector_representation_minus_target_item_itself(target_item_table: pd.DataFrame,
basket_vector_rep_table: pd.DataFrame, item_embedding_table: pd.DataFrame ):
    df_trx_sub_cat = pd.merge(target_item_table,
                basket_vector_rep_table,
                how='left',
                on=VAR_BASKET_ID,
                suffixes=('', '_'))
    df_trx_sub_cat = pd.merge(df_trx_sub_cat,
                item_embedding_table,
                how='left',
                on=VAR_ITEM_ID,
                suffixes=('_BAS', '_SKU'))

basket_vec = [col for col in df_trx_sub_cat.columns if ('_BAS' in col)]
    sku_vec = [col for col in df_trx_sub_cat.columns if ('_SKU' in col)]
```

FIG. 41 - CONTINUED

```
    for basket, sku in zip(basket_vec, sku_vec):
        df_trx_sub_cat[basket] = ((df_trx_sub_cat[basket]) * df_trx_sub_cat[VAR_N_SKUS] -
df_trx_sub_cat[sku]) / (
                    (df_trx_sub_cat[VAR_N_SKUS]) - 1)

df_trx_sub_cat = df_trx_sub_cat.drop(sku_vec, axis=1)
    print(df_trx_sub_cat.ITEM_ID.nunique())

return df_trx_sub_cat.reset_index()

def create_raw_training_and_test_splits(full_training_table: pd.DataFrame,
                    fraction_to_train = 0.7,
                    random_state = 42):
    X_variable = [col for col in full_training_table.columns if ('_BAS' in col)] + [VAR_N_SKUS]
    X_train_mast = full_training_table.sample(frac=fraction_to_train,
random_state=random_state).reset_index()
    X_train = full_training_table.sample(frac=fraction_to_train, random_state=random_state).reset_index()
    y_train = X_train[[VAR_ITEM_ID]]
    X_train = X_train[X_variable]
    X_test = full_training_table[
        ~full_training_table['index'].isin(list(full_training_table.sample(frac=fraction_to_train,
random_state=random_state)['index'].unique()))]
    y_test = X_test[[VAR_ITEM_ID]]
    X_test = X_test[X_variable]
    return X_train_mast, X_train, X_test, y_train, y_test, X_variable, y_test def normalize_variables_based_on_training_dataset(full_training_table, X_train, X_test, y_train, y_test):
    enc = OneHotEncoder(sparse=False)
    enc.fit(full_training_table[[VAR_ITEM_ID]])
    y_train = enc.transform(y_train)
    y_test = enc.transform(y_test)
    scaler = StandardScaler()
    scaler.fit(X_train)
    X_train = scaler.transform(X_train)
    X_test = scaler.transform(X_test)

return X_train, X_test, y_train, y_test, enc, scaler class ExclusivityEstimator:
    def __init__(self):
        self.x = None
        self.y = None
        self.y_ = None
        self.W1 = None
        self.global_step = None
        self.learning_rate = None
        self.optimizer = None
        self.grad_update_op =None
        self.train_prediction = None
        self.b1 = None
```

FIG. 41 - CONTINUED

```
    self.batch_size = None
    self.loss = None
    self.train_graph = None
    self.prediction = None def build_tensorflow_graph(self,
                input_dim,
                output_dim,
                start_learning_rate = 0.025 ,
                decay_rate = 0.99,
                min_learning_rate = 0.0001,
                steps_to_decay = 1000):

self.train_graph = tf.Graph()
    with self.train_graph.as_default():
        self.x = tf.placeholder(tf.float32, [None, input_dim], name='x')
        self.y = tf.placeholder(tf.float32, [None, output_dim], name='y')
        self.W1 = tf.Variable(tf.truncated_normal([input_dim, output_dim]), name='W1')
        self.b1 = tf.Variable(tf.zeros(output_dim), name='b1')
        self.y_ = tf.add(tf.matmul(self.x, self.W1), self.b1)
        self.loss = tf.reduce_mean(
            tf.nn.softmax_cross_entropy_with_logits(logits=self.y_, labels=self.y))

self.global_step = tf.train.get_or_create_global_step()
        self.learning_rate = tf.maximum(tf.train.exponential_decay(start_learning_rate,
                            self.global_step,
                            steps_to_decay,
                            decay_rate,
                            staircase=True), min_learning_rate)
        self.optimizer = tf.train.GradientDescentOptimizer(self.learning_rate)
        self.grad_update_op = self.optimizer.minimize(self.loss, global_step=self.global_step)
        self.train_prediction = tf.nn.softmax(self.y_, name='prediction')

def train_model(self,
        X_train_mast,
        X_variable,
        X_test,
        y_test,
        enc,
        scaler,
        epochs=20,
        batch_size=5,
        ):
    with tf.Session(config=tf.ConfigProto(device_count={'GPU': 0}), graph=self.train_graph) as sess:
        init_op = tf.global_variables_initializer()
        sess.run(init_op)
        print('Initialized')

for epoch in range(epochs):
            # X_train = sub_sampling(X_train_mast, threshold = 0.01).sample(frac = 1)
```

FIG. 41 - CONTINUED

```
        X_train = X_train_mast.sample(frac=1)
        y_train = X_train[['ITEM_ID']]
        X_train = X_train[X_variable]

y_train = enc.transform(y_train)
        X_train = scaler.transform(X_train)

total_batch = int((X_train.shape[0]) / batch_size)

list_x = [X_train[i:i + batch_size] for i in range(0, X_train.shape[0], batch_size)]
        list_y = [y_train[i:i + batch_size] for i in range(0, y_train.shape[0], batch_size)]

print('### Start epoch', (epoch + 1))
        # avg_prev = avg_cost
        avg_cost = 0
        avg_acc = 0
        for i in range(total_batch):
            _, c, predictions = sess.run([self.grad_update_op, self.loss, self.train_prediction],
                            feed_dict={self.x: list_x[i], self.y: list_y[i]})
            avg_cost += c / total_batch
            acc = accuracy(predictions, list_y[i])
            avg_acc += acc / total_batch
            # print('########### Batch NO:', (i+1), "accuracy =", "{:.3f}".format(avg_acc), "loss =",
"{:.6f}".format(avg_cost))
        print(
            "### Epoch:", (epoch + 1), "accuracy =", "{:.6f}".format(avg_acc), "loss =",
"{:.6f}".format(avg_cost))
        # if avg_cost < 3 and (epoch > 1):
        # break
        self.prediction, true = sess.run([self.train_prediction, self.y], feed_dict={self.x: X_test, self.y:
y_test})
        print('Accuracy on test dataset:')
        print(accuracy(self.prediction, true))

return self.prediction def calculate_exclusivity(self,
                enc,
                full_training_table,
                y_test,
                item_list,
                exclusivity_list,
                n_list):
    prediction = pd.DataFrame(self.prediction, columns=list(enc.get_feature_names()))
    prediction = pd.concat([y_test.reset_index(drop = True),
                prediction],
                axis=1)

for item in list(full_training_table[VAR_ITEM_ID].unique()):
        i = 'x0_' + item
        item_list.append(item)
```

FIG. 41 - CONTINUED

```
    prediction_temp = prediction[prediction[VAR_ITEM_ID] == item]
    exclusivity_list.append(prediction_temp[i].mean())
    n_list.append(prediction_temp.shape[0])

return item_list, exclusivity_list, n_list def export_result_to_csv(item_list, exclusivity_list, n_list, filename):
  df_exclusivity = pd.DataFrame({'ITEM_ID': item_list, 'exclusivity': exclusivity_list, 'baskets': n_list})
  df_exclusivity.to_csv(os.path.join(PATH_OUTPUT, filename))
  return df_exclusivity
```

Example on SKU2Vec embedding algorithms

Example on creating SKU embedding adjusting for assortment differences

Based on real retail transaction data

```
In [1]: import os
        import sys
        sys.path.append(os.path.abspath(os.path.join(os.getcwd(), os.path.pardir)))
        from src.utils.jupyter_imports import *
```

1. Load raw data

```
In [2]: df_basket_data = load_raw_trx_data(PATH_RAW, FN_GIANT_TRX_4M_RAW, TBL_TRX)
```

C:\Users\bergsaker_alex\AppData\Local\Continuum\anaconda3\envs\tensorflow_gpuenv\lib\site-packages\pyarrow\pandas_com
pat.py:752: FutureWarning: .labels was deprecated in version 0.24.0. Use .codes instead.
  labels, = index.labels

```
In [3]: # This is how the raw data looks like
        df_basket_data.head()
```

Out[3]:

| | BASKET_ID | ARTICLE | SITE |
|---|---|---|---|
| 0 | 2745517 | 5009543 | Store_1 |
| 1 | 2442229 | 5009545 | Store_2 |
| 2 | 1633013 | 5009546 | Store_3 |
| 3 | 1634520 | 5009547 | Store_4 |
| 4 | 2440605 | 5009548 | Store_5 |

FIG. 42

Example on SKU2Vec embedding algorithms

2. Transform raw data

```
In [9]:  df_basket, df_skus, site_index, unigram_counts = transform_to_training_format(df_basket_data, min_count = 50)

In [12]: df_store = generate_sku_availability_matrix_per_store(df_basket_data, site_index, df_skus, num_stores = df_basket.SITE
         .nunique())

In [22]: baskets = merge_to_baskets(df_basket, max_basket_size = 30)

In [23]: basket_list_split = create_n_grams_baskets_to_train(baskets, n_gram = 2, permutation = True)

In [24]: len(basket_list_split)

Out[24]: 52189026

In [25]: len(sub_sampling_list(basket_list_split, threshold = 0.0001))

Out[25]: 30749826
```

3. Save and load pre-processed data

FIG. 42-Continued

Example on SKU2Vec embedding algorithms

```
In [ ]: with open('basket_list_split_no_repeat_skus_all.pkl', 'wb') as fp:
            pickle.dump(basket_list_split, fp)

with open('basket_sku_list.pkl', 'wb') as fp:
            pickle.dump(df_skus, fp)

with open('basket_site_index.pkl', 'wb') as fp:
            pickle.dump(site_index, fp)

with open('basket_stores.pkl', 'wb') as fp:
            pickle.dump(df_store, fp)

with open('unigram_counts.pkl', 'wb') as fp:
            pickle.dump(unigram_counts, fp)

In [ ]: with open('basket_list_split_no_repeat_skus_all.pkl', 'rb') as fp:
            basket_list_split = pickle.load(fp)

with open('basket_stores.pkl', 'rb') as fp:
            df_store = pickle.load(fp)

with open('basket_sku_list.pkl', 'rb') as fp:
            df_skus = pickle.load(fp)

with open('unigram_counts.pkl', 'rb') as fp:
            unigram_counts = pickle.load(fp)

In [4]: len(basket_list_split)
Out[4]: 52189026
```

FIG. 42-Continued

Example on SKU2Vec embedding algorithms

In [9]: # This is the data format for the tensorflow model input
basket_list_split[0:10]

Out[9]: [[62, 4, 21],
[4, 62, 21],
[353, 16, 53],
[353, 0, 53],
[16, 353, 53],
[16, 0, 53],
[0, 353, 53],
[0, 16, 53],
[481, 15, 20],
[15, 481, 20]]

4. Set up model and train

In [6]: test_model = SKU2Vec()

In [13]: df_store.shape[0]

Out[13]: 57

FIG. 42-Continued

Example on SKU2Vec embedding algorithms

```
In [11]: test_model.build_tensorflow_graph(type = 1,
                     input_sku_n= df_skus.sku_int.nunique(),
                     output_sku_n= df_skus.sku_int.nunique(),
                     n_stores= df_store.shape[0],
                     df_store = df_store,
                     sku_embedding = 200,
                     store_embedding = 50,
                     n_sampled = 20,
                     batch_size = 32,
                     start_learning_rate = 0.025,
                     min_learning_rate = 0.0001,
                     steps_to_decay = 10000,
                     decay_rate = 0.98,
                     power = 0,
                     weight = 0.001,
                     unigram_counts = unigram_counts)

# Depending on data might need more than one epoch, also probably need to enable sub-sampling. This is just for illustration
test_model.train_model(basket_list_split,
                     path = PATH_MODEL,
                     epochs = 2,
                     GPU = False,
                     sub_sampling = True,
                     threshold = 0.01)
```

5. Visualisation

```
In [16]: def add_sku_hierarchy(df: pd.DataFrame):
             df_hier = pd.read_csv(os.path.join(PATH_RAW, FN_SKU_GIANT_HIERARCHY))
             df_hier['ARTICLE'] = pd.to_numeric(df_hier['ARTICLE'])
             df = pd.merge(df, df_hier, how = 'left', on=['ARTICLE'])
             return df
```

```
In [18]: FN_SKU_GIANT_HIERARCHY = 'sku_master_data.csv'
         sku_mapping = add_sku_hierarchy(df_skus)
```

FIG. 42-Continued

Example on SKU2Vec embedding algorithms

```
In [19]: test_model.embed_mat.shape
```

```
Out[19]: (11040, 200)
```

```
In [20]: plot_vectors = prepare_plotting(test_model.embed_mat,
                                         n_iter=1000,
                                         perplexity=20,
                                         doPCA = True)
```

```
In [21]: finalDf = pd.concat([pd.DataFrame(plot_vectors, columns = ['x_axis', 'y_axis']), sku_mapping], axis = 1)
```

FIG. 42-Continued

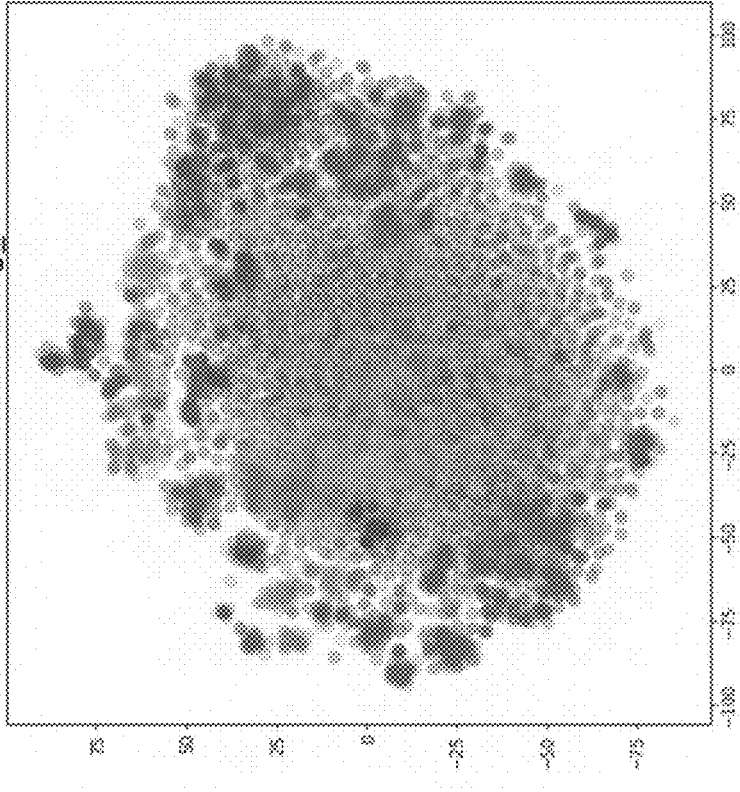
FIG. 42-Continued

FIG 43

Source code for SKU embedding

SKU2VEC
SKU embedding

```python
# coding=utf-8
import pandas as pd
import numpy as np
import tensorflow as tf
import matplotlib.pyplot as plt
import seaborn as sns
import os
import sys
import pyarrow
import gzip
import gc
import random
import matplotlib
import math
import pickle
import time
import itertools from sklearn.preprocessing import OneHotEncoder
from sklearn.utils import shuffle
from collections import Counter
from itertools import permutations
from scipy.sparse import coo_matrix, hstack
from sklearn.decomposition import PCA
from sklearn.manifold import TSNE
from sklearn.metrics.pairwise import cosine_similarity class SKU2Vec(object):
    '''
    Class wrapper for training the different TensorFlow SKU2Vec models
    ''' def __init__(self):
        self.train_graph = None
        self.input_sku = None
        self.target_sku = None
        self.cost = None
        self.global_step = None
        self.learning_rate = None
        self.optimizer = None
        self.grad_update_op = None
        self.normalized_embedding = None
        self.store_id = None
        self.batch_size = None
```

FIG 43-Continued

```
        self.feed = None def build_tensorflow_graph(self,
                    type: int,
                    input_sku_n: int,
                    output_sku_n: int,
                    n_stores: int,
                    df_store = None,
                    sku_embedding = 200,
                    store_embedding = 50,
                    n_sampled = 20,
                    batch_size = 32,
                    start_learning_rate = 0.025,
                    min_learning_rate = 0.0001,
                    steps_to_decay = 10000,
                    decay_rate=0.98,
                    power = 0,
                    weight = 0.001,
                    unigram_counts = None,
                    ):
        '''
        Building the specified neural network architecture
        :param type: can choose between {0, 1, 2, 3} where
                0 is the vanilla skip-gram Word2Vec
                1 is the manual suppression on back-ward propagation based on pre-defined SKU-assortment per store
                2 is adding store embedding to automatically adjust for assortment difference per store
                3 is a modified version combining both 1 and 2

1 is so far found to be the best solution
        :param input_sku_n: number of unique SKUs for the input column, i.e. "sku_int"
        :param output_sku_n: number of unique SKUs for the output column, i.e. "target_sku"
                input_sku_n = output_sku_n in most cases, exception if one wants to train the vector representation
                for only a fraction of the sku assortment
        :param n_stores: number of unique stores
        :param df_store: a 0/1 numpy matrix of dimension (output_sku_n, n_store), where 0 means SKU not in stock, relevant for type 1 and 3 only
        :param sku_embedding: dimension of the embedding for the sku
        :param store_embedding: dimension of the embedding for the store, only relevant for type 2 model
        :param n_sampled: size of the negative sampling
        :param batch_size: self-explanatory
        :param start_learning_rate: self-explanatory
        :param min_learning_rate: self-explanatory
        :param steps_to_decay: self-explanatory
        :param decay_rate: self-explanatory
        :param power: a number between 0 to 1, adjust for how negative sampling is conducted, 0 means sampling with uniform probability
        :param weight: weight which is applied for regularisation purposes for type 3 neural network
        :param unigram_counts: a list which provides user defined probability for negative sampling, otherwise uniform
```

FIG 43-Continued

```
:return:
''' self.batch_size = batch_size if power == 0:
    unigram_counts = [1]*output_sku_n if type == 0:
    # Mini batch vanilla Word2Vec
    self.train_graph = tf.Graph()
    with self.train_graph.as_default():
        # Specify the input matrices
        self.store_id = tf.placeholder(tf.int32, [None], name='input_store') # redundant, simply a placeholder
        self.input_sku = tf.placeholder(tf.int32, [None], name='input_sku')
        self.target_sku = tf.placeholder(tf.int64, [None], name='target_skus')

# Specify the embedding matrix
        embedding_skus = tf.Variable(tf.random_uniform((input_sku_n, sku_embedding), -1, 1), name='embedding_sku')

# Specify the hidden weight matrix
        W1 = tf.Variable(tf.truncated_normal((output_sku_n, sku_embedding)), name='W1')

# Specify the bias
        bias = tf.Variable(tf.zeros(output_sku_n), name="bias")

# Sett up negative sampling
        # Obs, there will be false negatives, but given the usual large number of unique SKUs it often has negligible effect
        sampled_values = tf.nn.fixed_unigram_candidate_sampler(
            true_classes=tf.expand_dims(self.target_sku, 1),
            num_true=1,
            num_sampled=self.batch_size * n_sampled,
            unique=True,
            range_max=len(unigram_counts),
            distortion=power,
            unigrams=unigram_counts)

sampled = sampled_values.sampled_candidates
        sampled_mat = tf.reshape(sampled, [self.batch_size, n_sampled]) # [N, K]

# Perform series of matrix operations to get cross-entropy loss
        inputs_syn0 = tf.gather(embedding_skus, self.input_sku) # [N, D]

true_syn1 = tf.gather(W1, self.target_sku) # [N, D]
        sampled_syn1 = tf.gather(W1, sampled_mat) # [N, K, D]

true_logits = tf.reduce_sum(tf.multiply(inputs_syn0, true_syn1), 1) # [N]
```

FIG 43-Continued

```
                sampled_logits = tf.reduce_sum(tf.multiply(tf.expand_dims(inputs_syn0, 1), sampled_syn1), 2)
# [N, K]

true_logits += tf.gather(bias, self.target_sku)  # [N]
                sampled_logits += tf.gather(bias, sampled_mat)

true_cross_entropy = tf.nn.sigmoid_cross_entropy_with_logits(
                    labels=tf.ones_like(true_logits), logits=true_logits)
                sampled_cross_entropy = tf.nn.sigmoid_cross_entropy_with_logits(
                    labels=tf.zeros_like(sampled_logits), logits=sampled_logits)
                self.cost = tf.concat(
                    [tf.expand_dims(true_cross_entropy, 1), sampled_cross_entropy], 1)

# Using gradient descent with exponential decaying learning rate
                self.global_step = tf.train.get_or_create_global_step()
                self.learning_rate = tf.maximum(tf.train.exponential_decay(start_learning_rate,
                                          self.global_step,
                                          steps_to_decay,
                                          decay_rate,
                                          staircase=True), min_learning_rate)
                self.optimizer = tf.train.GradientDescentOptimizer(self.learning_rate)
                self.grad_update_op = self.optimizer.minimize(self.cost, global_step=self.global_step)

# Output normalized embedding matrix
                norm = tf.sqrt(tf.reduce_sum(tf.square(embedding_skus), 1, keep_dims=True))
                self.normalized_embedding = embedding_skus / norm if type == 1:
            # Mini batch, manual suppression based on known store assortment
            self.train_graph = tf.Graph()
            with self.train_graph.as_default():
                self.store_id = tf.placeholder(tf.int32, [None], name='input_store')
                self.input_sku = tf.placeholder(tf.int32, [None], name='input_sku')
                self.target_sku = tf.placeholder(tf.int64, [None], name='target_skus')

sku_availability = tf.constant(df_store, tf.float32, name='sku_availability')
                constant_1 = tf.constant(
                    np.repeat(np.reshape(np.arange(self.batch_size) * output_sku_n, [self.batch_size, 1]),
n_sampled, axis=1), tf.int64)
                constant_2 = tf.constant(np.arange(self.batch_size) * output_sku_n, tf.int64)

embedding_skus = tf.Variable(tf.random_uniform((input_sku_n, sku_embedding), -1, 1),
name='embedding_sku')

W1 = tf.Variable(tf.truncated_normal((output_sku_n, sku_embedding)))

bias = tf.Variable(tf.zeros(output_sku_n), name="bias")

sampled_values = tf.nn.fixed_unigram_candidate_sampler(
                    true_classes=tf.expand_dims(self.target_sku, 1),
                    num_true=1,
```

FIG 43-Continued

```
        num_sampled=self.batch_size * n_sampled,
        unique=True,
        range_max=len(unigram_counts),
        distortion=power,
        unigrams=unigram_counts)

# N = batch size, D = embedding dimension, K = negative sample number
    sampled = sampled_values.sampled_candidates
    sampled_mat = tf.reshape(sampled, [self.batch_size, n_sampled])  # [N, K]

inputs_syn0 = tf.gather(embedding_skus, self.input_sku)  # [N, D]

true_syn1 = tf.gather(W1, self.target_sku)  # [N, D]
    sampled_syn1 = tf.gather(W1, sampled_mat)  # [N, K, D]

true_syn2 = tf.gather(tf.reshape(tf.gather(sku_availability, self.store_id), [-1]),
               tf.add(self.target_sku, constant_2))  # [N, D]
    sampled_syn2 = tf.gather(tf.reshape(tf.gather(sku_availability, self.store_id), [-1]),
               tf.add(sampled_mat, constant_1))  # [N, K]

true_logits = tf.multiply(true_syn2, tf.reduce_sum(tf.multiply(inputs_syn0, true_syn1), 1))  # [N]

sampled_logits = tf.multiply(tf.reduce_sum(
        tf.multiply(tf.expand_dims(inputs_syn0, 1), sampled_syn1), 2), sampled_syn2)  # [N, K]

true_logits += tf.multiply(tf.gather(bias, self.target_sku), true_syn2)  # [N]
    sampled_logits += tf.multiply(tf.gather(bias, sampled_mat), sampled_syn2)

true_cross_entropy = tf.nn.sigmoid_cross_entropy_with_logits(
        labels=tf.ones_like(true_logits), logits=true_logits)
    sampled_cross_entropy = tf.nn.sigmoid_cross_entropy_with_logits(
        labels=tf.zeros_like(sampled_logits), logits=sampled_logits)
    self.cost = tf.concat(
        [tf.expand_dims(true_cross_entropy, 1), sampled_cross_entropy], 1)

self.global_step = tf.train.get_or_create_global_step()
    self.learning_rate = tf.maximum(tf.train.exponential_decay(start_learning_rate,
                        self.global_step,
                        steps_to_decay,
                        decay_rate,
                        staircase=True), min_learning_rate)
    self.optimizer = tf.train.GradientDescentOptimizer(self.learning_rate)
    self.grad_update_op = self.optimizer.minimize(self.cost, global_step=self.global_step)

norm = tf.sqrt(tf.reduce_sum(tf.square(embedding_skus), 1, keep_dims=True))
    self.normalized_embedding = embedding_skus / norm if type == 2:
    # Mini batch, with store level embedding
    self.train_graph = tf.Graph()
```

FIG 43-Continued

```
with self.train_graph.as_default():
    self.store_id = tf.placeholder(tf.int32, [None], name='input_store')
    self.input_sku = tf.placeholder(tf.int32, [None], name='input_sku')
    self.target_sku = tf.placeholder(tf.int64, [None], name='target_skus')

embedding_skus = tf.Variable(tf.random_uniform((input_sku_n, sku_embedding), -1, 1),
name='embedding_sku')
    embedding_stores = tf.Variable(tf.random_uniform((n_stores, store_embedding), -1, 1),
                    name='embedding_store')

W1 = tf.Variable(tf.truncated_normal((output_sku_n, sku_embedding)), name='W1')
    W2 = tf.Variable(tf.truncated_normal((output_sku_n, store_embedding)), name='W2')

bias = tf.Variable(tf.zeros(output_sku_n), name="bias")

sampled_values = tf.nn.fixed_unigram_candidate_sampler(
        true_classes=tf.expand_dims(self.target_sku, 1),
        num_true=1,
        num_sampled=self.batch_size * n_sampled,
        unique=True,
        range_max=len(unigram_counts),
        distortion=power,
        unigrams=unigram_counts)

sampled = sampled_values.sampled_candidates
    sampled_mat = tf.reshape(sampled, [self.batch_size, n_sampled])  # [N, K]

inputs_syn0 = tf.gather(embedding_skus, self.input_sku)  # [N, D]
    inputs_syn1 = tf.gather(embedding_stores, self.store_id)

true_syn1 = tf.gather(W1, self.target_sku)  # [N, D]
    sampled_syn1 = tf.gather(W1, sampled_mat)  # [N, K, D]
    true_syn2 = tf.gather(W2, self.target_sku)  # [N, D]
    sampled_syn2 = tf.gather(W2, sampled_mat)  # [N, K, D]

true_logits = tf.math.add(tf.reduce_sum(tf.multiply(inputs_syn0, true_syn1), 1),
                tf.reduce_sum(tf.multiply(inputs_syn1, true_syn2), 1))  # [N]

sampled_logits = tf.math.add(
        tf.reduce_sum(tf.multiply(tf.expand_dims(inputs_syn0, 1), sampled_syn1), 2),
        tf.reduce_sum(tf.multiply(tf.expand_dims(inputs_syn1, 1), sampled_syn2), 2))  # [N, K]

true_logits += tf.gather(bias, self.target_sku)  # [N]
    sampled_logits += tf.gather(bias, sampled_mat)

true_cross_entropy = tf.nn.sigmoid_cross_entropy_with_logits(
        labels=tf.ones_like(true_logits), logits=true_logits)
    sampled_cross_entropy = tf.nn.sigmoid_cross_entropy_with_logits(
        labels=tf.zeros_like(sampled_logits), logits=sampled_logits)
    self.cost = tf.concat(
        [tf.expand_dims(true_cross_entropy, 1), sampled_cross_entropy], 1)
```

FIG 43-Continued

```
        self.global_step = tf.train.get_or_create_global_step()
        self.learning_rate = tf.maximum(tf.train.exponential_decay(start_learning_rate,
                                        self.global_step,
                                        steps_to_decay,
                                        decay_rate,
                                        staircase=True), min_learning_rate)
        self.optimizer = tf.train.GradientDescentOptimizer(self.learning_rate)
        self.grad_update_op = self.optimizer.minimize(self.cost, global_step=self.global_step)

norm = tf.sqrt(tf.reduce_sum(tf.square(embedding_skus), 1, keep_dims=True))
        self. normalized_embedding = embedding_skus / norm if type == 3:
    df_store = 1 - df_store

# Mini batch, manual + approach
    self.train_graph = tf.Graph()
    with self.train_graph.as_default():
        self.store_id = tf.placeholder(tf.int32, [None], name='input_store')
        self.input_sku = tf.placeholder(tf.int32, [None], name='input_sku')
        self.target_sku = tf.placeholder(tf.int64, [None], name='target_skus')

sku_availability = tf.constant(df_store, tf.float32, name='sku_availability')
        constant_1 = tf.constant(
            np.repeat(np.reshape(np.arange(self.batch_size) * output_sku_n, [self.batch_size, 1]),
n_sampled, axis=1), tf.int64)
        constant_2 = tf.constant(np.arange(self.batch_size) * output_sku_n, tf.int64)

embedding_skus = tf.Variable(tf.random_uniform((input_sku_n, sku_embedding), -1, 1),
name='embedding_sku')

W1 = tf.Variable(tf.truncated_normal((output_sku_n, sku_embedding)), name='W1')
        W2 = tf.Variable(tf.truncated_normal((output_sku_n, sku_embedding)), name='W2')

bias = tf.Variable(tf.zeros(output_sku_n), name="bias")

sampled_values = tf.nn.fixed_unigram_candidate_sampler(
            true_classes=tf.expand_dims(self.target_sku, 1),
            num_true=1,
            num_sampled=self.batch_size * n_sampled,
            unique=True,
            range_max=len(unigram_counts),
            distortion=power,
            unigrams=unigram_counts)

# N = batch size, D = embedding dimension, K = negative sample number
        sampled = sampled_values.sampled_candidates
        sampled_mat = tf.reshape(sampled, [self.batch_size, n_sampled])  # [N, K]

inputs_syn0 = tf.gather(embedding_skus, self.input_sku)  # [N, D]
```

FIG 43-Continued

```
true_syn1 = tf.gather(W1, self.target_sku)  # [N, D]
sampled_syn1 = tf.gather(W1, sampled_mat)  # [N, K, D]

true_syn1_1 = tf.gather(W2, self.target_sku)  # [N, D]
sampled_syn1_1 = tf.gather(W2, sampled_mat)  # [N, K, D]

true_syn2 = tf.gather(tf.reshape(tf.gather(sku_availability, self.store_id), [-1]),
            tf.add(self.target_sku, constant_2))  # [N, D]
sampled_syn2 = tf.gather(tf.reshape(tf.gather(sku_availability, self.store_id), [-1]),
            tf.add(sampled_mat, constant_1))  # [N, K]

true_logits = tf.math.add(tf.reduce_sum(tf.multiply(inputs_syn0, true_syn1), 1),
            tf.multiply(true_syn2,
                tf.reduce_sum(tf.multiply(inputs_syn0, true_syn1_1), 1)))  # [N]

sampled_logits = tf.math.add(tf.reduce_sum(
    tf.multiply(tf.expand_dims(inputs_syn0, 1), sampled_syn1), 2),
    tf.multiply(tf.reduce_sum(
        tf.multiply(tf.expand_dims(inputs_syn0, 1), sampled_syn1_1), 2), sampled_syn2))  # [N, K]

true_logits += tf.gather(bias, self.target_sku)  # [N]
sampled_logits += tf.gather(bias, sampled_mat)

true_cross_entropy = tf.nn.sigmoid_cross_entropy_with_logits(
    labels=tf.ones_like(true_logits), logits=true_logits)
sampled_cross_entropy = tf.nn.sigmoid_cross_entropy_with_logits(
    labels=tf.zeros_like(sampled_logits), logits=sampled_logits)
self.cost = tf.concat(
    [tf.expand_dims(true_cross_entropy, 1),
     tf.math.add(sampled_cross_entropy, tf.math.square(tf.multiply(tf.reduce_sum(
        tf.multiply(tf.expand_dims(inputs_syn0, 1), sampled_syn1_1), 2), sampled_syn2)) *
weight)], 1)

self.reg = tf.math.square(tf.multiply(tf.reduce_sum(
    tf.multiply(tf.expand_dims(inputs_syn0, 1), sampled_syn1_1), 2), sampled_syn2)) * 0.1 self.global_step = tf.train.get_or_create_global_step()
self.learning_rate = tf.maximum(tf.train.exponential_decay(start_learning_rate,
                        self.global_step,
                        steps_to_decay,
                        decay_rate,
                        staircase=True), min_learning_rate)
self.optimizer = tf.train.GradientDescentOptimizer(self.learning_rate)
self.grad_update_op = self.optimizer.minimize(self.cost, global_step=self.global_step)

y_ = tf.matmul(tf.gather(embedding_skus, self.input_sku), tf.transpose(W1))
self.stock = tf.matmul(tf.gather(embedding_skus, self.input_sku), tf.transpose(W2))
self.train_prediction = tf.nn.softmax(y_, name='prediction')
```

FIG 43-Continued

```
            norm = tf.sqrt(tf.reduce_sum(tf.square(embedding_skus), 1, keep_dims=True))
            self.normalized_embedding = embedding_skus / norm def train_model(self,
                basket_list_split,
                path,
                epochs = 2,
                GPU = True,
                sub_sampling = False,
                threshold = 0.001
                ):
        '''
        Training the constructed model
        :param basket_list_split: the training data must be a list where:
            the first number is the input SKU
            the second number is the target SKU
            the third number is the store Both SKU and store need to be in the format of an integer ranging from 0 to n_stores or 0 to n_skus For a basket of SKUs {0, 1, 2} bought in store 18 the following six rows should be created:
            [[0, 1, 18]
            [1, 0, 18]
            [0, 2, 18]
            [2, 0, 18]
            [1, 2, 18]
            [2, 1, 18]]
        :param path: path to save the trained model
        :param epochs: number of epochs, at least 2 for very large data sets
        :param GPU: whether to use GPU for the training
        :param sub_sampling: whether to conduct sub-sampling (down-sampling) on the input data
        :param threshold: sub-sampling threshold
        :return:
        ''' if GPU:
            with tf.Session(graph=self.train_graph) as sess:
                iteration = 1
                tot_loss = 0
                sess.run(tf.global_variables_initializer())
                saver = tf.train.Saver()

for e in range(1, epochs + 1):

if sub_sampling:
                        basket_list_split_sampled = sub_sampling_list(basket_list_split, threshold=threshold)
                        basket_list_split_sampled = shuffle(basket_list_split_sampled)
                        batches = get_batches(basket_list_split_sampled, self.batch_size)
                    else:
                        basket_list_split_sampled = shuffle(basket_list_split)
```

FIG 43-Continued

```
            batches = get_batches(basket_list_split_sampled, self.batch_size)

print('Start new epoch...')
        start = time.time()
        for sku_input, sku_target, store in batches:

self.feed = {self.store_id: store,
                self.input_sku: sku_input,
                self.target_sku: sku_target}
            train_loss, _, current_learn_rate = sess.run([self.cost, self.grad_update_op,
self.learning_rate], feed_dict=self.feed)

tot_loss += train_loss.mean()

if iteration % 50000 == 0:
                end = time.time()
                print("Epoch {}/{}".format(e, epochs),
                    "Iteration: {}".format(iteration),
                    "Learning rate: {}".format(current_learn_rate),
                    "Avg. Training loss: {:.4f}".format(tot_loss / 50000),
                    "{:.4f} sec/batch".format((end - start) / 50000))
                tot_loss = 0
                start = time.time()

# if iteration % 100000 == 0:
            #     saver.save(sess, os.path.join(PATH_MODEL_HKWEL_2, 'SKU2VEC'))
            #     print('Model progress saved')

iteration += 1
        self.embed_mat = sess.run(self.normalized_embedding)
        saver.save(sess, os.path.join(path, 'SKU2VEC'))
        print('Training finished, model saved')
    else:
        with tf.Session(config=tf.ConfigProto(device_count={'GPU': 0}), graph=self.train_graph) as sess:
            iteration = 1
            tot_loss = 0
            sess.run(tf.global_variables_initializer())
            saver = tf.train.Saver()

for e in range(1, epochs + 1):

if sub_sampling:
                    basket_list_split_sampled = sub_sampling_list(basket_list_split, threshold=threshold)
                    basket_list_split_sampled = shuffle(basket_list_split_sampled)
                    batches = get_batches(basket_list_split_sampled, self.batch_size)
                else:
                    basket_list_split_sampled = shuffle(basket_list_split)
                    batches = get_batches(basket_list_split_sampled, self.batch_size)

print('Start new epoch...')
                start = time.time()
```

FIG 43-Continued

```
            for sku_input, sku_target, store in batches:

self.feed = {self.store_id: store,
                    self.input_sku: sku_input,
                    self.target_sku: sku_target}
                train_loss, _, current_learn_rate = sess.run([self.cost, self.grad_update_op,
self.learning_rate],
                                            feed_dict=self.feed)

tot_loss += train_loss.mean()

if iteration % 50000 == 0:
                    end = time.time()
                    print("Epoch {}/{}".format(e, epochs),
                        "Iteration: {}".format(iteration),
                        "Learning rate: {}".format(current_learn_rate),
                        "Avg. Training loss: {:.4f}".format(tot_loss / 50000),
                        "{:.4f} sec/batch".format((end - start) / 50000))
                    tot_loss = 0
                    start = time.time()

# if iteration % 100000 == 0:
                # saver.save(sess, os.path.join(PATH_MODEL_HKWEL_2, 'SKU2VEC'))
                # print('Model progress saved')

iteration += 1
        self.embed_mat = sess.run(self.normalized_embedding)
        saver.save(sess, os.path.join(path, 'SKU2VEC'))
        print('Training finished, model saved')

def resume_training(self,
            basket_list_split,
            path,
            epochs=2,
            GPU=True,
            sub_sampling=False,
            threshold=0.001,
            ):
        '''
        Resume a previous trained model
        :param basket_list_split: the new set of data, format same as the original training
        :param path: the path the model is saved at
        :param epochs: number of epochs
        :param GPU: whether to use GPU for training
        :param sub_sampling: whether to do down-sampling
        :param threshold: threshold for the sub-sampling
        :return:
        '''
        if GPU:
            with tf.Session(graph=self.train_graph) as sess:
                iteration = 1
```

FIG 43-Continued

```
            tot_loss = 0
            sess.run(tf.global_variables_initializer())
            saver = tf.train.Saver()
            saver.restore(sess, tf.train.latest_checkpoint(path))

for e in range(1, epochs + 1):

if sub_sampling:
                    basket_list_split_sampled = sub_sampling_list(basket_list_split, threshold=threshold)
                    basket_list_split_sampled = shuffle(basket_list_split_sampled)
                    batches = get_batches(basket_list_split_sampled, self.batch_size)
                else:
                    basket_list_split_sampled = shuffle(basket_list_split)
                    batches = get_batches(basket_list_split_sampled, self.batch_size)

print('Start new epoch...')
                start = time.time()
                for sku_input, sku_target, store in batches:

self.feed = {self.store_id: store,
                        self.input_sku: sku_input,
                        self.target_sku: sku_target}
                    train_loss, _, current_learn_rate = sess.run([self.cost, self.grad_update_op,
self.learning_rate], feed_dict=self.feed)

tot_loss += train_loss.mean()

if iteration % 50000 == 0:
                        end = time.time()
                        print("Epoch {}/{}".format(e, epochs),
                            "Iteration: {}".format(iteration),
                            "Learning rate: {}".format(current_learn_rate),
                            "Avg. Training loss: {:.4f}".format(tot_loss / 50000),
                            "{:.4f} sec/batch".format((end - start) / 50000))
                        tot_loss = 0
                        start = time.time()

# if iteration % 100000 == 0:
                    #     saver.save(sess, os.path.join(PATH_MODEL_HKWEL_2, 'SKU2VEC'))
                    #     print('Model progress saved')

iteration += 1
            self.embed_mat = sess.run(self.normalized_embedding)
            print('Training finished')

else:
            with tf.Session(config=tf.ConfigProto(device_count={'GPU': 0}), graph=self.train_graph) as sess:
                iteration = 1
                tot_loss = 0
                sess.run(tf.global_variables_initializer())
                saver = tf.train.Saver()
```

FIG 43-Continued

```
            saver.restore(sess, tf.train.latest_checkpoint(path))

for e in range(1, epochs + 1):

if sub_sampling:
                    basket_list_split_sampled = sub_sampling_list(basket_list_split, threshold=threshold)
                    basket_list_split_sampled = shuffle(basket_list_split_sampled)
                    batches = get_batches(basket_list_split_sampled, self.batch_size)
                else:
                    basket_list_split_sampled = shuffle(basket_list_split)
                    batches = get_batches(basket_list_split_sampled, self.batch_size)

print('Start new epoch...')
                start = time.time()
                for sku_input, sku_target, store in batches:

self.feed = {self.store_id: store,
                        self.input_sku: sku_input,
                        self.target_sku: sku_target}
                    train_loss, _, current_learn_rate = sess.run([self.cost, self.grad_update_op,
self.learning_rate],
                                                   feed_dict=self.feed)

tot_loss += train_loss.mean()

if iteration % 50000 == 0:
                        end = time.time()
                        print("Epoch {}/{}".format(e, epochs),
                            "Iteration: {}".format(iteration),
                            "Learning rate: {}".format(current_learn_rate),
                            "Avg. Training loss: {:.4f}".format(tot_loss / 50000),
                            "{:.4f} sec/batch".format((end - start) / 50000))
                        tot_loss = 0
                        start = time.time()

# if iteration % 100000 == 0:
                    #   saver.save(sess, os.path.join(PATH_MODEL_HKWEL_2, 'SKU2VEC'))
                    #   print('Model progress saved')

iteration += 1
                self.embed_mat = sess.run(self.normalized_embedding)
                print('Training finished')

def sub_sampling(df: pd.DataFrame, threshold=0.01):
    '''
    This is the sub-sampling method used in the original Word2Vec
    :param df: the input has to be a pandas dataframe, where the column with SKU id is named "sku_int"
    :param threshold: the threshold controls how much the most frequent SKUs get down-sampled
    :return: pandas dataframe with same structure as the input, but down-sampled
    ''' int_skus = list(df.sku_int)
```

FIG 43-Continued

```
        sku_counts = Counter(int_skus)
        total_count = len(int_skus)
        freqs = {sku: count / total_count for sku, count in sku_counts.items()}
        p_drop = {sku: 1 - np.sqrt(threshold / freqs[sku]) for sku in sku_counts}
        train_skus_index = [idx for idx, sku in enumerate(int_skus) if random.random() < (1 - p_drop[sku])]
        df = df.loc[train_skus_index]
        return df def sub_sampling_list(sku_list, threshold= 0.01):
        int_skus = [sku[0] for sku in sku_list]
        sku_counts = Counter(int_skus)
        total_count = len(int_skus)
        freqs = {sku: count/total_count for sku, count in sku_counts.items()}
        p_drop = {sku: 1 - np.sqrt(threshold/freqs[sku]) for sku in sku_counts}
        train_skus_index = [idx for idx, sku in enumerate(int_skus) if random.random() < (1 - p_drop[sku])]
        sku_list = [sku_list[i] for i in train_skus_index]
        return sku_list def merge_to_baskets(df:pd.DataFrame, max_basket_size):
        baskets = df.groupby(by = ['BASKET_ID', 'site_int']).aggregate(list)[['sku_int']].reset_index()
        baskets_items = baskets[(baskets.sku_int.apply(len) > 1) & (baskets.sku_int.apply(len) < max_basket_size)]
        return baskets_items def create_n_grams_baskets_to_train(df: pd.DataFrame, n_gram, permutation):
        if permutation == True:
                basket_list_split = [[*list(tup), row.site_int] for index, row in df.iterrows() for tup in
                        itertools.permutations(row.sku_int, n_gram)]
        else:
                basket_list_split = [[*list(tup), row.site_int] for index, row in df.iterrows() for tup in
                        itertools.combination(row.sku_int, n_gram)]

return basket_list_split def get_batches(basket_lists, batch_size = 32):
        n_batches = len(basket_lists) // batch_size
        basket_lists = basket_lists[:n_batches * batch_size]

for idx in range(0, len(basket_lists), batch_size):
                sku_input, sku_target, store = [], [], []
                batch = basket_lists[idx:idx + batch_size]

for ii in range(len(batch)):
                        sku_input.extend([batch[ii][0]])
                        sku_target.extend([batch[ii][1]])
                        store.extend([batch[ii][2]])

yield np.array(sku_input), np.array(sku_target), np.array(store)
```

FIG 43-Continued

```
def load_raw_trx_data(path, filename: str, columns=None):
    """
    Load raw transaction data in parquet
    """
    # Load all columns if not specified
    if columns is None:
        df = pd.read_parquet(os.path.join(path, filename))
    else:
        df = pd.read_parquet(os.path.join(path, filename), columns=columns)

# Convert quantity variable to number
    df['SCAN_SALES_QTY_SALES_UOM'] = pd.to_numeric(df['SCAN_SALES_QTY_SALES_UOM'])
    df['ARTICLE'] = pd.to_numeric(df['ARTICLE'])

# Filter out any rows that is not a consumer purchase
    df = df[(df.RECORD_TYPE == '1100') & (df.SCAN_SALES_QTY_SALES_UOM > 0)]

# Get all unique baskets
    df_basket = df.groupby(['TRANX_NUMBER',
                            'TRANX_INDEX',
                            'SITE',
                            'CALENDAR_DAY',
                            'TERMINAL_ID']).agg({'SCAN_SALES_QTY_SALES_UOM': 'count', 'ARTICLE': 'nunique'})

df_basket = df_basket.reset_index().reset_index()
    df_basket = df_basket.rename(columns={"index": "BASKET_ID"})

# Merge with trx data to add basket ID
    df = pd.merge(df, df_basket[['TRANX_NUMBER',
                                 'TRANX_INDEX',
                                 'SITE',
                                 'CALENDAR_DAY',
                                 'TERMINAL_ID',
                                 'BASKET_ID']], how='left', on=['TRANX_NUMBER',
                                                                 'TRANX_INDEX',
                                                                 'SITE',
                                                                 'CALENDAR_DAY',
                                                                 'TERMINAL_ID'])

df = df[['BASKET_ID', 'ARTICLE', "SITE"]].drop_duplicates()

return df def transform_to_training_format(df: pd.DataFrame, min_count = 30):
    df_skus = df.groupby('ARTICLE').agg({"SITE": [("n", "count")]})
    df_skus.columns = df_skus.columns.droplevel()
    df_skus = df_skus[df_skus.n >= min_count].sort_values(by = ['n'], ascending = False).reset_index().reset_index()
```

FIG 43-Continued

```
    df_skus = df_skus.rename(columns = {'index':'sku_int'})
    df_baskets = pd.merge(df, df_skus, how = 'inner', on = 'ARTICLE')
    fac_array, fac_index = pd.factorize(df_baskets.SITE)
    df_baskets = pd.concat([df_baskets, pd.DataFrame(fac_array, columns = ['site_int'])], axis = 1)
    unigram_counts = list(df_baskets.groupby('sku_int').agg('count').reset_index().BASKET_ID)
    return df_baskets, df_skus, fac_index, unigram_counts def generate_sku_availability_matrix_per_store(df:pd.DataFrame, site_index, df_skus, num_stores):
    df_store = df.groupby(['ARTICLE','SITE']).agg('count').reset_index()
    df_store = pd.merge(df_store,
            pd.DataFrame(list(site_index), columns = ['SITE']).reset_index(),
            how = 'left',
            on = 'SITE').rename(columns = {'index':'site_int'}).sort_values('site_int')
    df_store['stock'] = 1
    df_store = df_store.pivot(index='ARTICLE',
            columns='site_int',
            values='stock').fillna(0)
    df_store = pd.merge(df_store, df_skus, how = 'inner', on = 'ARTICLE').sort_values(by = 'sku_int')
    df_store = df_store.iloc[:,1:num_stores+1].as_matrix().transpose()
    return df_store def prepare_plotting(sku_vectors_,
            doPCA=True,
            n_iter=1000,
            perplexity=10,
            metrics='cosine'):
    """Prepare our data for plotting"""

if doPCA:
        pca_reduction = PCA(n_components=50,
                random_state=404)
        sku_vectors = pca_reduction.fit_transform(sku_vectors_)
    else:
        sku_vectors = sku_vectors_ tsne_reduction = TSNE(n_components=2,
            perplexity=perplexity,
            n_iter=n_iter,
            random_state=404,
            metric=metrics)
    reduced_vectors = tsne_reduction.fit_transform(sku_vectors)

return reduced_vectors
```

Example of multi-banner embedding projection

Based on real retail data for one product category

```
In [9]: import os
        import sys
        sys.path.append(os.path.abspath(os.path.join(os.getcwd(), os.path.pardir)))
        from src.utils.jupyter_imports import *
```

1. Input

Assume we have two embeddings derived from two different supermarket banners/chains.
embedding_target is the vector space we want it to be transformed into,
embedding_source is the vector space we want it to be transformed from

FIG. 44

```
In [10]: embedding_target = pd.read_csv('example_1.csv', index_col = 0).reset_index(drop = True)
         embedding_target
```

Out[10]:

Example on multi-banner embedding

| | d_0 | d_1 | d_2 | d_3 | d_4 | d_5 | d_6 | d_7 | d_8 | d_9 | d_10 | d_11 | d_12 |
|---|---|---|---|---|---|---|---|---|---|---|---|---|---|
| 0 | -0.186079 | 0.161613 | 0.304672 | 0.099401 | 0.481434 | 1.695694 | 0.332655 | 0.231797 | 0.499080 | 0.652252 | -0.493748 | -0.031642 | 0.202993 |
| 1 | -0.295831 | 0.800021 | -0.096438 | -0.043598 | 0.868362 | 1.380747 | 0.882820 | 0.361278 | 0.987989 | 0.923970 | -0.563716 | -0.258882 | 0.106190 |
| 2 | 0.115867 | 0.758294 | -0.106360 | 0.090631 | 0.243524 | 1.428429 | 0.712318 | 0.262726 | 0.775710 | 0.742660 | -0.268324 | 0.242845 | 0.181274 |
| 3 | -0.115064 | 0.705401 | -0.171173 | 0.648417 | 0.194981 | 1.829558 | 0.613077 | 0.063463 | 0.722653 | 0.466671 | -0.006401 | -0.113475 | -0.167541 |
| 4 | -0.258231 | 0.742786 | -0.412757 | -0.023604 | 0.476071 | 1.544520 | 0.645509 | 0.099176 | 0.322168 | 0.805072 | -0.365493 | 0.349469 | 0.216058 |
| ... | ... | ... | ... | ... | ... | ... | ... | ... | ... | ... | ... | ... | ... |
| 197 | -0.030149 | 0.056931 | 0.220908 | -0.107080 | 0.419406 | 1.199882 | 0.387785 | 0.089563 | 0.335330 | 0.093289 | -0.082908 | 0.112870 | -0.016591 |
| 198 | 0.354855 | 0.037043 | 0.109921 | 0.145056 | 0.616608 | 0.750103 | 0.290891 | 0.104771 | -0.031620 | 0.077799 | -0.040559 | 0.198942 | -0.178446 |
| 199 | 0.293688 | 0.305656 | 0.062490 | 0.170050 | 0.373692 | 0.509350 | 0.094610 | 0.170970 | 0.172086 | 0.029837 | -0.099432 | 0.361242 | 0.138006 |
| 200 | 0.120221 | 0.190713 | 0.001297 | 0.135312 | 0.865842 | 0.803554 | 0.223857 | 0.140664 | 0.110247 | -0.217889 | -0.237137 | 0.315435 | -0.006525 |
| 201 | -0.093897 | -0.003875 | 0.361595 | 0.180642 | 0.542138 | 0.168905 | -0.005059 | -0.140864 | -0.012044 | -0.033320 | -0.130883 | 0.251962 | 0.071766 |

202 rows × 202 columns

FIG. 44 -Continued

Example on multi-banner embedding

In [11]: embedding_source = pd.read_csv('example_1.csv', index_col = 0).reset_index(drop = True)
embedding_source Out[11]:

| | d_0 | d_1 | d_2 | d_3 | d_4 | d_5 | d_6 | d_7 | d_8 | d_9 | d_10 | d_11 | d_12 |
|---|---|---|---|---|---|---|---|---|---|---|---|---|---|
| 0 | 0.034700 | 0.024794 | 0.118735 | 0.025794 | 0.098044 | 0.029591 | 0.088274 | 0.064141 | 0.137764 | 0.222138 | -0.014941 | -0.074445 | -0.036926 |
| 1 | 0.027333 | 0.013858 | 0.054104 | 0.005692 | -0.000079 | -0.007462 | -0.034680 | 0.036950 | 0.098760 | 0.076447 | -0.065775 | -0.046783 | -0.010692 |
| 2 | 0.046207 | 0.031679 | 0.012815 | -0.021072 | -0.040857 | -0.020034 | -0.017764 | 0.014568 | 0.079179 | 0.092273 | -0.010102 | -0.103196 | 0.046258 |
| 3 | 0.037823 | 0.033129 | -0.024695 | -0.030754 | 0.012844 | 0.017834 | 0.020034 | -0.041565 | 0.069244 | 0.025750 | -0.092864 | -0.125173 | 0.018142 |
| 4 | 0.093945 | 0.088684 | 0.051823 | 0.066983 | 0.052945 | 0.145522 | 0.039631 | 0.035208 | 0.101775 | 0.180358 | -0.006781 | -0.065641 | 0.007866 |
| ... | | | | | | | | | | | | | |
| 192 | 0.103458 | 0.062601 | -0.018949 | -0.094466 | -0.056342 | 0.071939 | -0.040439 | 0.061640 | -0.069270 | 0.006834 | 0.013817 | 0.090547 | 0.043430 |
| 193 | -0.081422 | -0.028218 | -0.030860 | -0.024336 | -0.078809 | -0.028252 | -0.004878 | 0.130680 | -0.013975 | -0.141986 | -0.087273 | 0.036769 | 0.085257 |
| 194 | 0.005820 | 0.016991 | -0.041782 | 0.011989 | 0.058440 | 0.108228 | 0.015700 | -0.065965 | -0.057814 | 0.008902 | -0.077056 | 0.006079 | -0.074725 |
| 195 | 0.039198 | 0.118355 | 0.164481 | -0.007245 | -0.030800 | 0.037961 | -0.035942 | 0.036537 | 0.078240 | 0.006601 | -0.081871 | -0.045944 | -0.075623 |
| 196 | 0.056608 | -0.033322 | 0.096023 | 0.101327 | -0.003862 | 0.018310 | -0.043722 | -0.087299 | 0.076663 | 0.120702 | 0.089627 | 0.011514 | 0.027397 |

197 rows × 202 columns

In [12]: print('Number of identical items across two embeddings: {}'.format(len(list(set(list(embedding_source.item_no)) & set(list(embedding_target.item_no))))))

Number of identical items across two embeddings: 146

In [13]: # embedding variable is the first 200 columns
embed_col = [col for col in embedding_source.columns if 'd_' in col]

The cosine similarity between same item in two embeddings is very low

FIG. 44 -Continued

Example on multi-banner embedding

```
In [14]:  cosine_sim = []
          for item in list(set(list(embedding_source.item_no)) & set(list(embedding_target.item_no))):
              cosine_sim.append(cosine_similarity(embedding_source[embedding_source.item_no == item][embed_col],
                               embedding_target[embedding_target.item_no == item][embed_col])[0][0])

print('The average cosine similarity of the 146 identical items is {}'.format(sum(cosine_sim) / len(cosine_sim)))

The average cosine similarity of the 146 identical items is 0.03659676424485708
```

2. Find the linear projection matrix and do the transformation

```
In [15]:  merged_embedding, total_new = linear_embedding_projection(target_embedding=embedding_target,
                                                                    source_embedding = embedding_source,
                                                                    min_obs = 100,
                                                                    weighted_by = 'abs',
                                                                    embedding_variable = embed_col)
```

Number matched SKUs: 146
Number of total unique SKUs: 253

Example on multi-learner embedding

In [17]: # This is the embedding after doing a weighted average on the merged_embedding for any identical items
This is the output that can be used for further clustering and other tasks
total_new Out[17]:

|  | d_0 | d_1 | d_2 | d_3 | d_4 | d_5 | d_6 | d_7 | d_8 | d_9 | d_10 | d_11 | d_12 |
|---|---|---|---|---|---|---|---|---|---|---|---|---|---|
| 0 | -0.044699 | 0.864023 | -0.150028 | 0.363215 | 0.619427 | 1.232182 | 0.833641 | 0.035576 | 0.921229 | 0.593405 | 0.077539 | -0.125899 | 0.217057 |
| 1 | -0.237458 | 0.745239 | -0.140677 | 0.451856 | 0.550413 | 1.525836 | 0.444357 | 0.064479 | 0.547356 | 0.438336 | 0.038253 | -0.118062 | 0.172674 |
| 2 | 0.012151 | -0.075518 | 0.051440 | -0.017258 | 0.011390 | 0.008527 | -0.073257 | 0.014295 | 0.087326 | 0.104105 | 0.004531 | -0.073036 | -0.099495 |
| 3 | -0.106500 | 0.021197 | 0.002554 | 0.024439 | -0.033382 | 0.043813 | -0.003615 | -0.002284 | 0.053645 | -0.065643 | -0.057661 | 0.005007 | 0.047862 |
| 4 | 0.051203 | 0.176694 | -0.039353 | 0.164673 | 0.456963 | 0.489214 | 0.234127 | 0.084897 | 0.378108 | 0.061121 | -0.022067 | -0.059685 | -0.113030 |
| ... | | | | | | | | | | | | | |
| 248 | 0.152233 | 0.165844 | 0.236433 | -0.034534 | 0.270293 | 0.619848 | 0.318001 | 0.082034 | 0.208079 | 0.184318 | 0.033001 | 0.257259 | -0.037154 |
| 249 | 0.089065 | 0.829805 | -0.134449 | 0.431175 | 0.874823 | 1.880268 | 0.795229 | 0.169132 | 0.958452 | 0.456035 | -0.293646 | -0.080987 | -0.023133 |
| 250 | 0.014061 | 0.208756 | 0.137277 | 0.303599 | 0.526677 | 0.403029 | 0.416329 | -0.068515 | 0.513117 | 0.193790 | -0.296050 | 0.120870 | -0.023217 |
| 251 | -0.159962 | 0.503638 | -0.167792 | 0.801178 | 0.477572 | 1.634064 | 0.368061 | 0.038095 | 1.124633 | 0.470404 | -0.150495 | 0.142918 | -0.135598 |
| 252 | 0.152521 | -0.062197 | 0.063874 | -0.042471 | 0.175803 | 0.397208 | 0.085963 | 0.238899 | 0.016007 | 0.203449 | 0.192175 | 0.117218 | -0.198676 |

253 rows × 201 columns

3. The result

The cosine similairty of the identical SKUs are now much higher after the transformation

FIG. 44 -Continued

Example on multi-banner embedding

```
In [18]: cosine_sim = []
for item in list(set(list(embedding_source.item_no)) & set(list(embedding_target.item_no))):
    cosine_sim.append(cosine_similarity(merged_embedding[(merged_embedding.item_no == item) & (merged_embedding.tag == 1)][embed_col],
                      merged_embedding[(merged_embedding.item_no == item) & (merged_embedding.tag == 0)][embed_col])[0][0]
    )
print('The average cosine similarity of the 146 identical items is {}'.format(sum(cosine_sim) / len(cosine_sim)))

The average cosine similarity of the 146 identical items is 0.7064461211542303
```

Source code for multi-banner embedding

```
# SKU2VEC
Multi-banner embedding coding=utf-8
import sys
import pandas as pd
import numpy as np
import scipy def linear_embedding_projection(target_embedding,
                source_embedding,
                min_obs,
                weighted_by,
                embedding_variable,
                ):
    '''
    Create a linear projection matrix to map one embedding onto another using a set of matching items between the two
    Both embedding input need to have the following columns:
        "item_no": the unique identifier for each SKU, this column is used to find same SKUs between two different embedding
                there has to be at least one same item_no to do the projection
        "n": the purchase frequency of a particular SKU from its original data/embedding, used for weighting when merging the embeddings
    :param target_embedding: the embedding system to be transformed to
    :param source_embedding: the embedding system to be transformed from
    :param min_obs: threshold to only include frequent SKUs to find the projection matrix
    :param weighted_by: method of weighting when merging the embeddings of the same SKU after transformation
    :param embedding_variable: the name of the columns that are embedding variables
    :return: returns two dataframe, one with the merged embedding and without being merged
    '''
    target_embedding_temp = target_embedding[target_embedding.n > min_obs]
    source_embedding_temp = source_embedding[source_embedding.n > min_obs]
    train_skus = list(set(list(target_embedding_temp.item_no)) & set(list(source_embedding_temp.item_no)))
    print('Number matched SKUs: %d' % (len(train_skus)))
    print('Number of total unique SKUs: %d' % (len(list(set(list(target_embedding.item_no.astype(int)) + list(source_embedding.item_no.astype(int)))))))
    mat_from = source_embedding_temp[source_embedding_temp.item_no.isin(train_skus)].sort_values('item_no')[embedding_variable].as_matrix()
    mat_to = target_embedding_temp[target_embedding_temp.item_no.isin(train_skus)].sort_values('item_no')[embedding_variable].as_matrix()

M = np.matmul(mat_to.transpose(), mat_from)
```

FIG. 45-Continued

```
U, S, V_t = scipy.linalg.svd(M, full_matrices=True)
W = np.dot(U, V_t)

non_embedding_variable = [col for col in source_embedding_temp.columns if col not in embedding_variable]

source_transformed = pd.DataFrame(np.matmul(W, source_embedding[embedding_variable].as_matrix().transpose()).transpose(), columns = embedding_variable)
source_transformed = pd.concat([source_transformed, source_embedding[non_embedding_variable].reset_index()], axis=1)

source_transformed['tag'] = 0
target_embedding['tag'] = 1 merged_embedding = pd.concat([source_transformed, target_embedding], axis=0)

if weighted_by == 'abs':
    total = merged_embedding.groupby('item_no')[['n']].sum().reset_index().rename(columns={'n': 'total_n'})
    total = pd.merge(merged_embedding, total, how='left', on='item_no').sort_values('item_no')
    total['share'] = total['n'] / total['total_n']
    total_share = total.groupby('item_no')[['share']].sum().reset_index().rename(columns={'share': 'total_share'})
    total = pd.merge(total, total_share, how='left', on='item_no')
    total['weight'] = total['share'] / total['total_share']
    for i in embedding_variable:
        total[i] = total[i] * total.weight
    total_new = pd.concat([total.groupby('item_no').sum().reset_index()[embedding_variable],
                total.groupby('item_no').sum().reset_index()[['item_no']]], axis=1)
    #total_new = pd.merge(total_new, sku_master, how='left', on='item_no')

if weighted_by == 'relative':
    total = merged_embedding.groupby('tag')[['n']].sum().reset_index().rename(columns={'n': 'total_n'})
    total = pd.merge(merged_embedding, total, how='left', on='tag').sort_values('item_no')
    total['share'] = total['n'] / total['total_n']
    total_share = total.groupby('item_no')[['share']].sum().reset_index().rename(columns={'share': 'total_share'})
    total = pd.merge(total, total_share, how='left', on='item_no')
    total['weight'] = total['share'] / total['total_share']
    for i in embedding_variable:
        total[i] = total[i] * total.weight
    total_new = pd.concat([total.groupby('item_no').sum().reset_index()[embedding_variable],
                total.groupby('item_no').sum().reset_index()[['item_no']]], axis=1)
    #total_new = pd.merge(total_new, sku_master, how='left', on='item_no')

return merged_embedding, total_new
```

Example on finding the optimal embedding dimension

Example to find optimal embedding dimension

Based on real retail transaction data

In [4]:
```
import os
import sys
sys.path.append(os.path.abspath(os.path.join(os.getcwd(), os.path.pardir)))
from src.utils.jupyter_imports import *
logger = create_logger(os.path.join(PATH_LOGS, 'log_' + str(int(time.time())) + '.log'))
logger.info('=========== Initialized logger ===========')
```

INFO - 03/29/20 15:24:33 - 0:00:00 - =========== Initialized logger ===========
DEBUG - 03/29/20 15:24:33 - 0:00:00 - Loaded backend module://ipykernel.pylab.backend_inline version unknown.

1. Input

In [6]:
```
# Load the raw transaction data
df_basket = load_raw_trx_data(logger, FN_GIANT_TRX_4M_RAW, TBL_TRX)
```

INFO - 01/24/20 11:21:38 - 0:00:48 - Raw data loaded 37671976 rows
INFO - 01/24/20 11:23:07 - 0:02:17 - Number of unique SKUs 24351
INFO - 01/24/20 11:23:07 - 0:02:17 - Number of unique days 79
INFO - 01/24/20 11:23:08 - 0:02:18 - First day of transaction 2019-07-01
INFO - 01/24/20 11:23:09 - 0:02:19 - Last day of transaction 2019-10-26
INFO - 01/24/20 11:23:10 - 0:02:20 - Number of unique stores 57
INFO - 01/24/20 11:23:10 - 0:02:20 - Number of unique countries 1
INFO - 01/24/20 11:23:10 - 0:02:20 - Number of unique baskets 2868411
INFO - 01/24/20 11:23:10 - 0:02:20 - Average number of unique SKU per basket 3
INFO - 01/24/20 11:23:10 - 0:02:20 - Average number of SKUs per basket 5
INFO - 01/24/20 11:23:10 - 0:02:20 - Number of transactions 14970465
INFO - 01/24/20 11:23:11 - 0:02:21 - Number of NAs in quantity sold 0

FIG. 46

Example on finding the optimal embedding dimension

In [5]: # This is how the data looks like
df_basket = df_basket[['BASKET_ID','ARTICLE']]
df_basket.head()

Out[5]:
| | BASKET_ID | ARTICLE |
|---|---|---|
| 0 | 2745517 | 500954 |
| 1 | 2442229 | 503547 |
| 2 | 1633013 | 503548 |
| 3 | 1634520 | 503975 |
| 4 | 2440605 | 500947 |

2. Run the procedure and get the result

In [17]: basket_list, df_basket = filter_data(df = df_basket,
                                      min_count = 100,
                                      max_basket_size = 50)

In [20]: noise = estimate_noise(basket_list, df_basket)

In [21]: noise

Out[21]: 0.2750588214066886

In [22]: _, _, D, _ = construct_shifted_PMI(basket_list,
                                     df_basket,
                                     negative_sample = 5)

In [23]: D

Out[23]: array([3.54959933e+03, 1.97091273e+03, 7.00700624e+02, ...,
        7.30406193e-03, 2.57423608e-13, 2.57423608e-13])

FIG. 46 - Continued

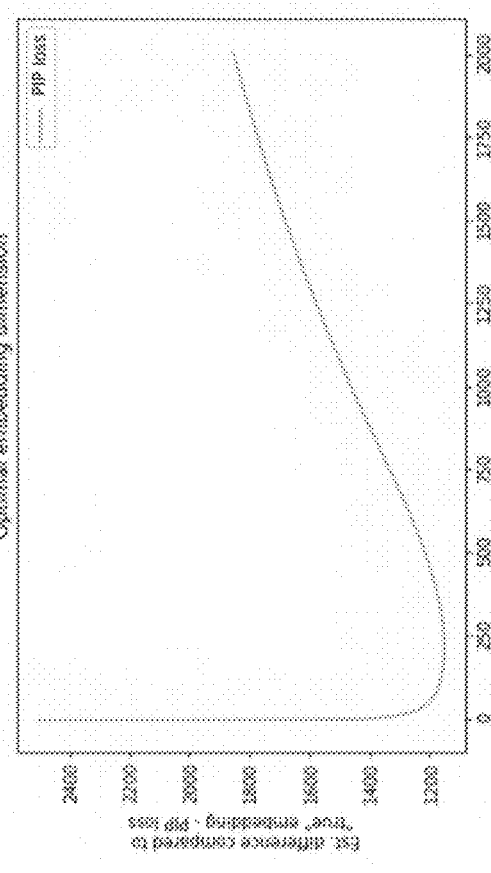
FIG. 46 - Continued

FIG. 47

Source code for optimal embedding dimension

```
# SKU2VEC
Optimal embedding dimension coding=utf-8
import sys
import pandas as pd
import numpy as np
import collections
import logging
import random
import warnings
import scipy def filter_data(df,
          min_count = 100,
          max_basket_size = 50):
    '''
    :param df: original pandas dataframe for transaction history with at least two columns:
          "BASKET_ID": the unique identifier for the basket
          "ARTICLE": the unique identifier for the SKU in the basket An example of rows could be:
          {2, 1}
          {2, 5}
          {2, 12}
          {4, 1}
          {4, 6}
    :param min_count: only include SKUs that appeared above a certain threshold
    :param max_basket_size: only include baskets that of reasonable size
    :return:
    '''
    df_basket_data = df[['BASKET_ID', 'ARTICLE']]
    df_count = df_basket_data.groupby('ARTICLE').agg({'BASKET_ID': 'count'}).reset_index()
    df_count = df_count[(df_count.BASKET_ID > min_count)]
    df_basket_data = pd.merge(df_basket_data, df_count[['ARTICLE']], how='inner', on='ARTICLE')
    df_count_basket = df_basket_data.groupby('BASKET_ID').agg({'ARTICLE': 'count'}).reset_index()
    df_count_basket = df_count_basket[(df_count_basket.ARTICLE > 1) & (df_count_basket.ARTICLE < max_basket_size)]
    df_basket_data = pd.merge(df_basket_data, df_count_basket[['BASKET_ID']], how='inner', on='BASKET_ID')
    df_basket_data['ARTICLE'] = df_basket_data['ARTICLE'].astype('category')
    df_basket_data['ARTICLE_code'] = df_basket_data['ARTICLE'].cat.codes
    df_basket_data.ARTICLE = df_basket_data.ARTICLE.astype('str')
```

FIG. 47 - Continued

```
basket_list = list(df_basket_data.groupby(by='BASKET_ID').aggregate(list)['ARTICLE_code'])

return basket_list, df_basket_data def construct_shifted_PMI(basket_list, df_basket, negative_sample = 5):
    cooccurance_count = collections.defaultdict(collections.Counter)

for basket in basket_list:
        for item_1 in basket:
            for item_2 in basket:
                cooccurance_count[item_1][item_2] += 1
            cooccurance_count[item_1][item_1] -= 1 k = negative_sample

Nij = np.zeros([df_basket.ARTICLE_code.nunique(), df_basket.ARTICLE_code.nunique()])

items = list(df_basket.ARTICLE_code.unique())

for i in range(len(items)):
        for j in range(len(items)):
            Nij[i, j] += cooccurance_count[i][j]

for i in range(len(items)):
        Nij[i, i] = 0

Ni = np.sum(Nij, axis=1)
    tot = np.sum(Nij)

with warnings.catch_warnings():
        warnings.filterwarnings("ignore")
        Pij = Nij / tot
        Pi = Ni / np.sum(Ni)
        # c.f.Neural Word Embedding as Implicit Matrix Factorization, Levy & Goldberg, 2014
        PMI = np.log(Pij) - np.log(np.outer(Pi, Pi)) - np.log(k)
        PMI[np.isinf(PMI)] = 0
        PMI[np.isnan(PMI)] = 0

U, D, V = np.linalg.svd(PMI)

return PMI, U, D, V def estimate_noise(basket_list, df_basket):
    random.shuffle(basket_list)

matrix_1, _, _, _ = construct_shifted_PMI(basket_list[:len(basket_list)//2], df_basket, negative_sample = 5)
```

FIG. 47 - Continued

```
    matrix_2, _, _, _ = construct_shifted_PMI(basket_list[len(basket_list)//2 + 1:], df_basket,
negative_sample=5)

diff = matrix_1 - matrix_2
    noise = np.std(diff) * 0.5 return noise def soft_threshold(x, tau):
    if x > tau:
        return x - tau
    else:
        return 0 def generate_random_orthogonal_matrix(shape):
    assert len(shape) == 2
    assert shape[0] >= shape[1]
    X = np.random.normal(0, 1, shape)
    U, _, _ = np.linalg.svd(X, full_matrices=False)
    return U def estimate_optimal_dimension(estimated_sigma,
                   empirical_signal,
                   alpha = 0.5):
    estimated_signal = list(
        map(lambda x: soft_threshold(x, 2 * estimated_sigma * np.sqrt(len(empirical_signal))),
empirical_signal))
    rank = len(estimated_signal)
    for i in range(len(estimated_signal)):
        if estimated_signal[i] == 0:
            rank = i
            break
    D = estimated_signal
    n = len(estimated_signal)
    sigma = estimated_sigma
    shape = (n, n)
    print("n={}, rank={}, sigma={}".format(n, rank, sigma))

D_gen = D[:rank]
    U_gen = generate_random_orthogonal_matrix((n, rank))
    V_gen = generate_random_orthogonal_matrix((n, rank))
    true_dims = range(rank)

X = (U_gen * D_gen).dot(V_gen.T)
    E = np.random.normal(0, sigma, size=shape)
    estimation_noise_E = E
    Y = X + estimation_noise_E
```

FIG. 47 - Continued

```
U, D, V = np.linalg.svd(X)
U1, D1, V1 = np.linalg.svd(Y)

embed_gt = U[:, true_dims] * (D[true_dims] ** alpha)
sim_gt = embed_gt.dot(embed_gt.T)

spectrum = D ** alpha
spectrum_est = D1 ** alpha
embed = U * spectrum
embed_est = U1 * spectrum_est sim_est = None
dumb_method = True
if dumb_method:
    time_add = 0.0
    time_norm = 0.0
    frobenius_list_est_to_gt = []
    for keep_dim in range(1, rank + 1):
        t0 = time.time()
        if sim_est is None:
            sim_est = embed_est[:, :keep_dim].dot(embed_est[:, :keep_dim].T)
        else:
            sim_est += np.outer(embed_est[:, keep_dim - 1], embed_est[:, keep_dim - 1])
        time_add += time.time() - t0
        t0 = time.time()
        sim_diff_est_to_gt = np.linalg.norm(sim_est - sim_gt, 'fro')
        time_norm += time.time() - t0
        frobenius_list_est_to_gt.append(sim_diff_est_to_gt)
        print(keep_dim)
    estimated_pip_loss = frobenius_list_est_to_gt return estimated_pip_loss def plot_pip_loss(frobenius_list_est_to_gt):
    print("optimal dimensionality is {}".format(np.argmin(frobenius_list_est_to_gt)))
    fig = plt.figure()
    ax = fig.add_subplot(111)
    ax.plot(frobenius_list_est_to_gt, 'aqua', label=r'PIP loss')
    lgd = ax.legend(loc='upper right')
    plt.title(r'Optimal embedding dimension')
    plt.xlabel('Embedding dimension')
    plt.ylabel('Est. difference compared to \n "true" embedding - PIP loss')
    fig.set_size_inches(8, 5)
```

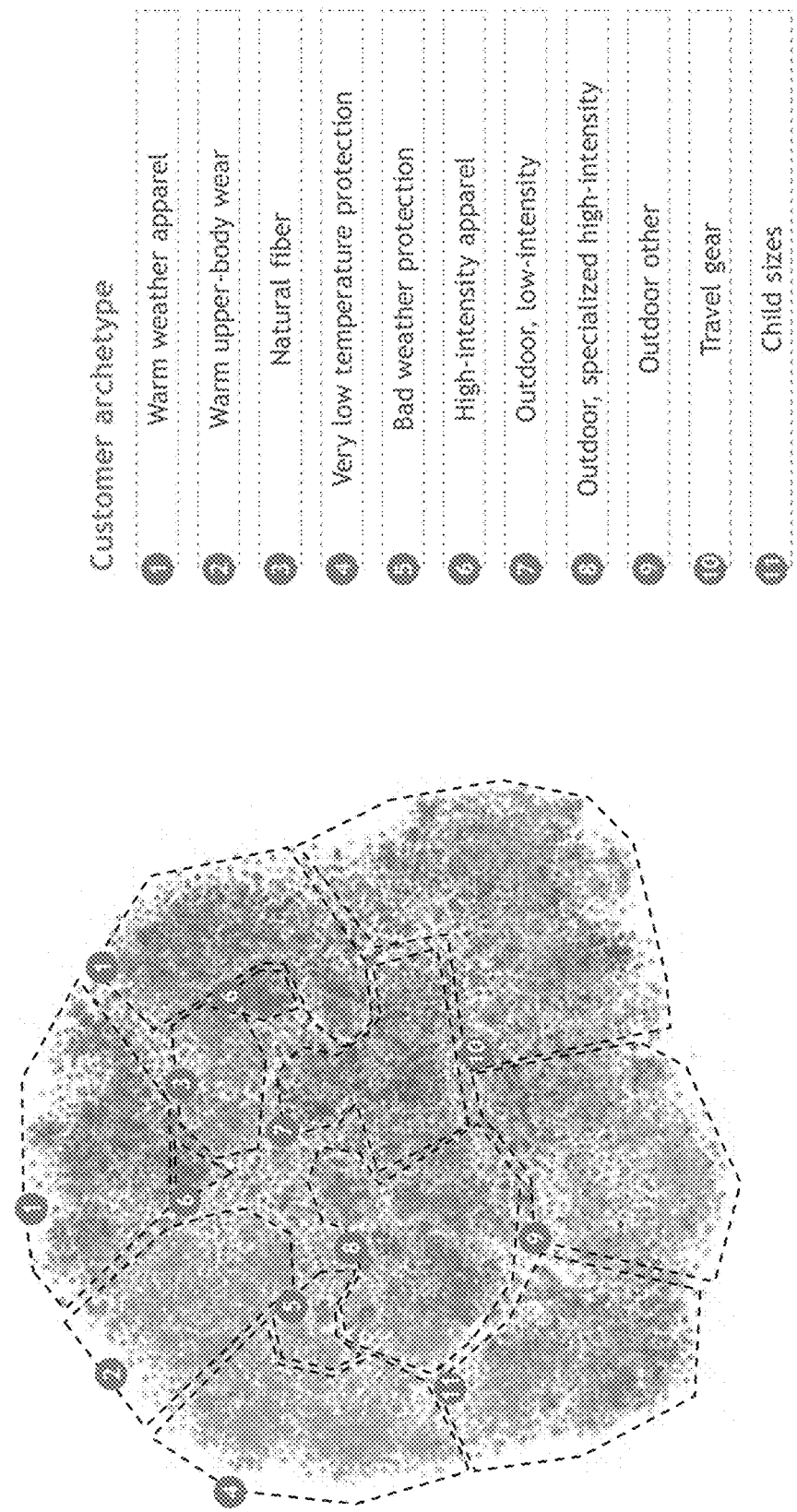
FIG. 49 - Outdoor store example: Eleven customer archetypes

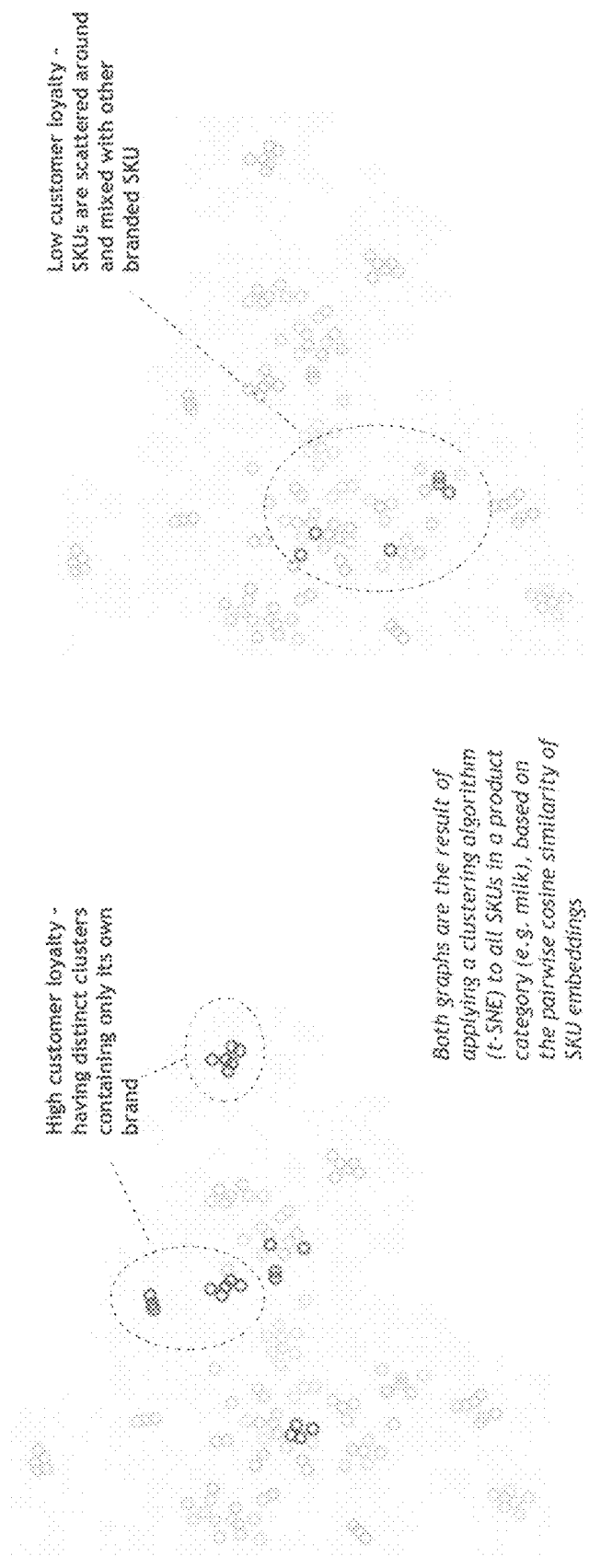
FIG. 50 - Example on optimizing range across brands

FIG. 51 - Liquor supermarket example: The algorithm identify the most important wine attributes for customers to be price

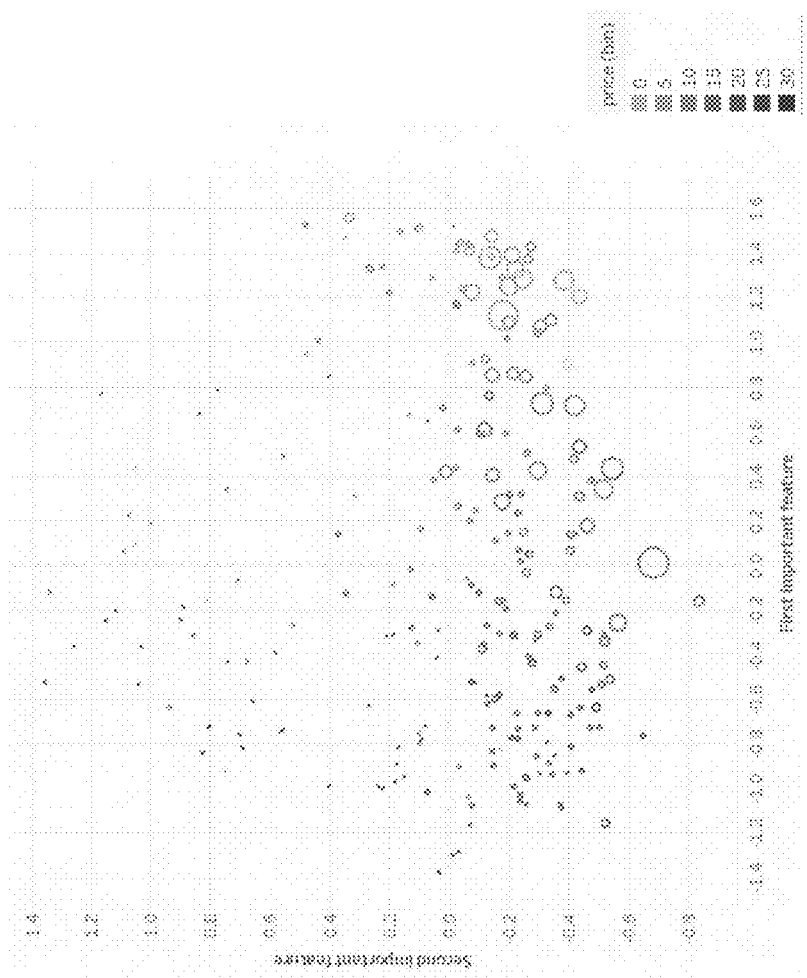

Applying principal component analysis (PCA) to a group of SKU embeddings allow one to transform the embedding to a set of new features (i.e. principal components) that correspond to a linear combination of the original embedding The new set of features are ranked by its variability. In the context of SKU embedding, it can be interpreted as ranked by its importance as a differentiator for customers, this can be both a physical or abstract product attribute The graph to the right shows the result when applying the algorithm to Syrah wines from a liquor supermarket Each dot is a wine SKU, measured along the first and second most important features, derived from PCA transformation of their SKU embeddings The color of each dot is the actual price sold One can observe a clear correlation between the X-axis and price, indicating that the first principal component is indeed a measure on price of the wine Example how to create customer embedding

FIG. 52

Prepare environment

In [1]:
```
import os
import sys import pandas as pd
import numpy as np sys.path.append(os.path.abspath(os.path.join(os.getcwd(), os.path.pardir)))

from src.utils.db_constants import *
from src.utils.logger import *
from src.data.raw_data_processing import *
from src.models.simple_sku_embedding import *
from src.models.simple_sku_clustering_and_viz import *
```

Fetch embedding from the pre-trained neural network

In [2]:
```
# Load pre-trained neutral network
sku_model = Word2Vec.load(os.path.join(PATH_LOOKUPS, 'sku2vec_2-customer-chow.mdl'))
```

In [3]:
```
# Fetch embedding for each SKU
embedding_matrix = fetch_embedding_matrix(sku_model)
```

Example how to create customer embedding

In [4]: # Example of the SKU embeddings, for each row is an SKU (by SKU ID), and a vector of 150 elements
embedding_matrix.head()

Out[4]:

| | embeddim_1 | embeddim_2 | embeddim_3 | embeddim_4 | embeddim_5 | ... | embeddim_147 | embeddim_148 | embeddim_149 | embeddim_150 | SKU_ID |
|---|---|---|---|---|---|---|---|---|---|---|---|
| 0 | -0.325889 | 2.352849 | -2.402846 | 3.743213 | -0.134744 | ... | -2.508170 | 0.025889 | 3.158143 | 4.538209 | 473182 |
| 1 | 4.830729 | -4.651423 | 6.559873 | 0.302221 | 4.980077 | ... | 1.034869 | -1.616293 | -1.878797 | 5.845765 | 685549 |
| 2 | -2.261726 | 3.741950 | -1.509064 | 4.816627 | -0.117250 | ... | -3.927777 | 1.965625 | 1.021788 | 4.626853 | 828315 |
| 3 | 3.760720 | -2.811890 | 0.119031 | 0.442316 | 0.866015 | ... | 3.592157 | -0.289340 | -0.969130 | 1.432650 | 776092 |
| 4 | -1.288893 | 5.012684 | -1.785709 | 1.593830 | 2.912938 | ... | -0.187209 | 1.188433 | 0.544804 | 1.037895 | 783653 |

5 rows × 151 columns

Example of derive average embedding of a customer based on SKUs bought

Example customer has bought SKU "473182" and "685549", the representation of the customer would be the average of the two SKU embeddings

FIG. 52 - CONTINUED

Example how to create customer embedding

In [5]: # This is the SKU embedding of SKU 473182
embedding_matrix[embedding_matrix.SKU_ID == '473182']

Out[5]:
| | embeddim_1 | embeddim_2 | embeddim_3 | embeddim_4 | embeddim_5 | ... | embeddim_147 | embeddim_148 | embeddim_149 | embeddim_150 | SKU_ID |
|---|---|---|---|---|---|---|---|---|---|---|---|
| 0 | -0.325889 | 2.352849 | -2.402846 | 3.743213 | -0.134744 | ... | -2.50817 | 0.025889 | 3.158143 | 4.538209 | 473182 |

1 rows × 151 columns

In [6]: # This is the SKU embedding of SKU 685549
embedding_matrix[embedding_matrix.SKU_ID == '685549']

Out[6]:
| | embeddim_1 | embeddim_2 | embeddim_3 | embeddim_4 | embeddim_5 | ... | embeddim_147 | embeddim_148 | embeddim_149 | embeddim_150 | SKU_ID |
|---|---|---|---|---|---|---|---|---|---|---|---|
| 1 | 4.830729 | -4.651423 | 6.559873 | 0.302221 | 4.980077 | ... | 1.034869 | -1.616293 | -1.878797 | 5.845765 | 685549 |

1 rows × 151 columns

FIG. 52 - CONTINUED

Example how to create customer embedding

In [7]: `# The customer embedding in this case is the average of the SKU embedding of #473182 and #685549, with the same length.`
`# Example the first element is 2.252420 = (-0.325889 + 4.830729) / 2`
`single_customer_embedding = pd.DataFrame(embedding_matrix[embedding_matrix.SKU_ID.isin(['473182', '685549'])].sum() / 2`
`,`
`columns = ['cust_embedding'])[:150]`

`single_customer_embedding`

Out[7]:

| | cust_embedding |
|---|---|
| embeddim_1 | 2.252420 |
| embeddim_2 | -1.149287 |
| embeddim_3 | 2.078514 |
| embeddim_4 | 2.022717 |
| embeddim_5 | 2.422667 |
| ... | ... |
| embeddim_146 | 3.089506 |
| embeddim_147 | -0.736650 |
| embeddim_148 | -0.795202 |
| embeddim_149 | 0.639673 |
| embeddim_150 | 5.191987 |

150 rows × 1 columns

FIG. 52 - CONTINUED

FIG. 53 - Examples on how to use SKU embedding for range decision

Approach A:
Determine range (what to stock) by store clusters
- Create store embedding by either a method of aggregation (e.g. averaging) of all SKUs sold in the store, or directly from neural network with architecture analogous to Doc2Vec
- Cluster the store embeddings based on measured distance between them, using either t-SNE, K-means or any other clustering algorithm
  - What often happens is that stores with similar customers (in terms of what they shop) may tend to cluster together
- Determine range per store cluster (instead of each store)
  - Within each cluster of stores, identify the most bought and least bought items (often within a product category)
  - Use this information to determine which SKU or SKU types to stock more or less per store cluster

Approach B:
Determine range across all stores
- Create a list of SKU candidates to delist (often for each product category), by the following criteria:
  - Have other SKUs adjacent to it (measure by SKU vector similarity, e.g. cosine distance)
  - Low sales volume relative to adjacent SKUs
- Create a list of brand candidates to delist, by the following criteria:
  - For all SKUs belonging to the brand, there are always SKUs from other brand adjacent to them
  - Low sales volume relative to adjacent SKUs
- The same can be done, by using the opposite criteria, to create list of SKUs and brands that are likely to have loyal customers or alone stand for key customer needs. By adding new SKUs similar to them, one might increase total sales and reduce supplier bargaining power

SYSTEMS FOR GENERATING VECTORS FOR STOCK KEEPING UNITS USING A NEURAL NETWORK

CROSS-REFERENCE TO RELATED APPLICATIONS

This application claim priority to Provisional Application No. 63/003,527 filed Apr. 1, 2020. The entirety of the above-listed application is incorporated herein by reference.

BACKGROUND

All of the following background articles are hereby incorporated by reference in their entireties:

Conneau, A., Lample, G., Ranzato, M. A., Denoyer, L., & Jégou, H. (2017). Word translation without parallel data. arXiv preprint arXiv:1710.04087.

Yin, Z., & Shen, Y. (2018). On the dimensionality of word embedding. In Advances in Neural Information Processing Systems (pp. 887-898).

Mikolov, Tomas, et al. "Distributed representations of words and phrases and their compositionality." Advances in neural information processing systems. 2013.

Mikolov, Tomas, et al. "Efficient estimation of word representations in vector space." arXiv preprint arXiv: 1301.3781 (2013).

Le, Quoc, and Tomas Mikolov. "Distributed representations of sentences and documents." International conference on machine learning. 2014

A Gentle Introduction to Doc2Ved: https://medium.com/wisio/a-gentle-introduction-to-doc2vec-db3e8c0cce5e).

BRIEF DESCRIPTION OF THE FIGURES

FIGS. 1-6 illustrate various examples related to SKU2VEC, according to aspects of the disclosure.

FIGS. 7-12 illustrate various examples related to embeddings, according to aspects of the disclosure.

FIGS. 13-22 illustrate various examples related to clustering, according to aspects of the disclosure.

FIGS. 23-35 illustrate various examples related to transference estimation, according to aspects of the disclosure.

FIGS. 36-39 illustrate various examples related to pricing, according to aspects of the disclosure.

FIGS. 40-41 illustrate example flow and code that can be used in estimate transference/exclusivity, according to aspects of the disclosure.

FIGS. 42-43 illustrate example flow and code that can be used in creating SKU embedding adjusting for assortment differences, according to aspects of the disclosure.

FIGS. 44-45 illustrate example flow and code that can be used in multi-banner embedding projection, according to aspects of the disclosure.

FIGS. 46-47 illustrate example flow and code that can be used to help find optimal embedding dimensions, according to aspects of the disclosure.

FIG. 49 illustrates an example of customer segmentation, according to aspects of the disclosure.

FIG. 50 illustrates an example of optimizing a range across brands, according to aspects of the disclosure.

FIG. 51 illustrate an example of finding and ranking the most important attributes that differentiate customers, according to aspects of the disclosure.

FIG. 52 illustrates an example of embedding of a collection using averaging, according to aspects of the disclosure.

FIG. 53 illustrates an example of how to use SKU embeddings for range decision, according to aspects of the disclosure.

DETAILED DESCRIPTION OF ASPECTS OF THE DISCLOSURE

Word2Vec

Word2vec can be a technique for expressing words as vectors. With word2vec, words with similar meaning can be shown to have similar vectors. In addition, word2vec can capture elements of the meaning of the words so that word arithmetic can be used. For example, FIG. 1 illustrates several vectors for various words.

Figure 1:
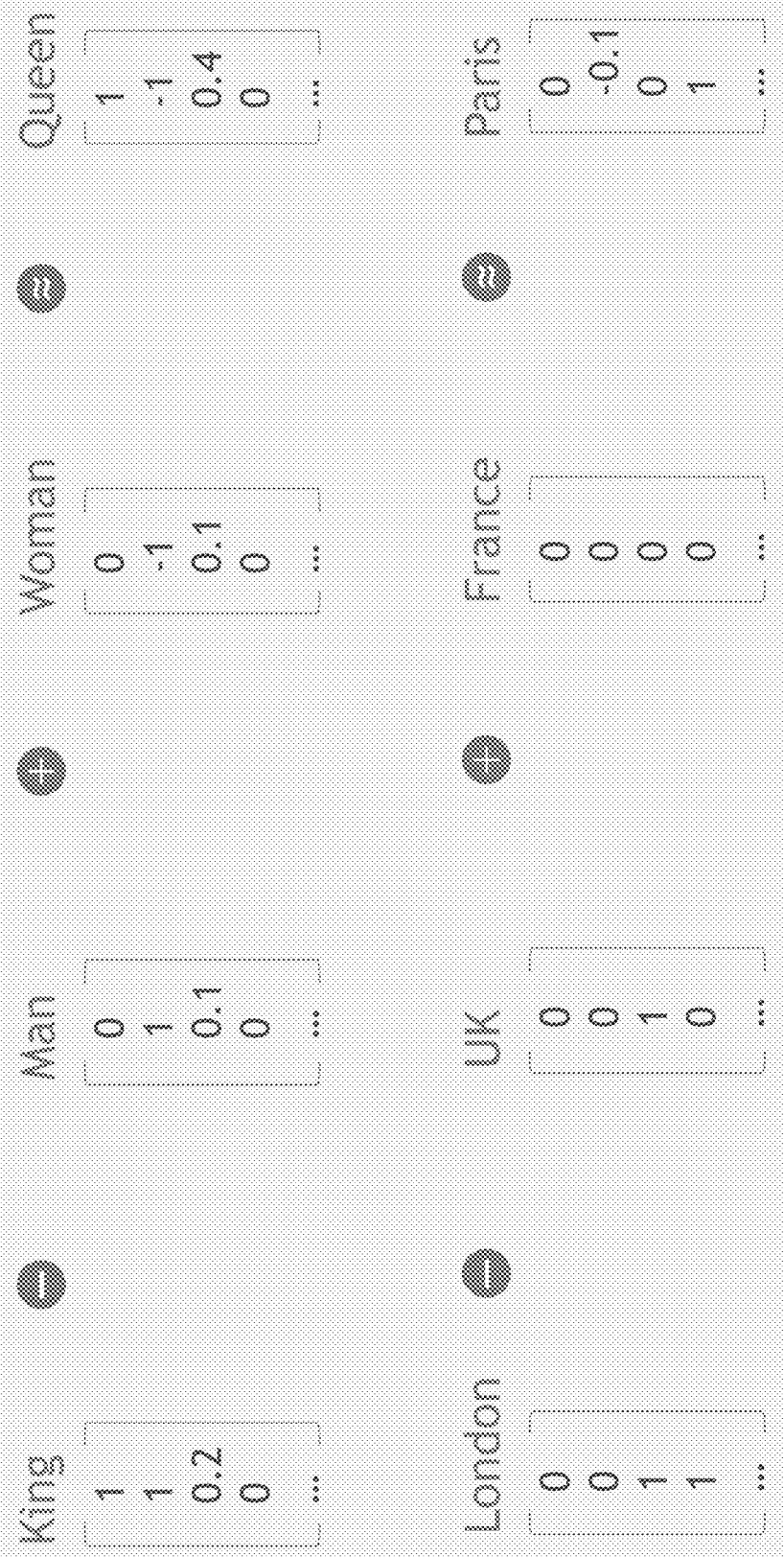

In FIG. 1, the top row indicates that if we take the vector for "king" and subtract from each number in it the number in the corresponding position in the vector for "queen," then add the numbers in the "woman" vector and try to find the vector which has the closest numbers to the answer we just calculated, it turns out the vector we find corresponds to "queen." Of course this can be the instinctive "human" answer for an English speaker.

Doc2Vec

Doc2Vec can be a technique used to create a numeric representation of a document, regardless of its length. But unlike words, documents do not come in logical structures such as words, so the another document-unique vector is used. Thus, in Doc2Vec, instead of using just words to predict the next word, document features are also used. Thus, when training the word vectors, a document vector D is trained as well, and in the end of training, it holds a numeric representation of the document. More information on Doc2Vec can be found in the following document, which is herein incorporated by reference in its entirety: Le, Quoc, and Tomas Mikolov. "Distributed representations of sentences and documents." International conference on machine learning. 2014 (found at: https://medium.com/wisio/a-gentle-introduction-to-doc2vec-db3e8c0cce5e).

SKU2Vec

FIGS. 1-6 illustrate various examples related to SKU2VEC, according to aspects of the disclosure. In aspects of the disclosure, a neural network can be used with a computer system such that the neural network can be trained to answer one of two questions: 1) Is word A likely to be found in the same sentence as word B ('bag of words model')? And 2) Is word A likely to be found at a distance of 1, 2, . . . n words from word B, in the same sentence ('skip-gram model')? The sentences used for training may be a large sample of the language in question (e.g., the whole of Wikipedia in English).

Sku2vec can be analogous to word2vec, where "words" can be replaced by "SKUs" and "sentences" can be replaced by, for example, "SKUs", such as SKUs bought in a same transaction (e.g., "baskets")," in a same store, or by a customer, or any combination thereof. SKU, which stands for "Stock Keeping Unit" is an acronym that can be used in retail to mean a granular description of an item sold by a retailer. For example: "Hovis granary seeded brown thick-sliced bread, 400 g" and "Tropicana organic orange juice with juicy bits 750 ML" can be (hypothetical) descriptions of a grocery SKU. The "Tropicana organic orange juice with juicy bits 750 ML" example SKU can be transformed to an example vector of 200-dimension, e.g. [−0.18607, 0,161613, 0.304672, . . . 1.69594, −0.493748].

Online and/or physical stores can have thousands or millions of SKUs for the inventory in the online store and/or in the physical store.

SKU2Vec can help with retail analytics. In some aspects of the disclosure, the method can require minimal data and infrastructure. In some aspects, only data that are most commonly found in all retailers can be used, and the data can be run on a local computer. SKU2Vec can be applied in many retail cases, and can help solve client's challenges that could not be done with existing approaches.

With sku2vec, SKUs can be represented as vectors. The vectors can be a sequence of numbers (e.g., 100 numbers, or any other amount of numbers). In some aspects of the disclosure, SKU order may not be relevant in a shopping basket. Thus, for example, a "bag of words" model may be more applicable in this case than, for example, a "skip-gram" model. (See, e.g., the following references for background information: Mikolov, Tomas, et al. "Distributed representations of words and phrases and their compositionality." Advances in neural information processing systems. 2013. Mikolov, Tomas, et al. "Efficient estimation of word representations in vector space." arXiv preprint arXiv:1301.3781 (2013).) However, in other aspects of the disclosure, SKU order may be relevant.

Figure 2:
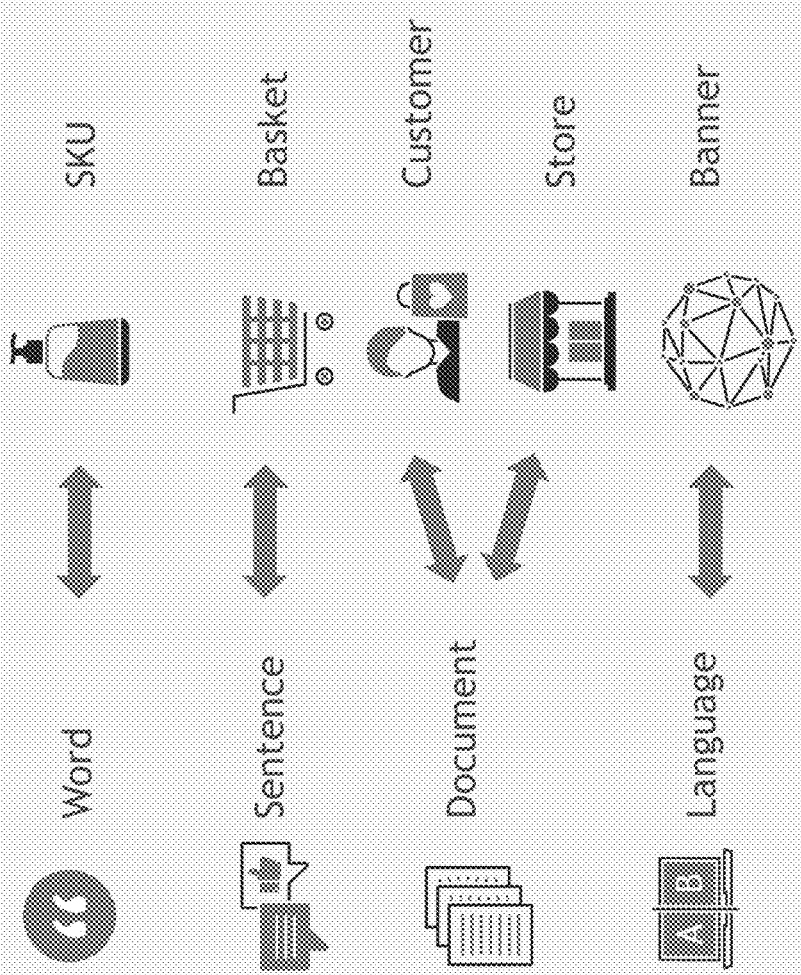

FIG. 1 illustrates how a semantic relationship can be captured by translating words to vectors. FIG. 2 illustrates how SKU2Vec can be inspired from natural language processing. FIG. 3 illustrates how SKU2Vec can utilize the vast amount of transaction data in retail to generate insight. For example, one can define an item based on what it is bought together with. One can require only customer basket purchase data. One can use an AI algorithm to convert each SKU to a series of numbers. Then one can correctly map out product relationships for all SKUS. FIG. 4 illustrates how SKUs that are bought in similar baskets may be close substitutes. FIGS. 5-6 illustrates several example cases.

In some aspects of the disclosure, doc2vec can also be used to with SKU2vec to group "words" (SKUs) together to represent collections of SKUS (everything customer bought, everything a store sold, or everything in basket, or any combination thereof).

Embeddings Examples

FIGS. 7-12 illustrate various examples related to embeddings, according to aspects of the disclosure. Embeddings may be helpful in some embodiments. Embeddings (e.g., vector representations of SKUs) can reduce something with a large number of dimensions (e.g., whether or not a SKU is one of many thousands of possibilities) to a smaller number (e.g., 100 numbers, where the similarity between items has real-world meaning).

Figure 7:
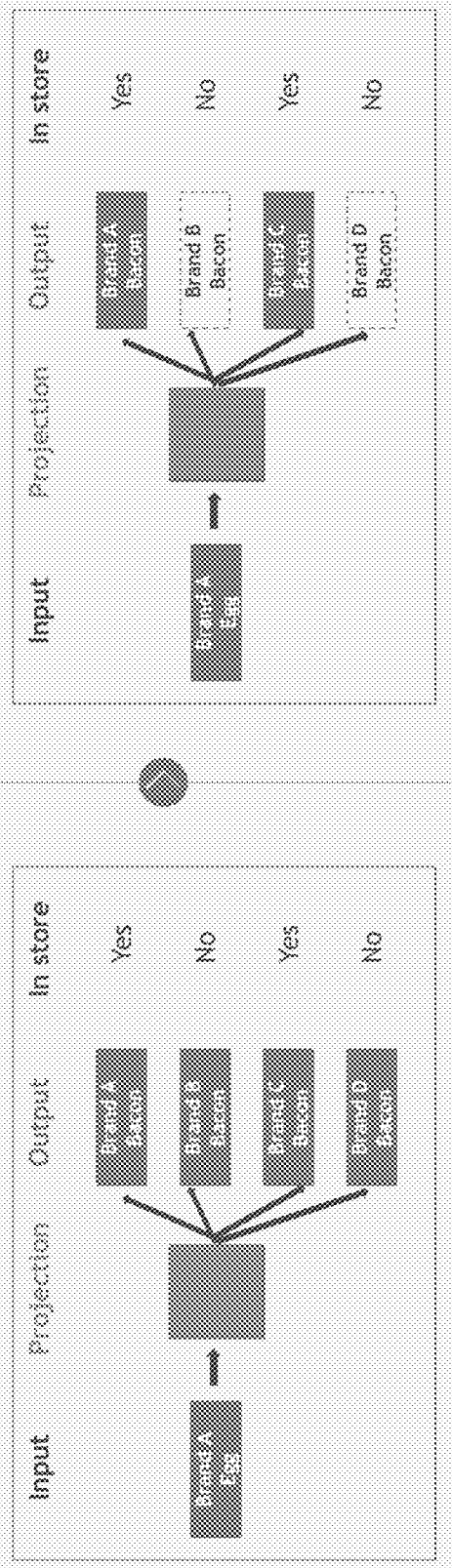
Figure 10:
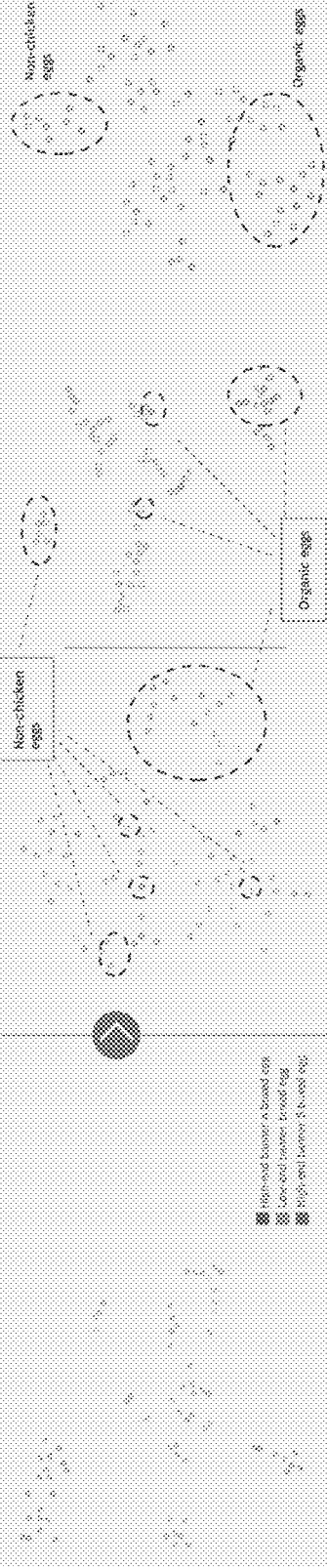
Figure 12:
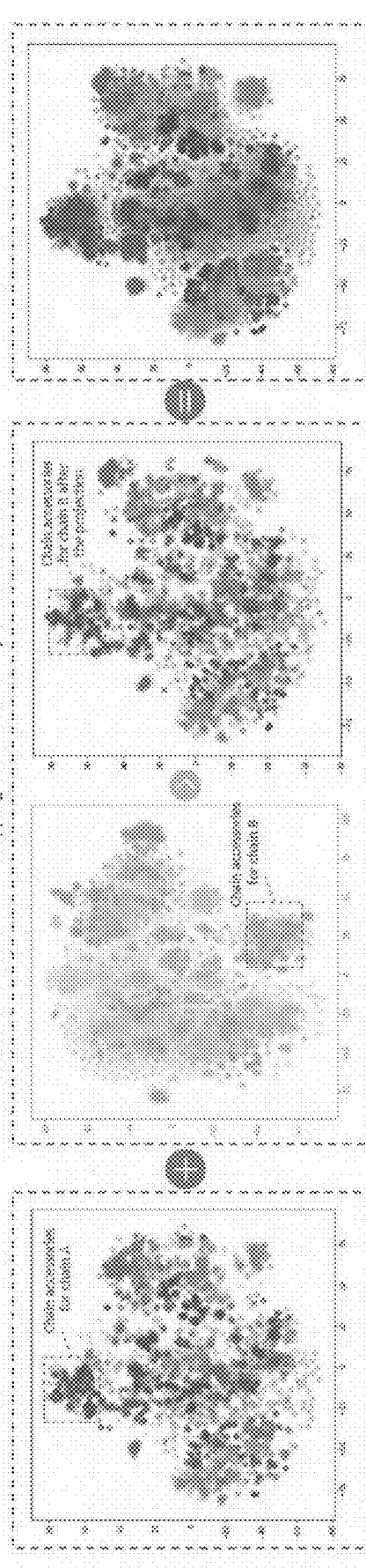

FIG. 7 illustrates how SKU2Vec can be a modified version of Word2Vec, according to aspects of the disclosure. FIG. 8 illustrates how embedding can perform better at reducing bias caused by assortment differences across stores. FIG. 9 illustrates how banner assortment differences can be found by applying embedding (e.g., multi-banner supervised embedding). (A banner can be a different brand of a store. For example, Old Navy and Gap can be different banners owned by the same company. Multi-banner supervised embedding can be used to generate a single embedding that covers multiple banners.) FIG. 10 illustrates how SKU2Vec can product more robust results than Word2Vec in aspects of the disclosure. FIG. 11 illustrates how an example optimal embedding dimension can be estimated for a large supermarket chain, according to aspects of the disclosure. FIG. 12 illustrates examples of applying multilingual supervised embedding to help derive uniform product grouping across retail chains where non-overlapping SKUs occur frequently.

FIGS. 42-43 illustrate example flow and code that can be used in creating SKU embedding adjusting for assortment differences, according to aspects of the disclosure. FIG. 43 illustrates example code that can be used to set up the neural network. FIG. 42 illustrates example steps that can be taken to use the neural network to create SKU embeddings adjusting for assortment differences. Note that the steps can be done in other orders than those shown in the figures.

Figure 44:
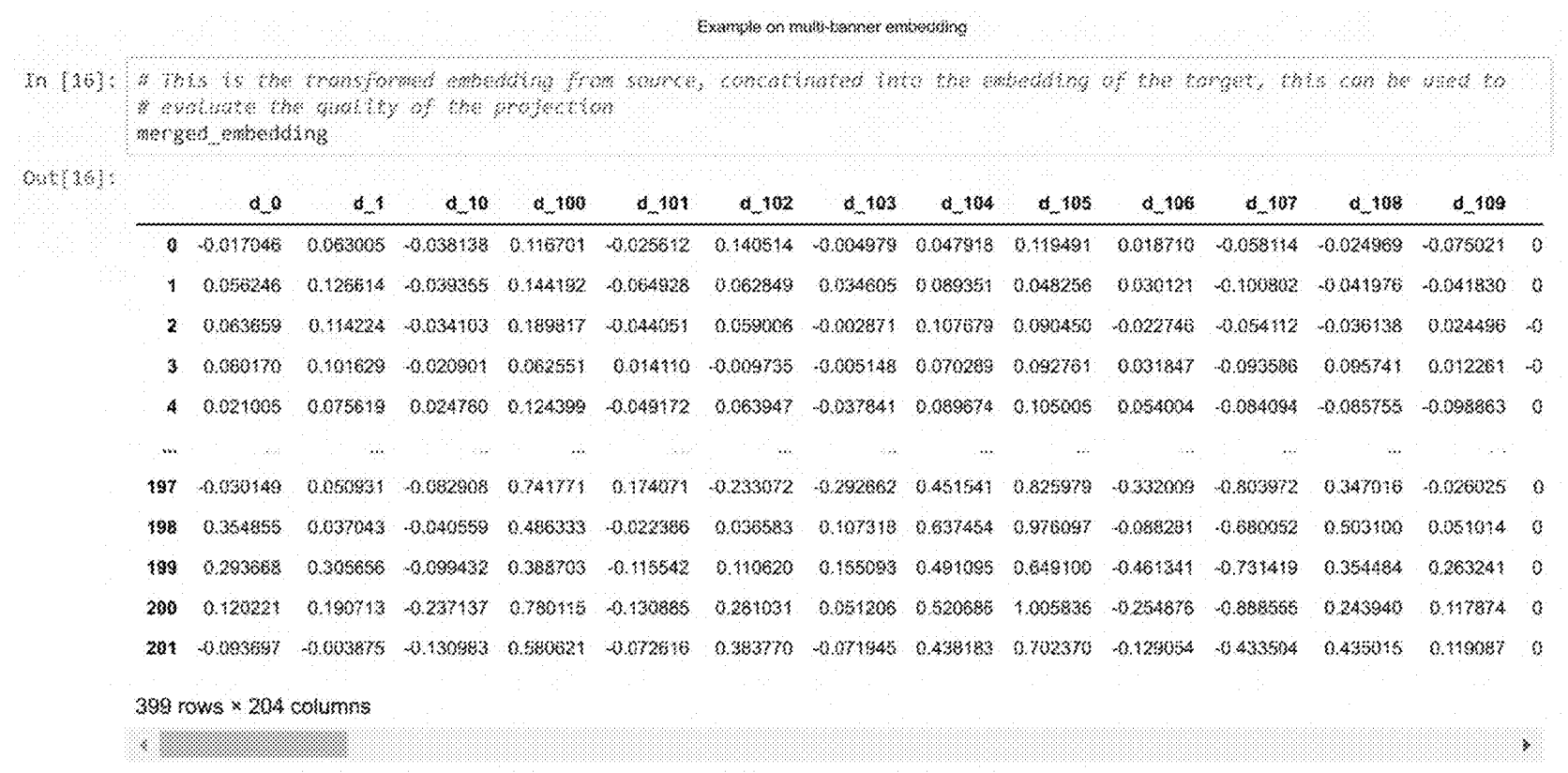

FIGS. 44-45 illustrate example flow and code that can be used in multi-banner embedding projection, according to aspects of the disclosure. FIG. 45 illustrates example code that can be used to set up the neural network. FIG. 44 illustrates example steps that can be taken to use the neural network for multi-banner embedding projection. Note that the steps can be done in other orders than those shown in the figures.

FIGS. 46-47 illustrate example flow and code that can be used to help find optimal embedding dimensions, according to aspects of the disclosure. FIG. 47 illustrates example code that can be used to set up the neural network. FIG. 46 illustrates example steps that can be taken to use the neural network to find optimal embedding dimensions. Note that the steps can be done in other orders than those shown in the figures.

In some aspects of the disclosure, collections of SKUs can be embedded. This can be done using averaging. FIG. 52 illustrates an example of embedding of a collection using averaging, according to aspects of the disclosure. Embedding collections of SKUs can be done using a DOC2Vec analysis, as shown in FIG. 43 (B3).

Clustering Examples

Figure 14:
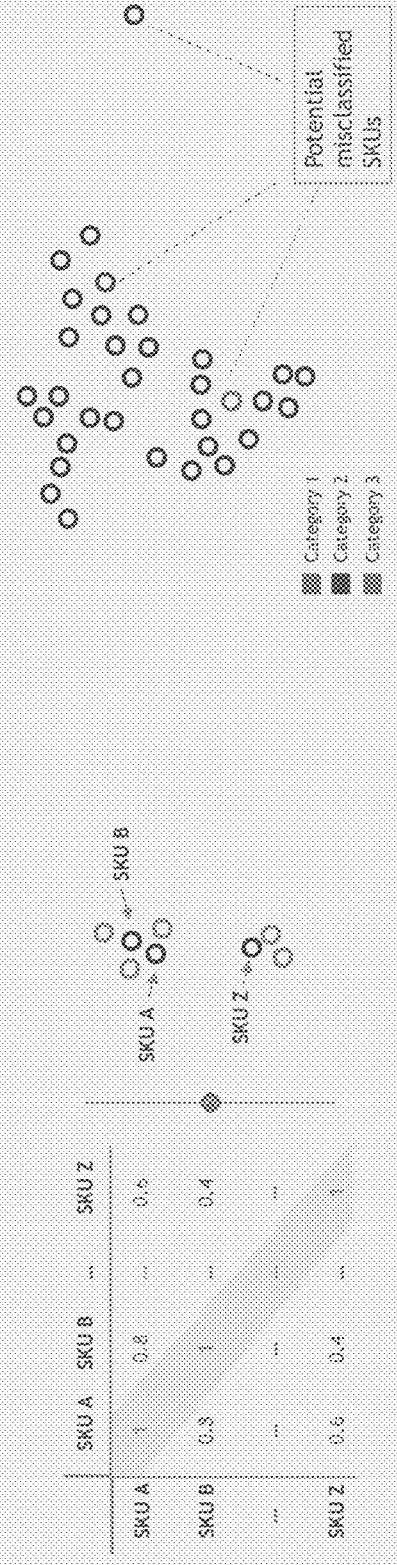
Figure 15:
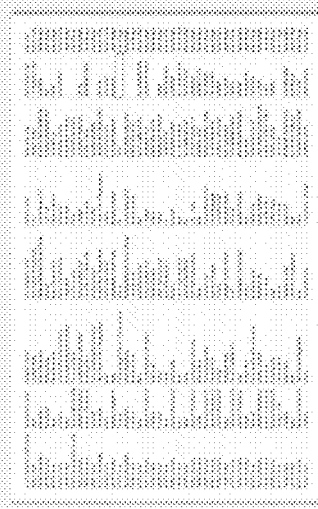
Figure 16:
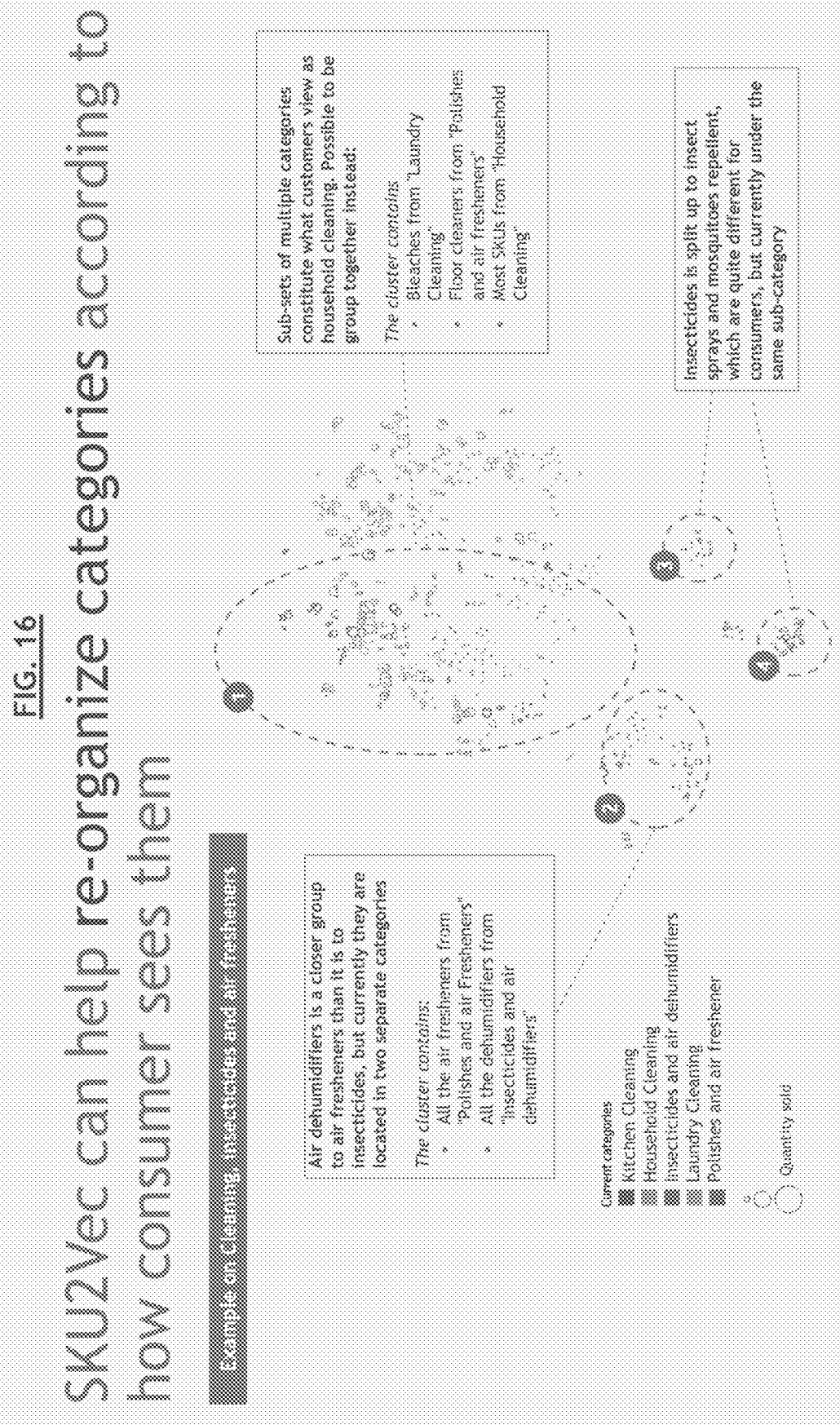
Figure 21:
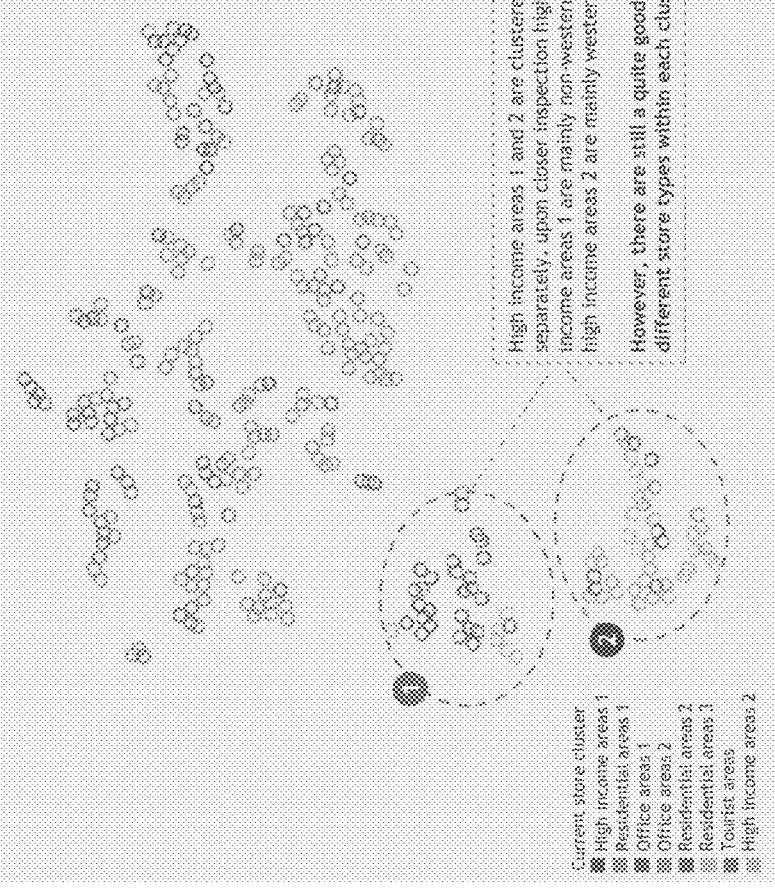
Figure 22:
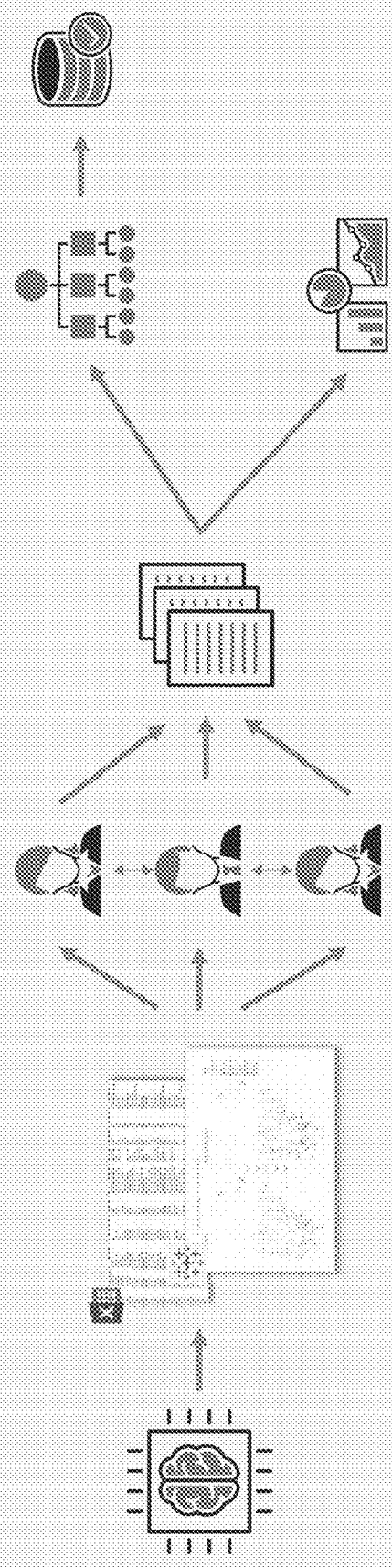

FIGS. 13-22 illustrate various examples related to clustering, according to aspects of the disclosure. FIG. 13 illustrates an example of how SKU2Vec can help improve product hierarchies and identify store clusters. FIG. 14 illustrates an example of how SKU2Vec can help identify wrongly categorized SKUs. FIG. 15 illustrates an example of how a list of potentially misclassified SKUs can be generated. FIG. 16 illustrates an example of how SKU2Vec can help re-organize categories according to how a consumer sees them. FIG. 17 illustrates an example of new categorisation that is aligned with consumer purchasing habits. FIG. 18 illustrates an example of how SKU2Vec can help optimize subcategories to better reflect customer need states. FIG. 19 illustrates an example of how current subcategories may not always sufficiently capture consumer purchase preferences. FIG. 20 illustrates an example of how SKU2Vec can help identify store clusters. FIG. 21 illustrates an example of clear division between Western top income stores and non-Western top income stores. FIG. 22 illustrates an example of how algorithm insights may be combined with buyers' expertise to create a maximum impact. FIGS. 50-51 illustrate an example of finding and ranking the most important attributes that differentiate customers, according to aspects of the disclosure.

Example clustering algorithms that can be used include, but are not limited to: t-SNE (see, e.g., Maaten, Laurens van der, and Geoffrey Hinton, "Visualizing data using t-SNE," Journal of machine learning research, 9 Nov. (2008): 2579-2605, which is herein incorporated by reference in its entirety); and alternative methods (K-means, hierarchical clustering, etc.) described, for example, in the Aug. 20, 2020 Wikipedia article on cluster analysis (e.g., see https:// en.wikipedia.org/wiki/Cluster_analysis), which is herein incorporated by reference in its entirety.

Transference Examples

Figure 23:
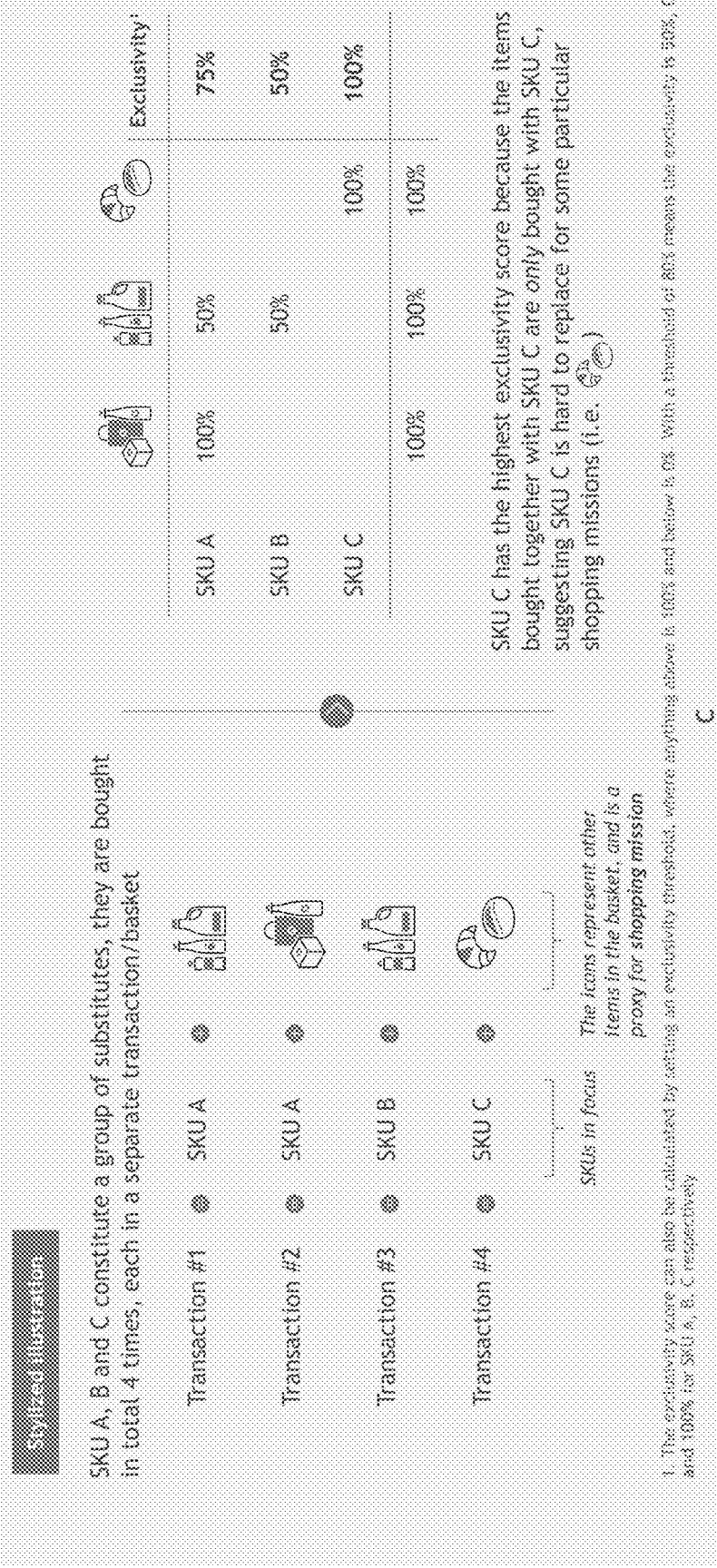
Figure 26:
Figure 27:
Figure 34:
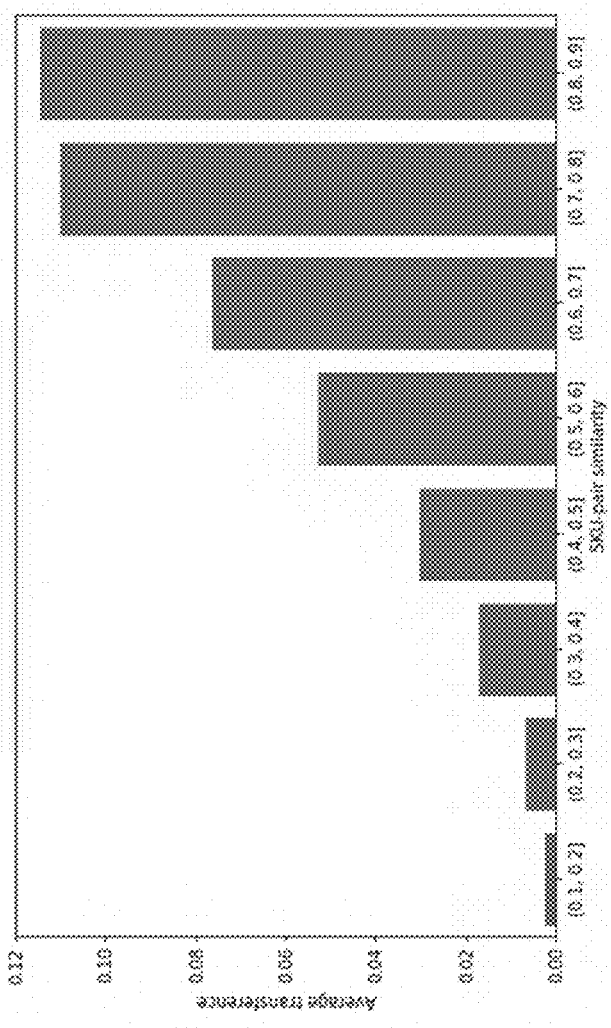

FIGS. 23-35 illustrate various examples related to transference estimation, according to aspects of the disclosure. FIG. 23 illustrates an example of how exclusivity can be approximated by looking at the uniqueness of the basket an item is bought in. FIG. 24 illustrates an example of how uniqueness of a basket can be derived using SKU embeddings. FIG. 25 illustrates an example formula of how to calculate exclusivity with SKU2Vec. FIG. 26 illustrates an example of how new exclusivity can derive similar answers compared to existing methods. FIGS. 27-28 illustrates an example of how a new approach can underestimate non-fresh SKUs due to consumer behaviour. FIG. 29 illustrates an example of an alternative method where transference can also be directly estimated if one can reliably infer out-of-stock SKUs. FIG. 30 is an example method to infer out-of-stock items. FIGS. 31-32 are consumer choice modelling examples. FIG. 33 is an example transference formula. FIGS. 34-35 are example model for delivering transference estimates and making sense of individual SKUs.

FIGS. 40-41 illustrate example flow and code that can be used in estimate transference/exclusivity, according to aspects of the disclosure. FIG. 41 illustrates example code that can be used to set up the neural network. FIG. 40 illustrates example steps that can be taken to use the neural network system to estimate transference and/or exclusivity. Note that the steps can be done in other orders than those shown in the figures.

Range Examples

Overall Range Design. The system can identify whether there are excessive and/or inadequate products in a range of products from the density of products in "embedding space.". For example: Are there a lot of products with very similar embeddings? Are some of the products out on their own? Image vectors can be created so that they can be seen as 3D dots in space. We can take the vectors from lengths of hundreds to vector lengths of 2. Information can be thrown away or deleted. Clouds can be close to each other and separated from other clouds. There may be an area where we have lots of similar items. Sales can be spread between a lot of similar items. There can be some products in the 3D space that are attracting a lot of sales, so we can offer products similar to those. We can measure how close the embeddings are to measure sets of products. There can be very similar ones. There can be some that are very distinct. We can copy the popular products with a brand of their own. For example, if an Asian market sells 25 different types of Korean noodles that are very similar, customers are likely buying a random type of noodle. Thus, the store could cut down from 25 to 2 or 3, and customers may not care.

In some aspects of the disclosure, the system can be used to identify product gaps (e.g., a homebrand version of a product (where there's a complete gap in "embedding space").

Allocation of Range to Stores. A store can have an embedding based on the products it sells, whether overall or in some categories. The system can take the average of the embeddings of the SKUs it sells. The system can also train the SKU embedding model to embed the store (e.g., Will this product be found in a basket with that product in this store?). The stores can then be clustered and these clusters can reveal customer preferences. This can provide insights that can help when designing ranges for stores. For example, it can help the store stock items that reflect local tastes which might be otherwise difficult to uncover from sales data. Stores in the same cluster can be given similar ranges.

FIG. 53 illustrates an examples of how to use SKU embeddings for range decision, according to aspects of the disclosure.

FIG. 54 illustrates an example on optimizing a range across brands, according to aspects of the disclosure.

Pricing Examples

FIGS. 36-39 illustrate various examples related to pricing, according to aspects of the disclosure. Elasticity measures can be useful in setting optimal non-promoted and/or promoted prices. These can be done at a SKU level (e.g., What happened when we promoted and/or repriced this before?). But if the price hasn't changed, or the SKU is new, or has never been price promoted (e.g., for fashion items which need to be marked down for clearance), it can be difficult to estimate. It can also be difficult to account for substitution (e.g., If we reduce the price of 2 pints of milk, what happens to sales of 1 pint of milk?). The system can help determine what happens if an entity prices to promote items. For example: how much has the store sold, how big was the reduction, and how much a store sell. In some cases, if a store has never discounted something before, and the store may need guidance regarding how much it will sell if it marks something down. For example, the store could see how black t shirts would sell, or sequin shirts. The system can produce an embedding of what the store has sold. The system can produce a math model that can predict the elasticity (e.g., change in units sold per change in price) of SKUs, from their embedding. It can be the changing quantity divided by the changing price. The system can calculate what sales the store has done before using the SKUs. The system can make the vector size 1 instead of 200 (for elasticity), in order to get an estimate for something that's been sold but never discounted, using what the store has previously sold and discounted. All that may be needed is to know its embedding.

Figure 39:
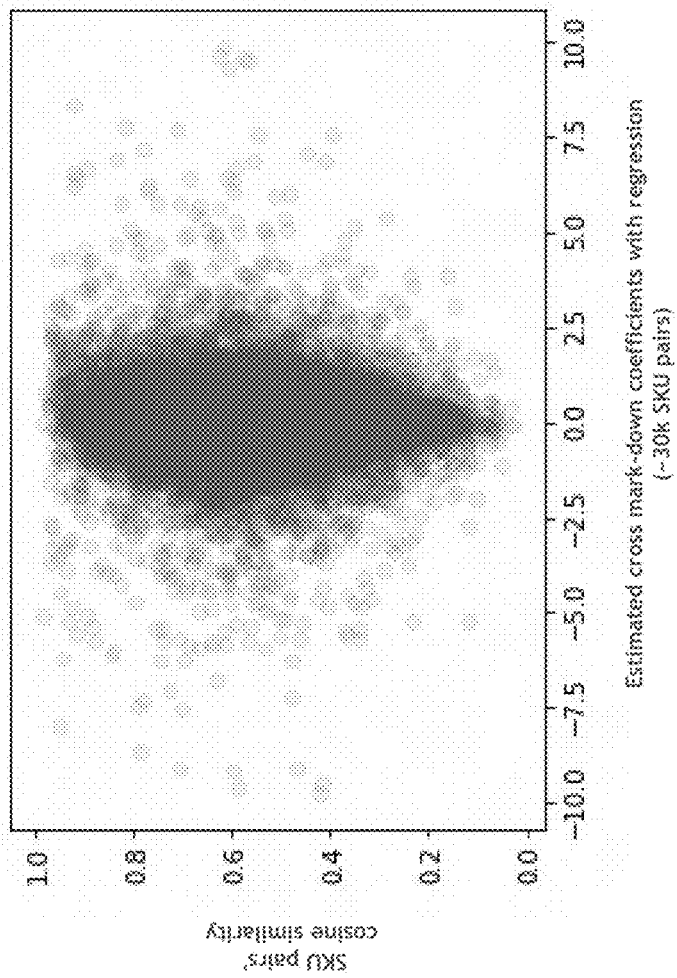

FIGS. 36-37 illustrates an example of how SKU embedding can help estimate SKU's mark-down efficiency and how it can contain useful information to help estimate cannibalization. FIG. 38 illustrates an example of how true mark-down coefficients can be estimated using selected popular SKUs and SKU pairs. FIG. 39 illustrates an example of how SKU can pair with high cosine similarity more likely to have high cross-price sensitivity, but with large variance.

Embeddings can allow us to build elasticity and/or substitution models which may not be SKU-by-SKU but instead may be based on the elements of the embedding vector. For cross-elasticity (e.g., substitution), the system can use features of nearby vectors (e.g., How many are nearby? How far away is the nearest on each dimension of the embedding?). A substitution model can help the store determine what to stock and/or the elasticity related to pricing.

Embeddings can help the system cope with small amounts of data (e.g., the effect of price changes on other items can be used to infer the price effect on an item). Items which have never had price variation or markdown can have price response estimates.

Segmentation Examples

FIG. 49 illustrates an example of customer segmentation, according to aspects of the disclosure. Algorithms can be used with the output of the neural network to create customer segmentation.

For example, output of the neural network can be used with a segmentation algorithm to create customer segmentation. The SKU embeddings can be determined from the neural network. Then the SKUs can be clustered. The SKU vector can be, for example, 200 numbers. (Note that many other size vectors may be used.) Then, the average can be determined. For example, we can determine the distance from 200 numbers and find the ones the are closest to each other. If we want to cluster stores, we can look at the average embedding of all the SKUs that a particular store sold. And that gives us an embedding that can be the same form as the embedding for the SKU (e.g., 200 numbers), such as, for example, that shown in FIG. 21.

Once we have the clusters of SKUs and/or collections of SKUs, we can inspect them and determine segments. For example, a person can look at the clusters of SKUs or collections or SKUS and determine what information is important or interesting relating to the customer, the basket, or the store, or any combination thereof. For example, we can review information about all the items the customer bought. We can determine many metrics from the clusters of SKUs (e.g., take the average that took no account of quantity, take average of items bought in certain time period, take average of items bought in certain categories, ignore some products bought in different stores).

We can also determine many metrics from the collections of SKUs. Collections of SKUs can have embeddings as well as individual SKUs. We can do this by averaging the embeddings of the individual SKUs or by using the Doc2Vec analogy. If we use the Doc2Vec analogy, then both the SKU embeddings and at least one other embedding (e.g., store, customer, basket or any combination thereof) can be obtained. The average of all the embeddings can be used, or a Doc2Vec type analysis may be done. With respect to the average of the embeddings, this can be the same size (e.g., 200) as the SKU vector. With respect to the Doc2Vec, vectors for customers can be of a same or different size (e.g., 30) than the SKU vector (e.g., size 200).

Once we have the SKU clustering and/or the SKU collection information, we can color the dots in the clusters according to what we know about the SKUs. For example, the dots on FIG. 49 can each represent a customer. If we are clustering customers, the dot can represent a customer. If we are clustering items, the dot can represent an item. If we are clustering baskets, the dot can represent a basket. If we are clustering stores, the dot can represent a store. Dots that are close together can have similar embeddings.

The SKU collection information can use an algorithm (e.g., a principal component analysis) in addition to the algorithms used to cluster to find and rank the most important product attributes that differentiate the customers. Each SKU can be scored using these attributes. For example, FIG. 51 illustrates an example for wines from a liquor supermarket. This example can show that the additional algorithm found an abstract product attribute that is important to customers (in this example, the most important), which is the price of the product. In addition, a principal component analysis can find the most important dimensions of variability in the embeddings.

In some aspects of the disclosure, the representation of the vectors can comprise clustering of the vectors. In some aspects, the representation of the vectors can be expressed using principal components. In some aspects, the clustering can utilize embeddings related to a collection of SKUs. In some aspects, the representation of the vectors can comprise clustering of the vectors. In some aspects, the representation of the vectors can be expressed using principal components. In some aspects, the clustering can utilize embeddings related to a collection of SKUs.

Example Features

The techniques presented in this application may improve upon other options in the following ways.

It may provide a more robust and flexible approach to generate SKU embedding. Compared to other methods used to generate a SKU embedding (often based on matrix factorisation), SKU2VEC can digest much more data (e.g., it can include all basket transactions, compared to matrix factorisation which may only include a subset, or an aggregated version of it), with fewer assumptions (e.g., it may not don't use any existing product hierarchy). It may also have a more flexible structure. For example, the neural network in SKU2VEC can adjust the bias caused by different assortments across stores. This can be is achieved by feeding the neural network with extra information on which store the basket is purchased at, and the store's SKU assortment (see. e.g., FIG. 7).

It can derive price elasticity or markdown effectiveness on SKUs that could may not have previously been performed, due to lack of price changes. Other methods to estimate price elasticity/markdown effectiveness may require the SKU in scope to have experienced price changes (e.g., previously discounted). With SKU2VEC, the embeddings can be used directly to estimate the elasticity or markdown effectiveness on SKUs that have not previously experienced price changes. This may be done without the strong (and sometimes unrealistic) assumption that SKUs in the same human created product category show same/similar uplift when discounted. Instead SKU2VEC can use uses revealed preference from customers to estimate uplift (see, e.g., FIGS. 36-39).

It can derive transference estimates that could may not previously have been performed, using basket data without a customer identifier. Other methods of estimating transference can require a customer identifier, so to track the same customer making multiple shopping trips within a period, SKU2VEC introduces can use a technique that doesn't require a customer identifier, and only requires a basket identifier (see, e.g., FIGS. 23-24). This may help because for many retailers customer identifiers are may be hard to obtain and often missing.

It may increase accuracy in creating customer, store and SKU segmentations, by using more data and less assumptions. Other segmentation methods may rely on existing product attributes (e.g., product hierarchy, which may be a set of assumptions made by retailers about which products are similar), while SKU2VEC doesn't. SKU2VEC instead may provide measures of similarity which can be based on actual customer behaviour, without the leap of faith needed to create the product hierarchy.

It may increases the accuracy of range decisions by using data that was unavailable before. SKU2VEC can introduce a new approach in range optimisation by using the SKU embeddings, which may not have not been used in prior range decision methods. This approach may involve calculating the vector distance between embeddings as a proxy for SKU similarity, which then can be used to map out the entire product landscape. This similarity measure can be is derived purely from actual customer behaviour.

Methods and systems for displaying information related to items stocked in a store can be provided. The methods and systems can comprise: accepting, using a computer system, stock keeping unit (SKU) information for items in the store, and basket information indicating which SKUs were sold together in a same basket; defining dimension information and structure information for a neural network; training the neural network using the basket information indicating which SKUs were sold together in the same basket to calculate weight values and bias values for the neural network; generating a vector for each SKU using the neural network; and displaying a representation of the vectors that illustrates information related to the items stocked in the store. The neural network may not need customer identification information and/or product information other than the SKU.

Methods and systems for displaying information related to pricing information for items in a store can be provided. The system can be used with the example computer system described below. The system can use modules to perform the various steps described in aspects of the disclosure. The methods and systems can comprise: accepting, using a computer system, stock keeping units (SKUs) for the items in the store; defining dimension information and structure information for a neural network; training the neural network to create weight values and bias values for the neural network; generating a vector for each SKU using the neural network; and displaying a representation of the vectors that illustrates information related to pricing for the items in the store. The pricing can comprise regular pricing and/or promotional pricing. The neural network may not need customer identification information. Basket information can indicate which items were sold together in a basket. The neural network may use historical pricing information.

Methods and systems for displaying information related to items purchased in a pre-designated store can be provided. The methods and systems can comprise: accepting, using a computer system, stock keeping unit (SKU) information for items in the store, and basket information indicating which SKUs were sold together in the same basket, and in which pre-designated store the basket was sold; defining dimension information and structure information for a neural network; training the neural network using the basket information indicating which SKUs were sold together in the same basket to calculate weight values and bias values for the neural network; generating a vector for each SKU using the neural network; generating a vector for each pre-designated store using the vectors for each SKU or directly from the neural network; and displaying a representation of the vectors that illustrates information related to the items purchased in the pre-designated store. The methods and systems can also determine which items are from the same store. Exclusive negative SKUs selected only from the SKUs available in the store where the basket was purchased can also be determined. Each SKU can comprise words and/or numbers. Embeddings utilizing the exclusive negative SKUs to transfer the SKUs into vectors can be created using the neural network. The exclusive negative SKUs can be SKUs not found with another SKU together in a basket. Groups of items that were and were not sold together in baskets can be determined. Embeddings can be used with the neural network. The embeddings can comprise information about the items and information about where the items were purchased. The neural network may not need customer identification information. The systems and methods can determine which store sells the SKUs in the same basket using the basket information and the store identifier information. The methods and systems can utilize encoding with the neural network to recommend which assortment of items should be sold in which store. The neural network can be used for transference estimation. The neural network can be used to determine optimal embedding dimensions.

Example Computer System

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors (e.g., processor 410 in FIG. 48) executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Figure 48:
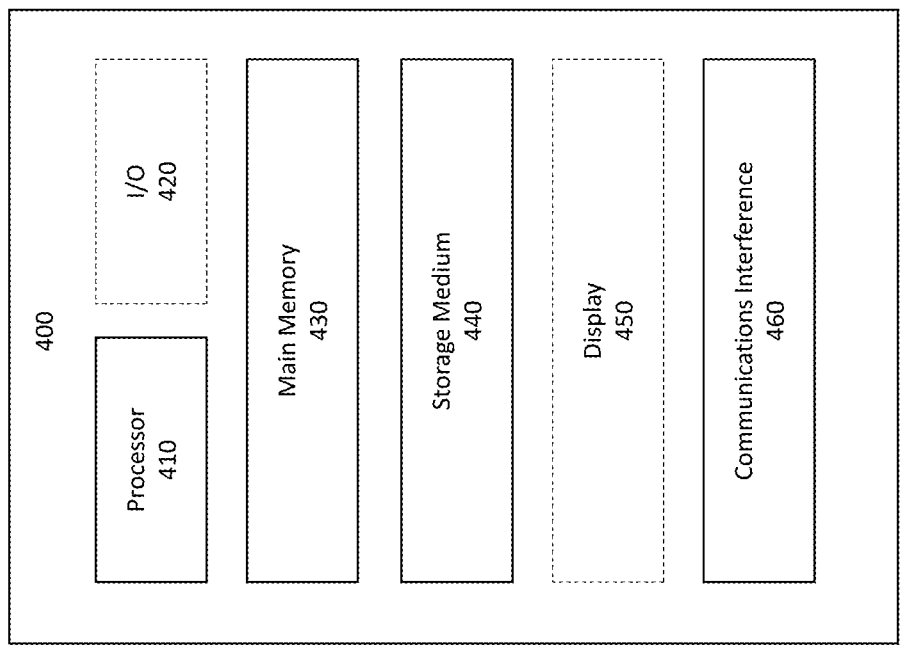
FIG. 48 illustrates an example computer 405, according to some aspects of the disclosure.

FIG. 48 illustrates an example computer 405, according to some embodiments of the present disclosure. Computer 405 can include a processor 410 suitable for the execution of a computer program, and can include, by way of example, both general and special purpose microprocessors, and any one or more processor of any kind of digital computer. A processor can receive instructions and data from a memory 430 (e.g., a read only memory or a random access memory or both). Processor 410 can execute instructions and the memory 430 can store instructions and data. A computer can include, or be operatively coupled to receive data from or transfer data to, or both, a storage medium 440 for storing data (e.g., magnetic, magneto optical disks, or optical disks). Information carriers suitable for embodying computer program instructions and data can include all forms of non-volatile memory, including by way of example semiconductor memory devices, such as EPROM, EEPROM, flash memory device, or magnetic disks. The processor 410 and the memory 430 can be supplemented by, or incorporated in, special purpose logic circuitry. The computer 405 can also include an input/output 420, a display 450, and a communications interface 460.

The computer may be used with a computing device that may include but is not limited to personal computers, servers, smart phones, media players, electronic tablets, mobile devices, email devices, etc.

Any processor(s) 410 used may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more non-transitory computer-readable storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

The input 420 may be any known input device technology, including but not limited to a keyboard (including a virtual keyboard), mouse, track ball, and touch-sensitive pad or display. To provide for interaction with a user, the features and functional operations described in the disclosed embodiments may be implemented on a computer having a display 450 such as a CRT (cathode ray tube) or LCD (liquid crystal display) monitor for displaying information to the user and a keyboard and a pointing device such as a mouse or a trackball by which the user can provide input to the computer. Display 450 may be any known display technology, including but not limited to display devices using Liquid Crystal Display (LCD) or Light Emitting Diode (LED) technology.

Communications interface 460 may be configured to enable the computing device to communicate with other computing or network device across a network, such as via a wired connection, a wireless connection, or a combination of wired and wireless connections. For example, the communications interface may include an Ethernet interface, an optical interface, a coaxial interface, an infrared interface, a radio frequency (RF) interface, a universal serial bus (USB) interface, a Wi-Fi interface, a cellular network interface, or the like.

The memory 430 may be any computer-readable medium that participates in providing computer program instructions and data to processor(s) for execution, including without limitation, non-volatile storage media (e.g., optical disks, magnetic disks, flash drives, etc.), or volatile storage media (e.g., SDRAM, ROM, etc.). Memory 430 may include various non-transitory computer-readable instructions for implementing an operating system (e.g., Mac OS®, Windows®, Linux), network communication, and Application(s) and program modules. The operating system may be multi-user, multiprocessing, multitasking, multithreading, real-time, and the like. The operating system may perform basic tasks, including but not limited to: recognizing input from input devices; sending output to the display; keeping track of files and directories on the memory; controlling peripheral devices (e.g., disk drives, printers, etc.) which can be controlled directly or through an I/O controller; and managing traffic on a bus. The bus may be any known internal or external bus technology, including but not limited to ISA, EISA, PCI, PCI Express, NuBus, USB, Serial ATA or FireWire.

Network communications instructions may be used with or by the computer 405 and may establish and maintain network connections (e.g., software applications for implementing communication protocols, such as TCP/IP, HTTP, Ethernet, telephony, etc.).

Application(s) and program modules may be used with or by the computer 405 and may include software application(s) and different functional program modules which are executed by processor(s) 41 to implement the processes described herein and/or other processes. The program modules may include but not limited to software programs, objects, components, data structures that are configured to perform particular tasks or implement particular data types. The processes described herein may also be implemented in the operating system.

Communication between various network and computing devices may be used with or by the computer 405 and may be facilitated by one or more application programming interfaces (APIs). APIs of the system may be proprietary and/or may be examples available to those of ordinary skill in the art such as Amazon® Web Services (AWS) APIs or the like. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call.

The described features and functional operations described in the disclosed embodiments may be implemented in a computer system that includes a back-end component, such as a data server, or that includes a middleware component, such as an application server or an Internet server, or that includes a front-end component, such as a user computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include user computing devices and application servers. A user or client computing device and server may generally be remote from each other and may typically interact through a network. The relationship of client computing devices and server may arise by virtue of computer programs running on the respective computers and having a client-server relationship to each other.

The neural network described herein may use machine learning and/or artificial intelligence to improve the field of retail analytics by, for example, finding patterns and relationships that would otherwise be impossible to determine using a very large data set. In addition, the machine learning can also continuously use new data to modify and/or update retail analytic information. The machine learning and/or artificial intelligence may include the study of computer algorithms that improve automatically through experience. Machine learning/artificial intelligence algorithms can build a mathematical model based on sample data, known as "training data", in order to make predictions or decisions without being explicitly programmed to do so. More information on machine learning/artificial intelligence can be found in the Aug. 18, 2020 Wikipedia article https://en.wikipedia.org/wiki/Machine_learning, which is herein incorporated by reference in its entirety.

CONCLUSION

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Accordingly, other implementations are within the scope of the following claims. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

In addition, it should be understood that any figures which highlight the functionality and advantages are presented for example purposes only. The disclosed methodology and system are each sufficiently flexible and configurable such that they may be utilized in ways other than that shown. For example, other steps may be provided, or steps may be eliminated, from the described flows, and other components may be added to, or removed from, the described systems. In addition, the steps or components may be used in a different order or configuration than that shown in the drawings.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computer-implemented system for displaying information related to items from a pre-designated store, comprising:
a processor in communication with a network, the processor configured for:
accepting stock keeping unit information for items in the pre-designated store, and combination information indicating which stock keeping units were sold together, and store information indicating which pre-designated store sold the combination, wherein each stock keeping unit comprises words and/or numbers;
defining dimension information and structure information for a neural network;
training the neural network using the combination information indicating which stock keeping units were sold together in a same combination, but not requiring person identification, to calculate weight values and bias values for the neural network;
generating a vector for each stock keeping unit using the neural network;
generating a vector for each pre-designated store using the vectors for each stock keeping unit or directly from the neural network; and
displaying a representation of the vectors that illustrates information related to the items from the pre-designated store.

2. The system of claim 1, wherein the processor is configured for:
determining exclusive negative stock keeping units selected only from the stock keeping units available in the pre-designated store where the combination is sold;
creating embeddings utilizing the exclusive negative stock keeping units to transfer the stock keeping units into vectors, wherein the exclusive negative stock keeping units are stock keeping units not found with another stock keeping unit together in a combination; and
utilizing the embeddings with the neural network, the embeddings comprising information about the items and information about stores where the items were sold.

3. The system of claim 1, wherein the processor is configured for: determining which items are from a same store.

4. The system of claim 1, wherein the processor is configured for: determining, using the computer-implemented system, groups of items that were and were not sold together in combinations.

5. The system of claim 1, wherein the processor is configured for: determining, using the computer-implemented system, which store sells the stock keeping units in the same combination using the combination information and store identifier information.

6. The system of claim 1, wherein the processor is configured for: utilizing encoding with the neural network to recommend which assortment of items should be sold in which store.

7. The system of claim 1, wherein the processor is configured for: using the neural network for transference estimation.

8. The system of claim 1, wherein the processor is configured for: using the neural network to determine optimal embedding dimensions.

9. A computer-implemented system for displaying information related to items stocked in a store, comprising:
a processor configured for:
accepting, at a computer in communication with a network, stock keeping unit information for items in the store, and combination information indicating which stock keeping units were sold together in a same combination, wherein each stock keeping unit comprises words and/or numbers;
defining, at the computer, dimension information and structure information for a neural network;
training, at the computer, the neural network using the combination information indicating which stock keeping units were sold together in the same combination to calculate weight values and bias values for the neural network;
generating, at the computer, a vector for each stock keeping unit using the neural network; and displaying, at the computer, a representation of the vectors that illustrates information related to the items stocked in the store, wherein the neural network does not need person identification information and/or product information other than the stock keeping unit.

* * * * *